United States Patent [19]

Oliver et al.

[11] Patent Number: 4,710,919
[45] Date of Patent: Dec. 1, 1987

[54] MULTIPLEX SYSTEM FOR AUTOMATIC METER READING

[75] Inventors: Stewart W. Oliver, Venice; John Cosgrove, Playa del Rey, both of Calif.

[73] Assignee: International Teldata Corporation, Las Vagas, Nev.

[21] Appl. No.: 544,110

[22] Filed: Oct. 21, 1983

[51] Int. Cl.[4] ............... H04J 3/16; G08B 23/00
[52] U.S. Cl. ............... 370/96; 340/870.02; 340/825.63; 379/107
[58] Field of Search ........... 370/90, 79, 96, 110.2; 340/825.63, 870.13, 870.03, 870.02, 825.02, 825.03, 310 A, 310 R, 870.07; 179/2 AM

[56] References Cited

U.S. PATENT DOCUMENTS

| | | | |
|---|---|---|---|
| 3,842,206 | 10/1915 | Barsellotti et al. | |
| 3,868,640 | 2/1975 | Binnie et al. | |
| 3,914,757 | 10/1975 | Finlay, Jr. et al. | 340/870.03 |
| 3,922,490 | 11/1975 | Pettis | 340/870.07 |
| 3,985,966 | 10/1976 | Edwards | 370/110.2 |
| 4,004,097 | 1/1977 | Spaulding | 340/840.02 |
| 4,103,337 | 7/1978 | Whiheside | 340/870.13 |
| 4,208,653 | 6/1980 | Abe | 340/870.03 |
| 4,262,213 | 4/1981 | Eichelberger | 340/825.63 |
| 4,311,986 | 1/1982 | Yee | 340/825.63 |
| 4,360,912 | 11/1982 | Metz et al. | 370/90 |
| 4,399,440 | 8/1983 | Douglas | 340/870.03 |
| 4,446,462 | 5/1984 | Ouellette et al. | 340/870.03 |
| 4,476,535 | 10/1984 | Loshing et al. | 340/870.13 |
| 4,642,635 | 2/1987 | Snaper | |

Primary Examiner—Douglas W. Olms
Assistant Examiner—Curtis Kuntz
Attorney, Agent, or Firm—John E. Wagner

[57] ABSTRACT

A remote meter reading system employing a plurality of multiplexers coupled between the telephone central office and remote interrogatable utility data sources. A number of lines are connected to a single data channel through a plurality of multiplexers. An interrogation signal source is connected to the multiplexer for sending controllable level interrogation signals to the data sources under the control of a microprocessor. The level of interrogation signal which produces a response from each different data source is stored. Upon failure to evoke a response from the highest level of interrogation signal causes that line to be recorded in memory as defective. The number of OFF-HOOK conditions encountered in a predetermined period is recorded and any excess of a predetermined value deleted as a line trouble condition. Signalling in the preferred embodiment is via pulse width modulated signals. In the alternate embodiment, dual tone signalling is employed.

44 Claims, 25 Drawing Figures

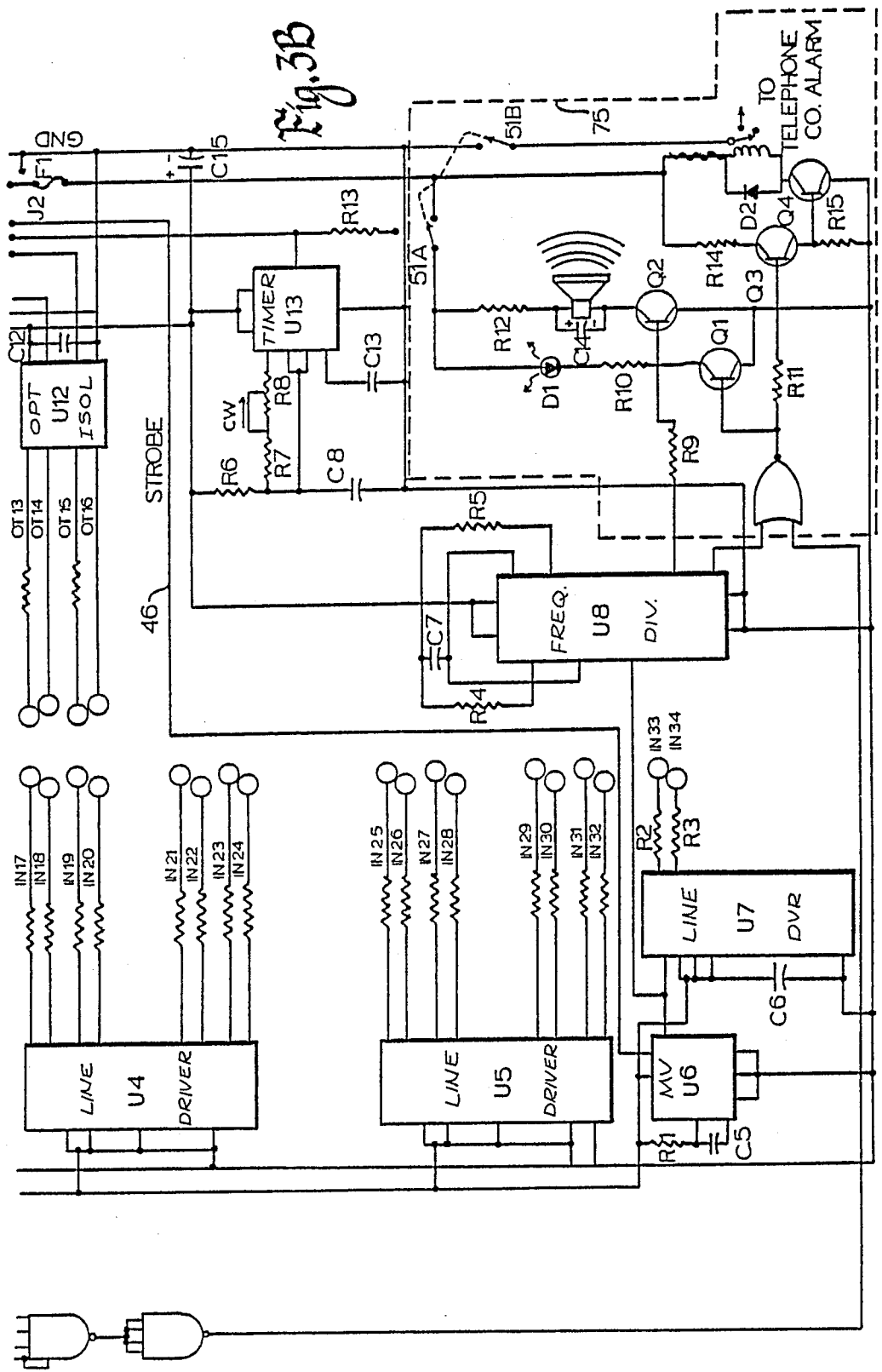

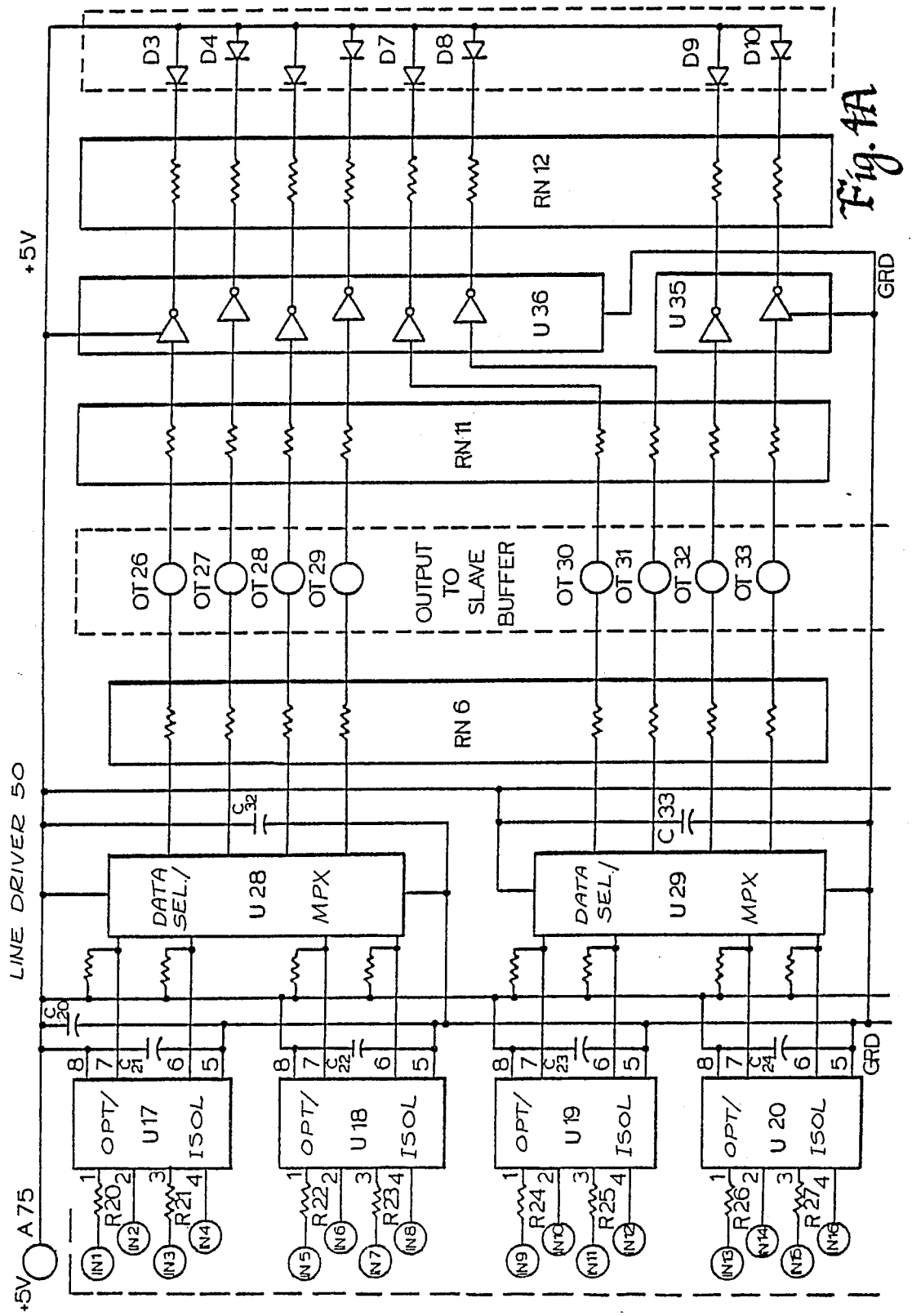

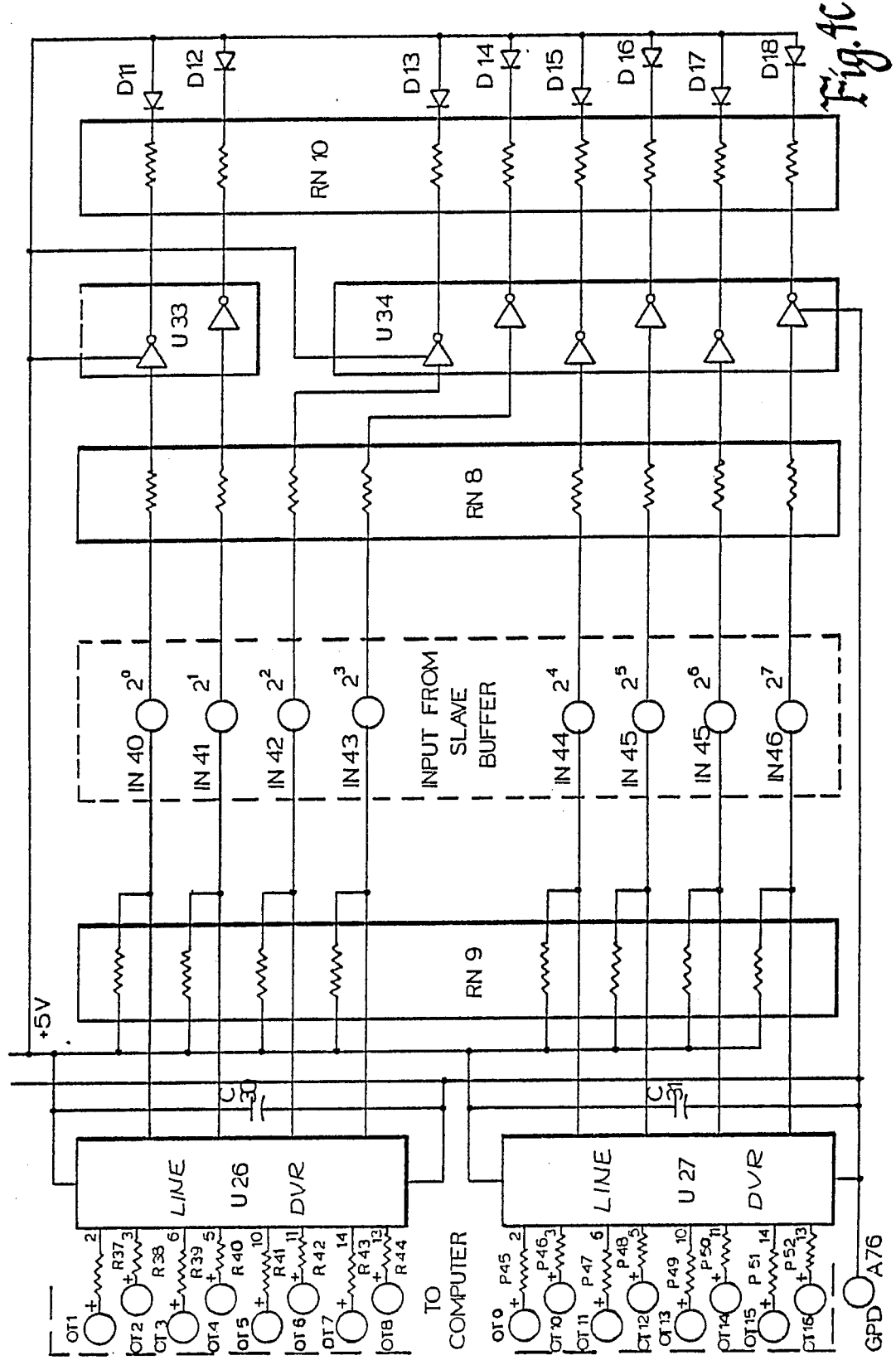

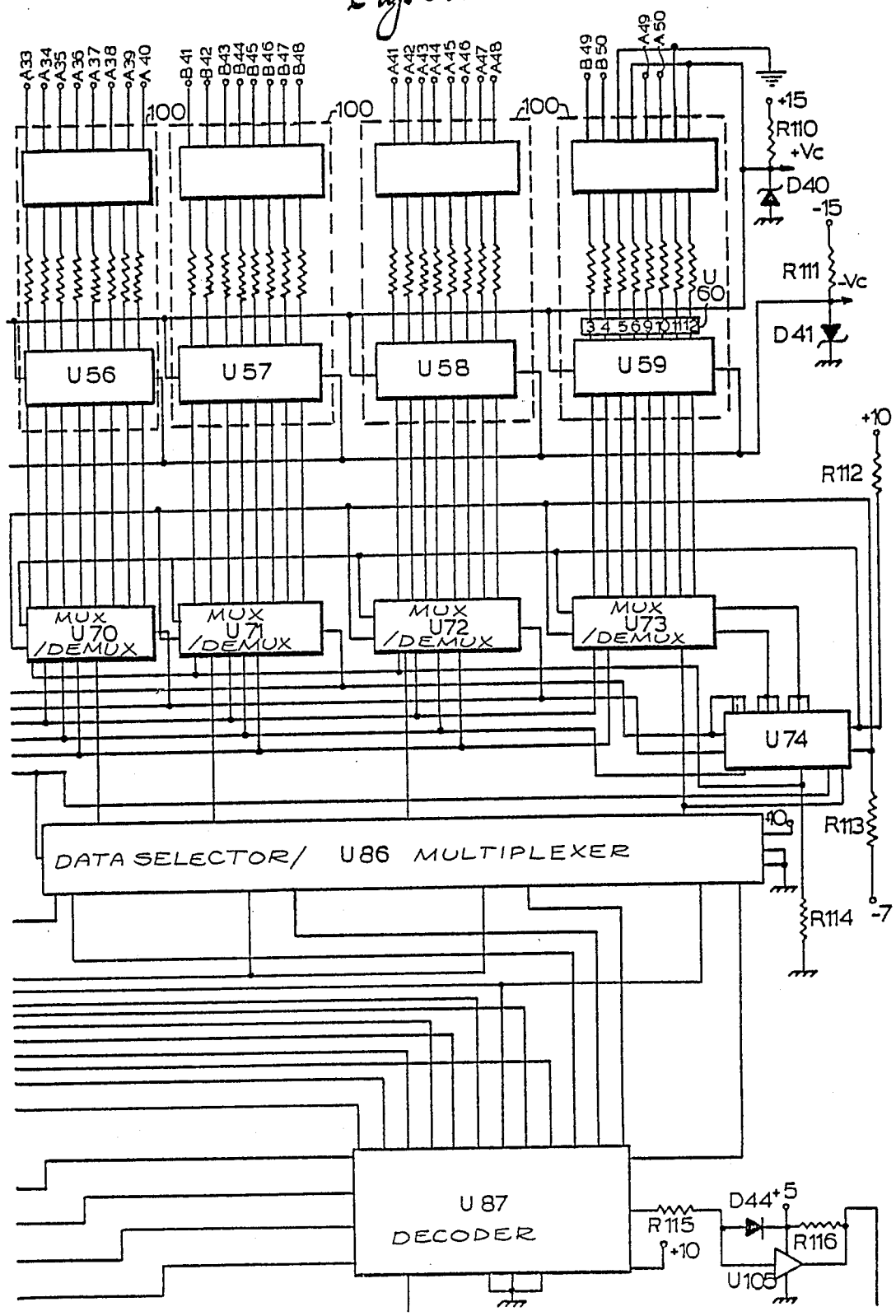

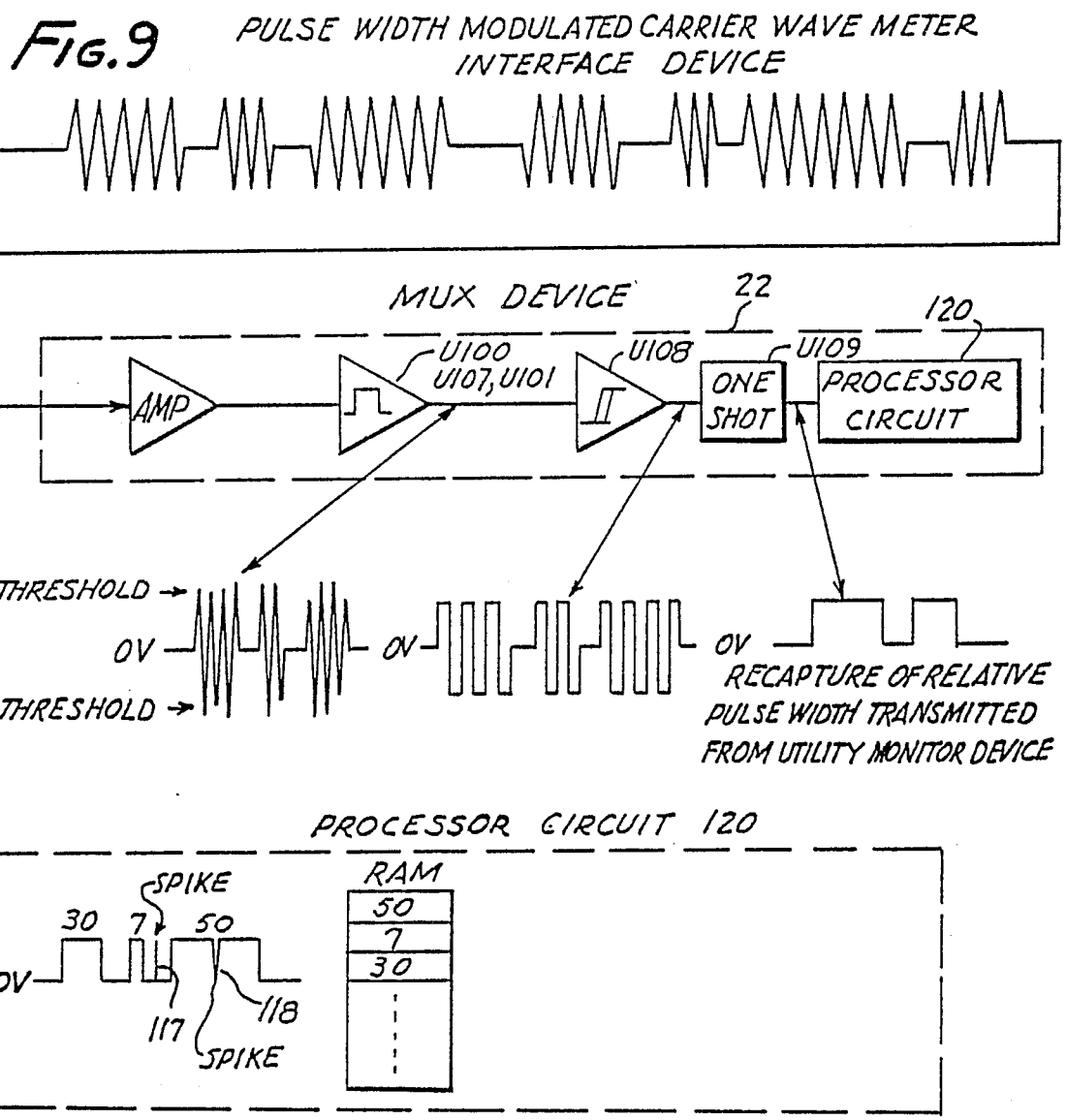

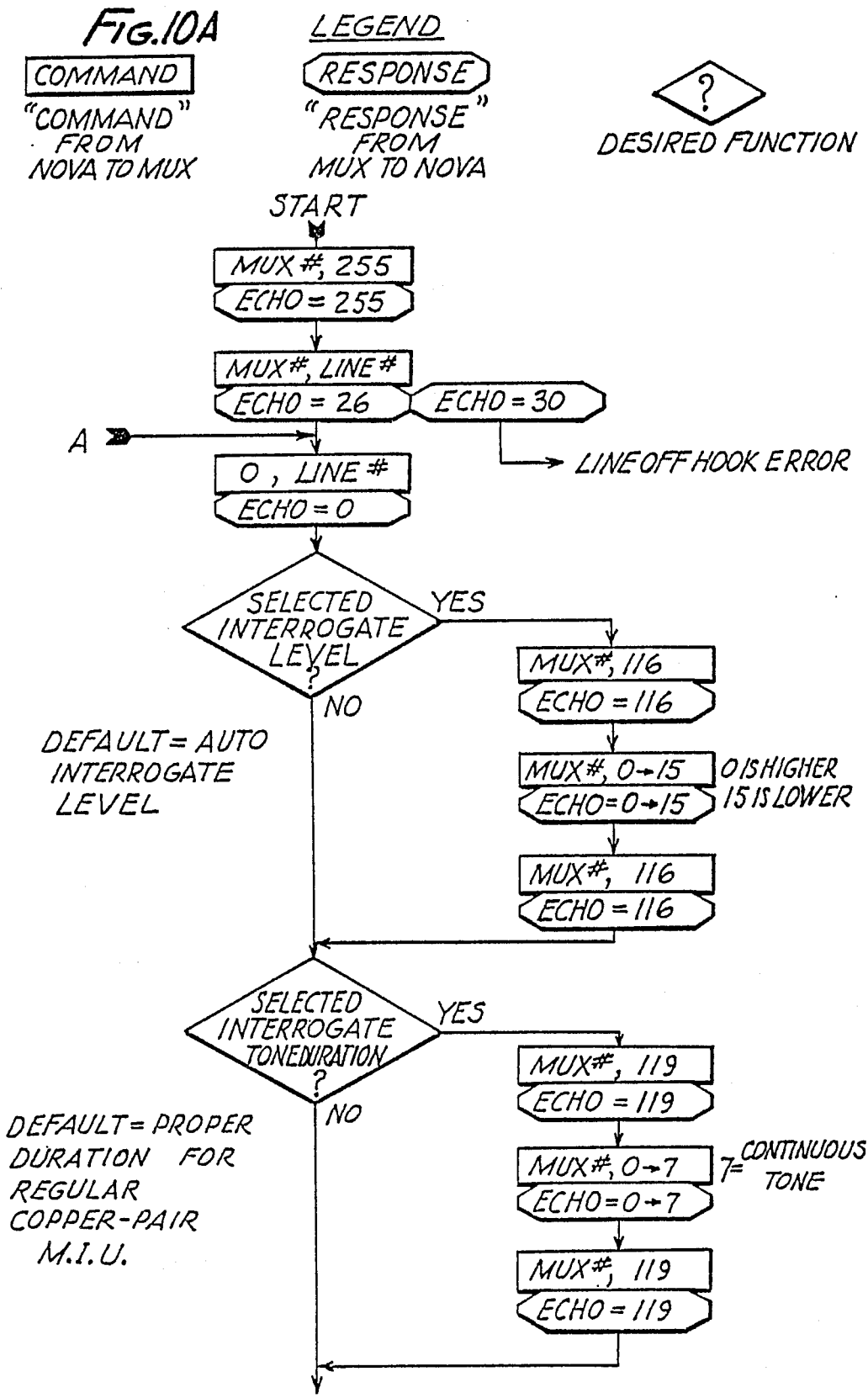

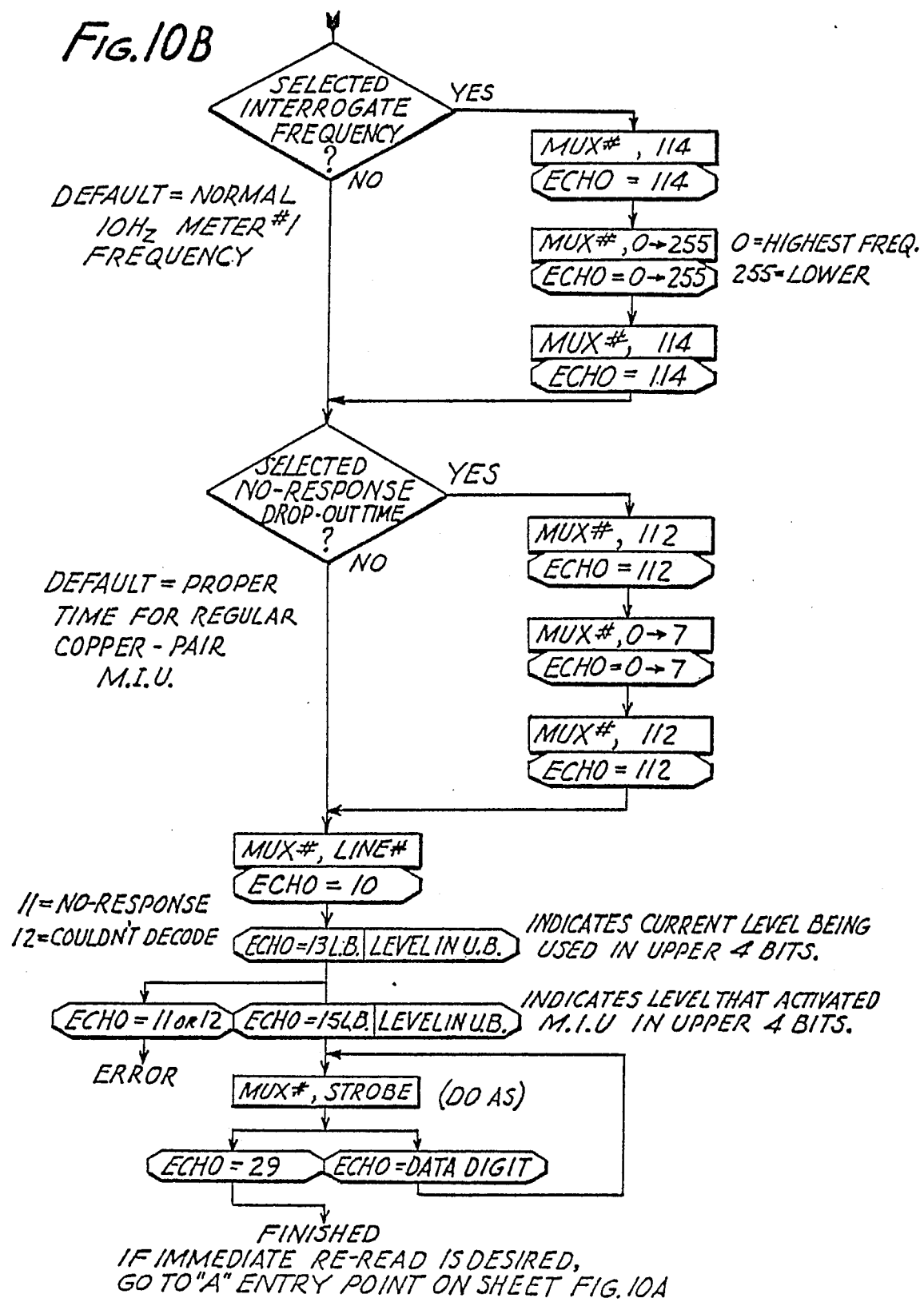

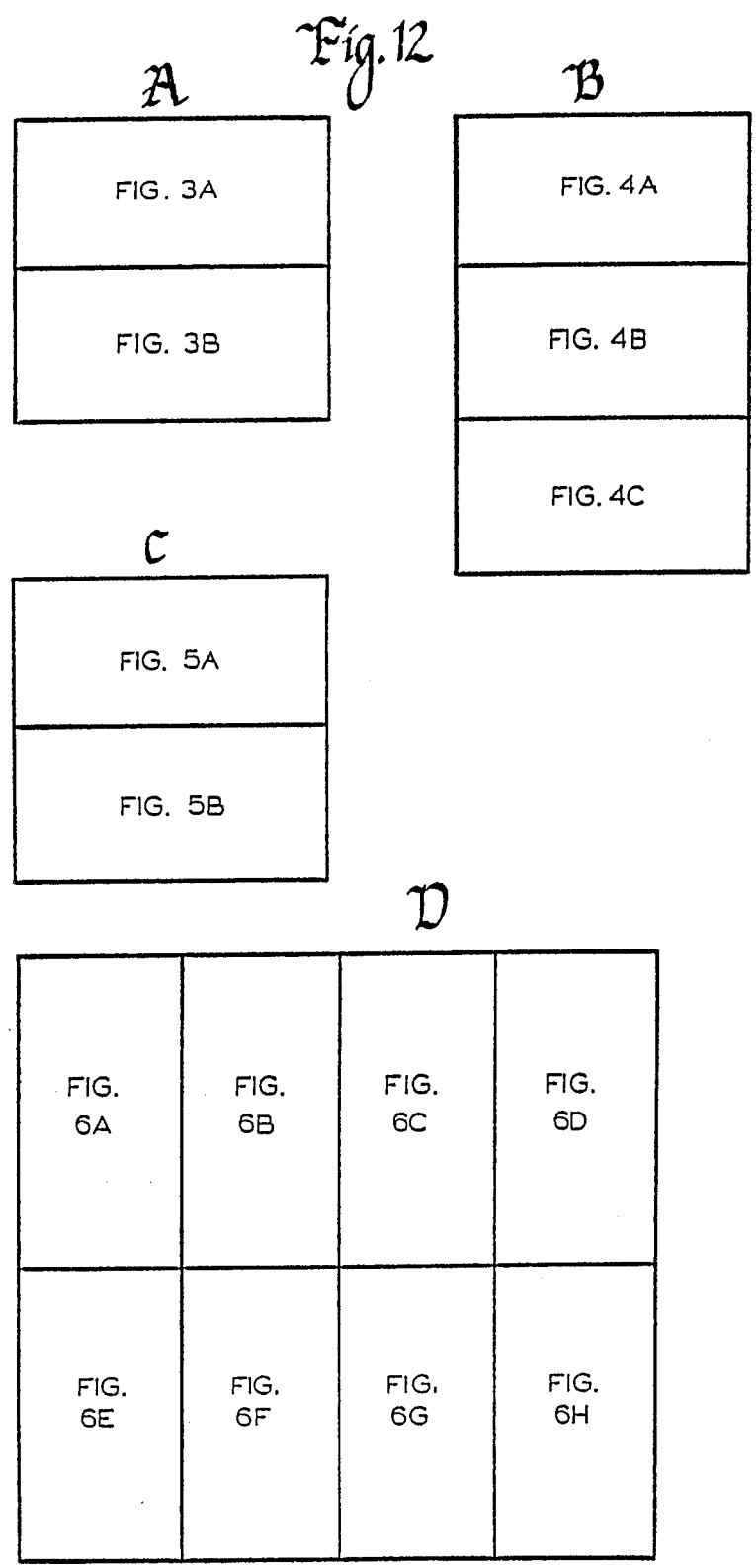

MULTIPLEX SYSTEM FOR AUTOMATIC METER READING

BACKGROUND OF THE INVENTION

The applicant's invention is a method and apparatus for receiving information from telephone lines and more particularly a transceiver method and apparatus for receiving data from a plurality of data transmitters which are coupled to a plurality of telephone lines after interrogating the data transmitters.

The applicant's invention is particularly suited to be used in an automatic utility meter reading system of the type described in co-pending application, Ser. No. 543,372, filed Oct. 19, 1983, for a centerpoint AUTOMATIC METER READING SYSTEM. The applicant's invention is also particularly suited to be used to interrogate and receive data from a meter interface system of the type described in co-pending application, Ser. No. 502,201, filed June 8, 1983, for METER INTERFACE UNIT FOR UTILITY METER READNG SYSTEM.

There have been other systems for receiving data from telephone lines such as one described in U.S. Pat. Reissue No. 26,331 to Dumont et al. Systems of the type of the Dumont invention use the telephone company's leakage testing system to call up individual meter installations. Once a meter installation is called up, it sends the meter information over the telephone line to a central telephone office. However, systems of the type typified by the Dumont invention have several disadvantages which make this type of system undesirable for its intended use.

First, such systems require the use of a telephone company's leakage testing system to be operable and such leakage testing systems can change, requiring an additional large investment in new equipment configured to the new leakage testing system. As well, not all telephone companies have the same type of leakage testing equipment, so that numerous configuations of the meter reading system must be devised to fit the numerous types of leakage testing equipment.

Second, such systems require a power supply, powered either from the power available at the meter installation site or from battery power, for each of its meter installations. This requirement of a power supply makes such systems costly, difficult to service, and makes the systems prone to failures due to common power outages at the installation site.

Third, such systems require a complex synchronous data output on the telephone line. The synchronous output requires that the meter installations send additional sync data over the telephone line. In the event that either the synchronizing data or synchronous meter data is momentarily interrupted by even a short noise pulse, which are quite common on telephone lines, the meter data will be lost.

Another type of system which has been used to send data over a telephone line is found in U.S. Pat. No. 3,922,490 to Pettis. The Pettis invention is a direct current system where several resistances are switched across tip and ring of the telephone line. The current drawn by the several different combinations of resistances connected to the telephone line are sensed at a central telephone office and any of several conditions are thus communicated. Typically, in systems represented by the Pettis invention, the least significant digit pointer of a utility meter makes or breaks a switch depending in which half of its rotation the pointer is presented located. The making or breaking of the switch causes the resistance across the telephone line to change. This change is sensed at the central office and the cumulative count of changes or transitions are totaled and the meter reading determined therefrom.

Of course, the Pettis invention, being a D.C. system, does not relate at all to the applicant's invention which is an alternating current transceiver for receiving data from a plurality of telephone lines.

U.S. Pat. No. 4,180,709 to Cosgrove et al, owned by the assignee of this invention, also describes a system for enabling the monitoring of a plurality of resistances placed across the D.C. telephone line. As with U.S. Pat. No. 3,922,490, this invention relates only to monitoring data conducted by D.C. current changes and does not relate at all to the applicant's invention which monitors A.C. signals from the telephone line.

None of the art described has been able to continuously monitor each of a plurality of telephone lines with a low impedance to the A.C. data signals sent and received without risking damage to the transceiver or the telephone lines; none of the art described has been able to receive data from data transmitters which are powered from the telephone line; and, none of the art described has been able to receive A.C. data which is asynchronous.

Likewise, none of the prior art systems have provisions for automatic compensation for variations in each of the line charcteristics.

None of the prior art systems include provisions for operating to receive utility data on an unterminated telephone line.

Further, none of the prior art systems are capable of commencing simultaneously with a number of closely associated pairs of telephone lines at levels adequate for reliable data communication but low enough to prevent interference.

SUMMARY OF THE INVENTION

The present invention is a transceiver method and apparatus for receiving data from a plurality of data transmitters which are coupled to a plurality of telephone lines after interrogation and prompting the data from the plurality of data transmitters on an unterminated line. The present invention comprises a means for coupling the receiver device to the plurality of telephone lines; means for sending at least one distinct interrogation signal over each of the coupled telephone lines; means for receiving an alternating current representation of the data over the coupled telephone lines from each of the plurality of data transmitters; and, means for converting each of the alternating current representations of the data into digital representations.

The transceiver of the present invention may also include means for storing at least one of the digital representations in a digital representation storage system. Also, the transceiver may include means for multiplexing each of the distinct interrogation signals from a single output line to a particular one of the plurality of telephone lines. This multiplexing means may be supplemented with a means for multiplexing the received alternating current representations from the plurality of coupled telephone lines to a single input line.

All apparatus at the subscriber's station is powered over its telephone line thereby eliminating any need for a local power source at the subscriber's station for the system to operate. Typically, the data from the data transmitters is a series of pulses of a single audio tone and the pulses have at least two different pulse periods. The means for converting the alternating current representation into the digital representation comprises means for filtering the series of pulses of a single audio tone received at the single input line; means for deriving a series of positive voltage pulses which are proportional in pulse period duration to the pulse period duration of the series of pulses of the single audio tone; and, means for deriving a series of zero voltage transitions which are proportional in duration to the duration of the transition periods between the pulse periods of the series of pulses of the single audio tone.

The transceiver may include a means for disregarding positive voltage pulses received from the telephone lines during any of the transition periods when the positive voltage pulses have a duration corresponding to a predetermined positive noise pulse period so that the positive noise pulses on the telephone lines do not destroy the ability of the converted digital representations to reflect the proportional pulse periods of the series of pulses of the single audio tone.

The transceiver may similarly include means for disregarding losses in continuity of the positive voltage pulses derived from the series of pulses of the single audio tone during any of the positive voltage pulse periods when the losses in continuity of the positive voltage pulses have a duration corresponding to a predetermined negative noise pulse period so that negative going noise pulses on the telephone line do not destroy the ability of the converted digital representations to reflect the proportional pulse periods of the series of pulses of the single audio tone.

The transceiver's coupling to the telephone lines may include protector circuit means for continuously coupling each of the telephone lines to the transceiver which also substantially prevents damage to the transceiver caused by high voltage conditions on the telephone lines and prevents damage to the telephone lines from short circuit conditions in the transceiver.

The data from the data transmitters can be utility usage data sent over a pulse width modulated single audio tone. The transceiver can convert the pulse width modulated single audio tone into a meter identification number and usage number by employing a means for determining the relative pulse periods of the series of pulses of the single audio tone; means for determining the series of pulse periods which represent a sentinal character from the relative pulse periods; means for comparing the relative pulse periods found in at least one of the distinguishable sentinal characters to the series of pulse periods of the single audio tone, and thus defining the plurality of character periods for the series of the single audio tone; means for producing digital value signals for each of the character values in the utility usage figure and meter identification figure by comparing the relative pulse periods of the series of pulses of the single audio tone during each of the character periods with a plurality of predetermined patterns of relative pulse periods corresponding to the possible digit values found in a single character period; and, means for storing at least a portion of the digital value signal in a digital value signal storage system.

The data from the utility usage monitors may also be in the form of a dual tone for each digit between 0 and 9 together with framing sentinels. This can be decoded into a serial stream of digital signals with each digital signal representing one digit of the reading from the utility usage monitor.

The transceiver can respond to various commands from an external digital interface device. Such commands can be for communicating stored digital value signals or stored digital representations to the external digital interface device. Also, the transceiver can respond to trouble-shooting commands which require a particular, non-default interrogation voltage level, duration and frequency. The trouble-shooting commands may also set a particuar non-default no-response dropout time period for any of the telephone lines.

It is also possible employing this invention for the transceiver to communicate information regarding whether a non-responsive data transmitter has been made to respond or not after the change in the voltage level, duration and frequency of the interrogation signal.

The subscriber station data transmitter is powered over the telephone line and does not terminate the line at any time. Therefore, the subscriber's station is fully operational to call or be called at all times and will respond to either dialing or ringing even during a period of data transmitter interrogation.

The transceiver includes means for detecting each subscriber's line condition with respect not only to an OFF HOOK condition but also variations in its impedance and leakage. Responsive to the detection of change in line characteristic as to impendance and leakage, the system correspondingly adjusts the level of interrogation signals sent over the line for optimum signal level with minimum transmitted power.

Responsive to detection of line impedance or leakage outside of acceptable standards, the system registers a faulty line indication.

Responsive to detection of OFF HOOK condition, the system disables data transmission without interference with normal use of the telephone line.

BRIEF DESCRIPTION OF THE DRAWINGS

FIGS. 3a and 3b are an electrical schematic diagram of the computer line buffer of the present invention;

FIGS. 4a, 4b and 4c are an electrical schematic diagram of the master line driver/receiver of the present invention;

FIGS. 6a, 6b, 6c, 6d, 6e, 6f, 6g and 6h are an electrical schematic diagram of the portion of the multiplexer device of the present invention excluding the processor circuit;

FIG. 9 is a graphical representation of the process of decoding the pulse width modulated signals from the meter interface devices;

FIGS. 10a and 10b are a graphical representation of a flow chart of the command codes from the computer to the MUX devices;

FIGS. 12a, and 12b, 12c and 12d are layout drawings for FIGS. 3a–b, FIGS. 4a–c, FIGS. 5a–b, and FIGS. 6a–h.

DETAILED DESCRIPTION OF THE INVENTION

The present invention is a transceiver device and method for sending out a plurality of interrogation signals over the telephone lines, and thereafter, receiving data from a plurality of interrogation signal responsive data transmitters coupled to the telephone lines.

Figure 1:
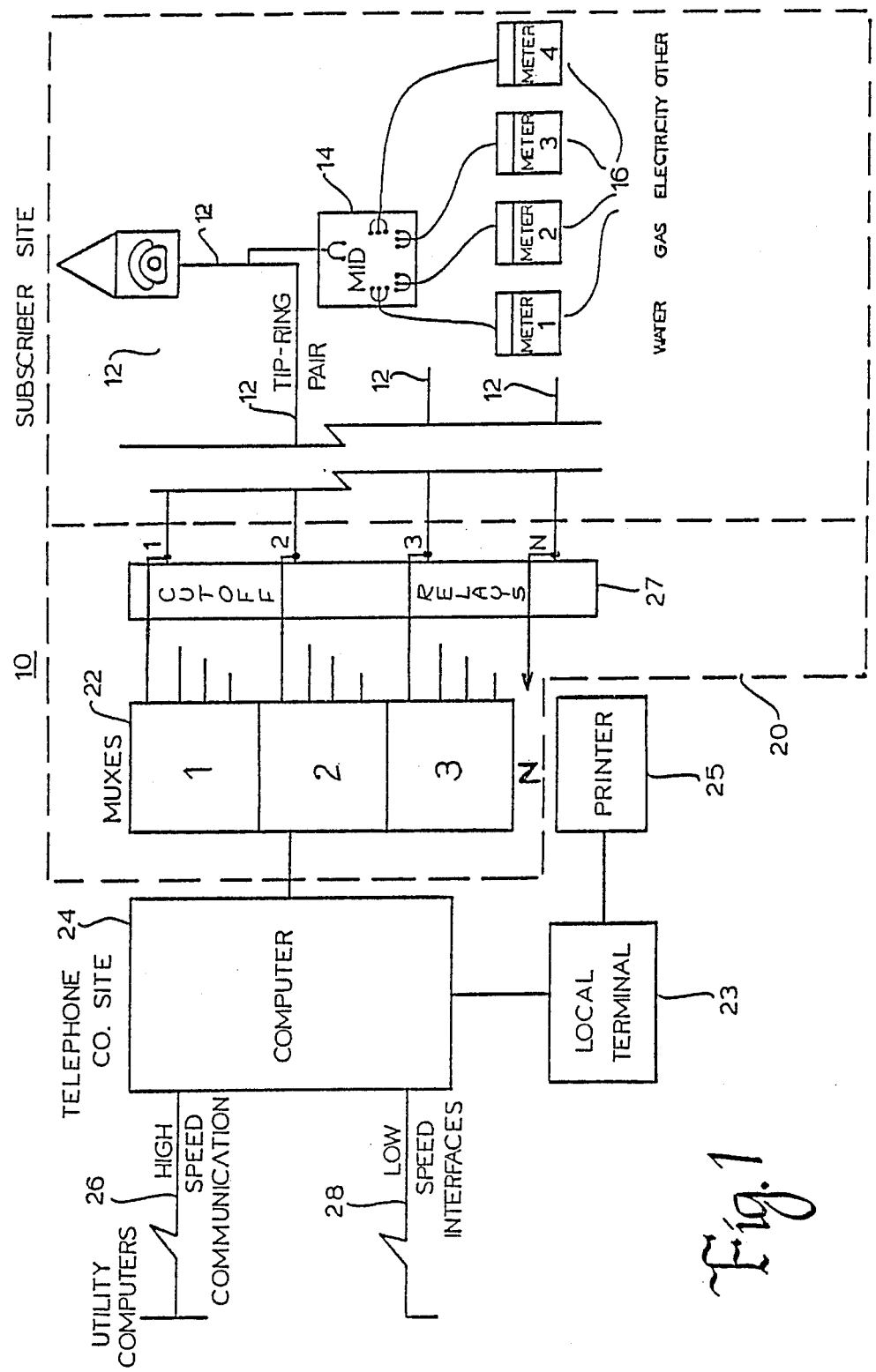
FIG. 1 is an electrical block diagram of an automatic meter reading system for which the present invention is particularly suited.

Referring to FIG. 1, although the present invention may be used in numerous applications involving data communication using telephone lines, the preferred embodiment of the present invention is particularly suited for use in an automatic meter reading system 10. This automatic meter reading system 10 is of the type described in co-pending application for A CENTERPOINT AUTOMATIC METER READING SYSTEM, identified above. The multiplexer system 20 of the preferred embodiment of this invention is typically located in a central office of a telephone company. In this central location, a plurality of telephone line pairs are accessable as paths for sending and receiving the plurality of meter readings.

The subscriber's site telephone line 12 typically has at least one meter interface device 14 coupled to it. The meter interface devices 14 are of the type described in co-pending application for A METER INTERFACING DEVICE FOR AN AUTOMATIC METER READING SYSTEM, identified above. Each of the meter interface devices 14, responsive to receiving a particular distinct interrgation signal from one of several multiplexer (MUX) devices 22, will send utility usage data from at least one utility monitoring device 16 over the telephone line 12 to which it is coupled.

The preferred embodiment of the multiplexer system 20 of the present invention has a plurality of MUX devices 22 coupled to all of the telephone lines 12, typically after the cut-off relays 27. Each telephone line 12 typically has at least one meter interface device 14. Thus, data sent from each of the meter interface devices 14 is received by the MUX devices 22. The received data is converted into digital signals which represent the plurality of usage figures and meter identification figures sent from the meter interface devices 14. The digital signals are typically communicated to a computer 24 which may compile billing information and/or send the digital signals directly to other computers (not shown) located at the utility company over high speed line 26. However, it must be noted that any parallel digital interfacing device may be used such as a parallel line converted teletype or even a switch box with 16 switches because each MUX device 22 is capable of receiving at least one utility meter reading in parallel digital form and communicating the reading to any parallel digital interfacing device. Low speed lines 28 may also be installed to communicate the compiled billing information or digital signals to a storage system (not shown) in the telephone company itself. The computer 24 may also have a local terminal 23 and printer 25 for local access to the computer's 24 programming.

THE PREFERRED EMBODIMENT

Figure 2:
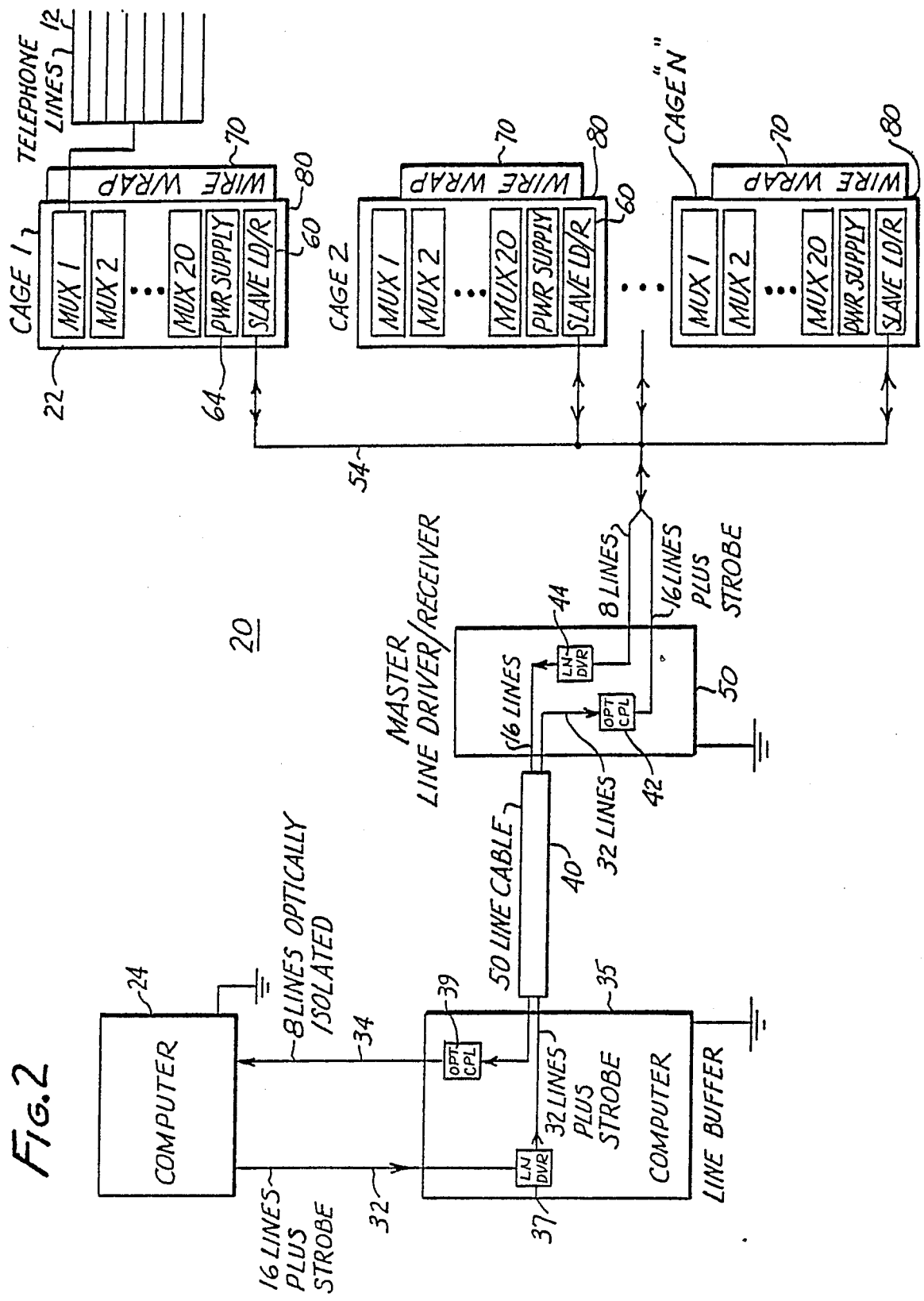
FIG. 2 is an electrical block diagram of the preferred embodiment of the present invention showing several multiplexers controlled by a computer.

Referring to FIG. 2, the preferred embodiment of the multiplexer system 20 of the present invention typically has a computer line buffer 35 which can interface the multiplexer system 20 to a computer 24 or other parallel digital interfacing and storage device. The computer line buffer 35 typically interfaces a 16 bit plus a strobe out-going line 32 from the computer 24 and an 8 bit incoming line 34 to the computer 24. The 16 bit outgoing line 32 carries control signals which, among other tasks, tell the MUX devices 22 to interrogate a particular meter interface device 14 of FIG. 1 coupled to a particular subscriber's telephone line 12. The 16 bits are broken down first into 8 MUX select bits which allow the computer 24 to access 256 different MUX devices 22. Each MUX device 22 can typically receive data from 50 double-ended connections, i.e. across tip and ring conductors, to telephone lines 12 or 100 single-ended connections, i.e. to tip or ring and ground, to telephone lines 12. An additional 7 bits of the 16 bit signals from the computer 24 are typically used for individual telephone line select codes. The 100 telephone lines single endedly connected to each MUX device 22 can, therefore, be individually accessed and controlled by the computer 24 by selecting the proper telephone line select code in the 7 telephone line select bits. Thus, it can be seen that computer 24 can access up to 25,600 telephone lines in the preferred embodiment of the present invention using 256 MUXES 22. As well, each telephone line 12 may have a plurality of meter interface devices 14 coupled to it, and each meter interface device 14 can have a plurality of utility usage monitors 16 coupled to it. Since a plurality of distinct interrogation signals can be sent over every coupled telephone line 12, well over 100,000 individual meter readings can be read by the preferred embodiment of the multiplexer system 20 of the present invention with the same 256 MUXES 22.

Since every MUX device 22 can be connected to a typical maximum of 100 telephone lines, there are 28 different telephone line select codes left which can be used as control codes to the processor circuit 120 (shown in FIG. 8) of each of the MUX devices 22. The remaining 1 bit of the 16 bits sent from the computer 24 is used as a MUX reset command which will cause the software in any particular MUX device 22 to re-initialize and start its appointed rounds all over again.

Since the computer 24 is typically located some distance away from the cages 80 which house the MUX devices 22, the signals to and from the computer 24 may have to travel over a relatively long distance. To prevent loss of signals and increased noise susceptability over the long distance, each of the 16 bit out-going line 32 and 8 bit incoming line 34 are amplified before entering the cable 40 and optically coupled at its intended receiving point. The 16 bit signals plus the strobe on the 16 bit out-going line 32 are amplified and driven over 34 lines through line driver stage 37 and optically coupled in optical coupler stage 42 in the master line driver/receiver 50. The result after being optically coupled is a single 16 bit line plus a strobe line. The 8 bit lines from the slave line driver/receivers 60 are line amplified and driven over 16 lines by line driver stage 44 in the master line driver/receiver 50 and optically coupled in optical coupler stage 39 in the computer line buffer 35. Thus, the signals to and from the computer 24 are kept free from loss and noise caused by the travel over the cable 40.

Typically, each cage 80 can house twenty MUX devices 22 along with a power supply 64 and slave line driver/receiver 60. The power supply 64 can be of any conventional design which will supply plus and minus 10 volts, 5 volts, 7 volts, 12 volts and 15 volts. There can be as many cages 80 as will contain up to 256 separate MUX devices 22. However, since each cage 80 shares a single I/O line 54 from the master line driver/receiver 50, in order to drive the 20 MUX devices 22 in each cage 80, the signal levels must be boosted. The boosting of the signal levels is done in each of the slave line driver/receivers 60. Typically, the buffers in the slave line driver/receivers 60 are high impedance input and low impedance output power amplifiers which can satisfactorily drive the signals to and from the twenty MUX devices 22 in each cage 80.

Figure 3A:
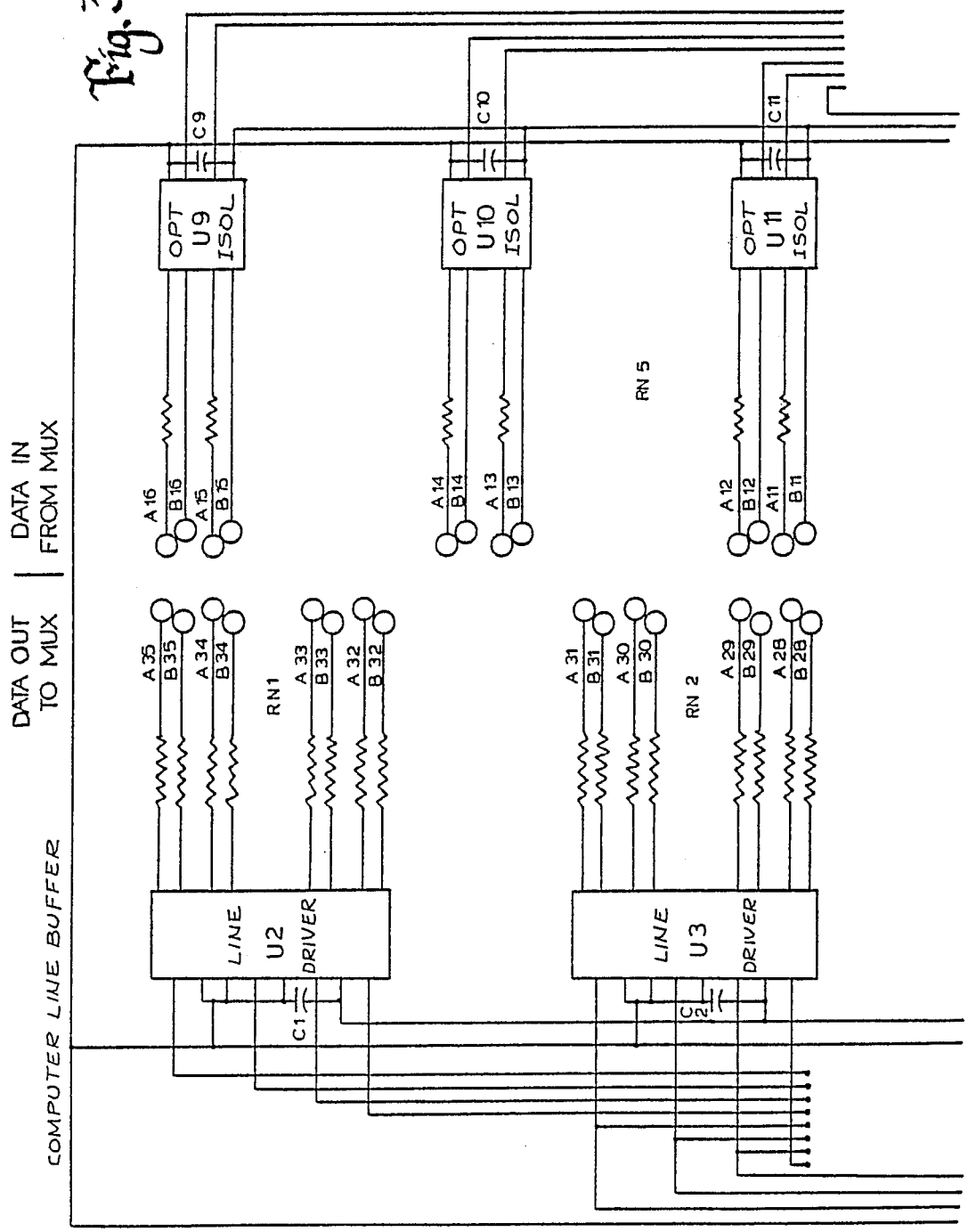

Typically, each cage 80 also has a wire-wrap section 70 which allows a standardized MUX device 22 to be installed in each cage 22 and signals passing therethrough and are amplified by line drivers U5 appearing in FIGS. 3A and 3B and sent over the 32 lines designated as IN1–IN32. The strobe signal from the computer 24 comes in through jack J2 of FIG. 3B at strobe line 46. The strobe signal is sent through multivibrator U6 and line driver U7 of FIG. 3B to cable 40 of FIG. 2 as lines IN33 and IN34. The inputted signals from the line driver stage 44 in the master line driver/receiver 50, shown in FIGS. 2 and 4a, 4b, 4c and 4d are received at lines OT13–OT16 of FIG. 3A. These inputted signals are then optically coupled to the computer input jack J2 through dual opto-isolators U9, U10, U11 and U12. The signals appearing on lines IN17–IN34 and OT1–OT16 are sent over cable 40, shown in FIG. 2, to the master line driver/receiver 50.

Alarm circuit 75 of FIG. 3B in the computer line buffer 35 is intended to warn those in a telephone company office of computer malfunctions and will either sound an alarm in the telephone office through speaker SP1 and/or a telephone company alarm at a remote location through relay RLY1.

Master Line Driver/Receiver

Figure 4B:
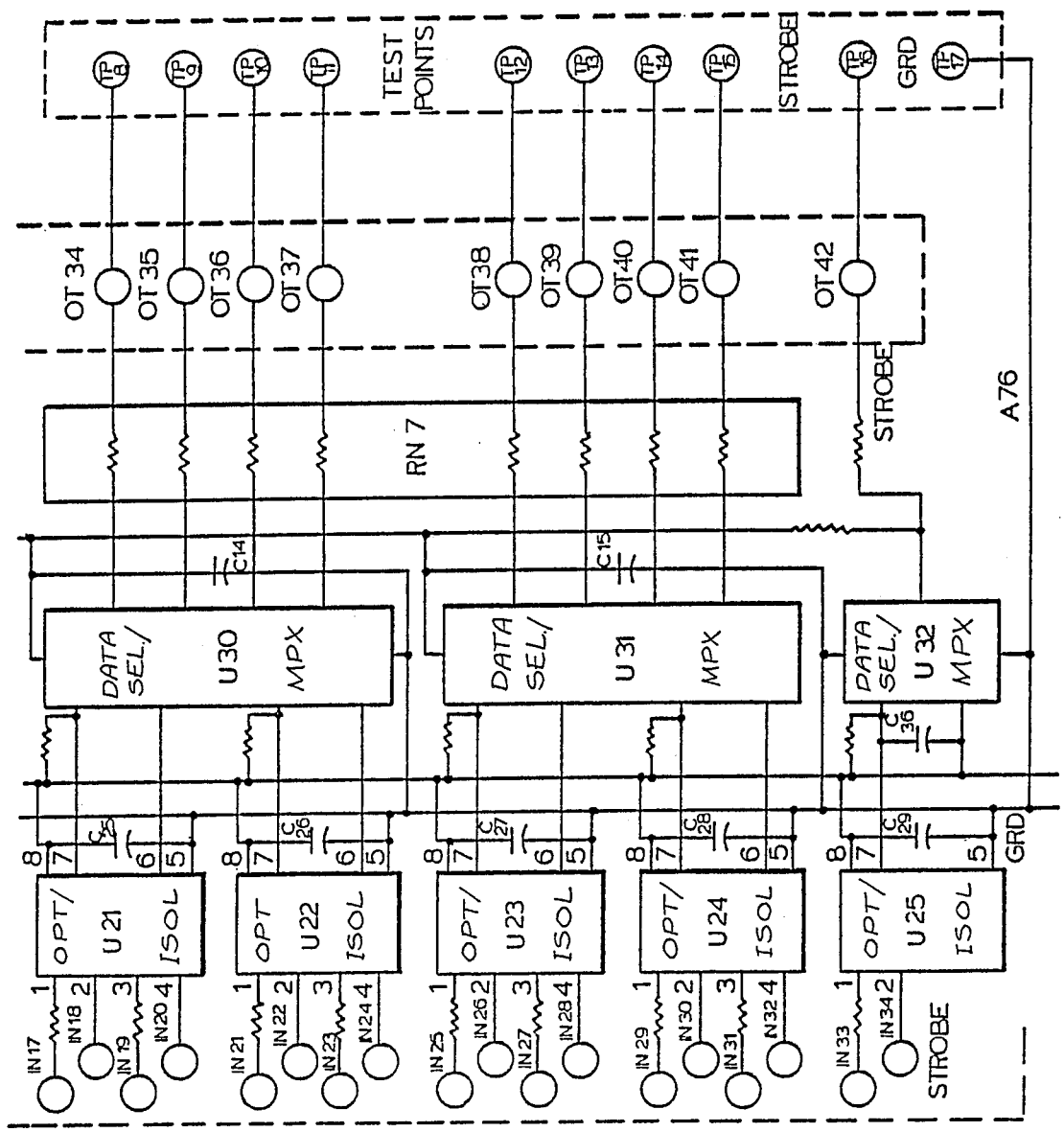

Referring to FIGS. 4a, 4b and 4c, the master line driver/receiver 50 is seen. The 32 data lines IN1–IN32 plus the strobe lines IN33 and IN34 from the computer line buffer 35 are optically coupled by opti-isolators U17–U25 and driven into 16 output lines plus the strobe line buffer OT26–OT42 through data selector/multiplexers U28–U32. The 8 input lines IN40–IN47 from the slave line driver/receivers 60 are driven on 16 lines OT1–OT16 to the computer line buffer 35 by line drivers U26 and U27. Activity on some of the incoming and outging lines may be indicated by the LED's D3–D18 as an aid to troubleshooting. Also, test points TP8–TP17 give easy access to certain of the output lines OT34–OT42 and ground A76. The master line driver/receiver 50 is powered by a 5 volt supply through connectors A75 and ground A76.

Slave Line Driver/Receiver

Figure 5A:
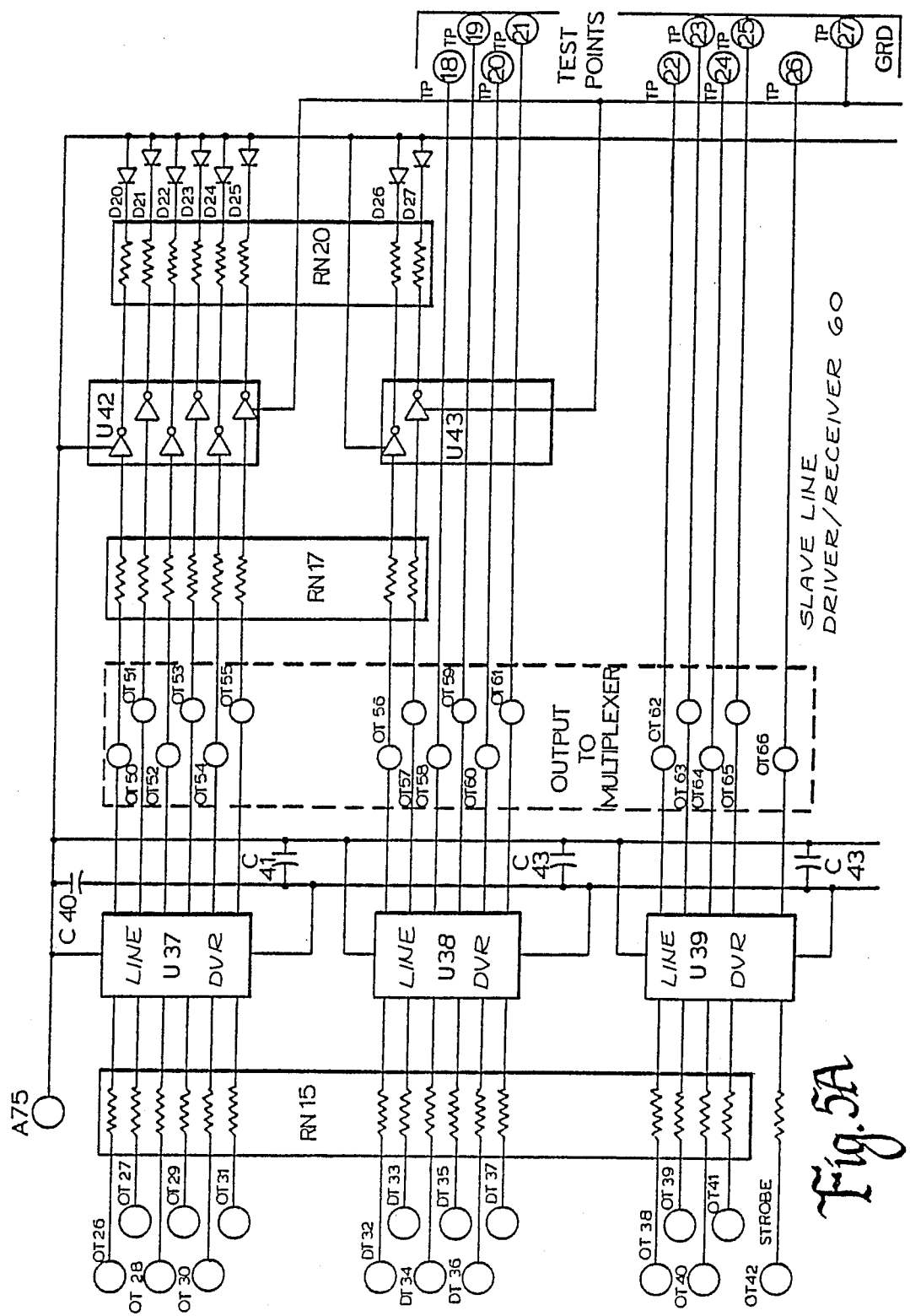
FIGS. 5a and 5b are an electrical schematic diagram of the slave line driver/receiver of the present invention.
Figure 5B:
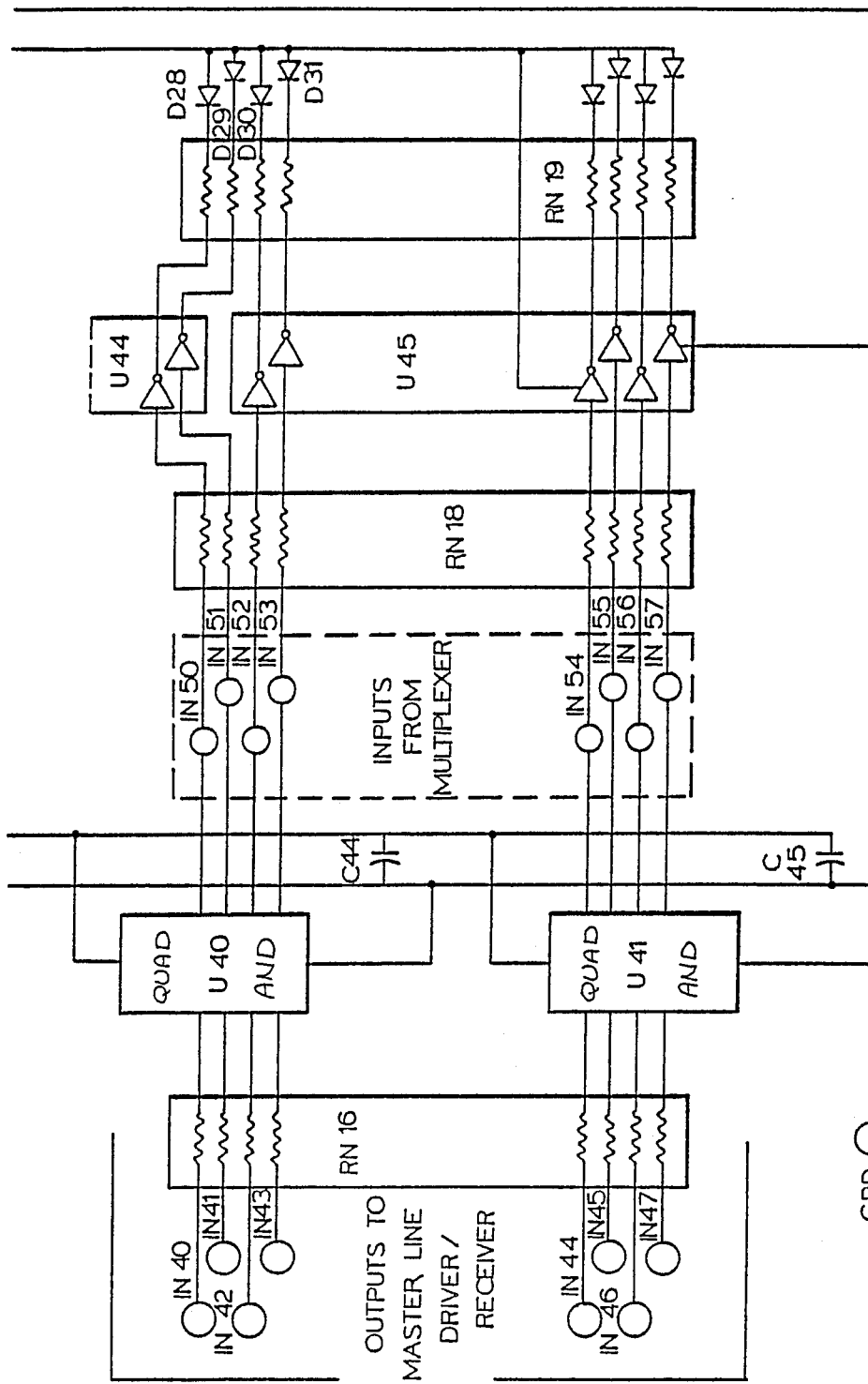

Referring to FIGS. 5a and 5b, the slave line driver/receiver 60 can be seen. The output lines OT26–OT42 are amplified through line drivers U37–U39 and sent to the MUX devices 22 in each cage 80 through output lines OT50–OT66. Input lines IN50–IN57 from the MUX devices 22 in the cage 80 are driven by Quad AND gates U40 and U41 to the master line driver/receiver 50 over lines IN40–IN47. Activity on certain of the lines OT50–OT66 and IN50–IN57 may be seen on LED's D20–D35 through inverting amplifiers U42, U43, U44 and U45.

The MUX Device

Figure 6A:
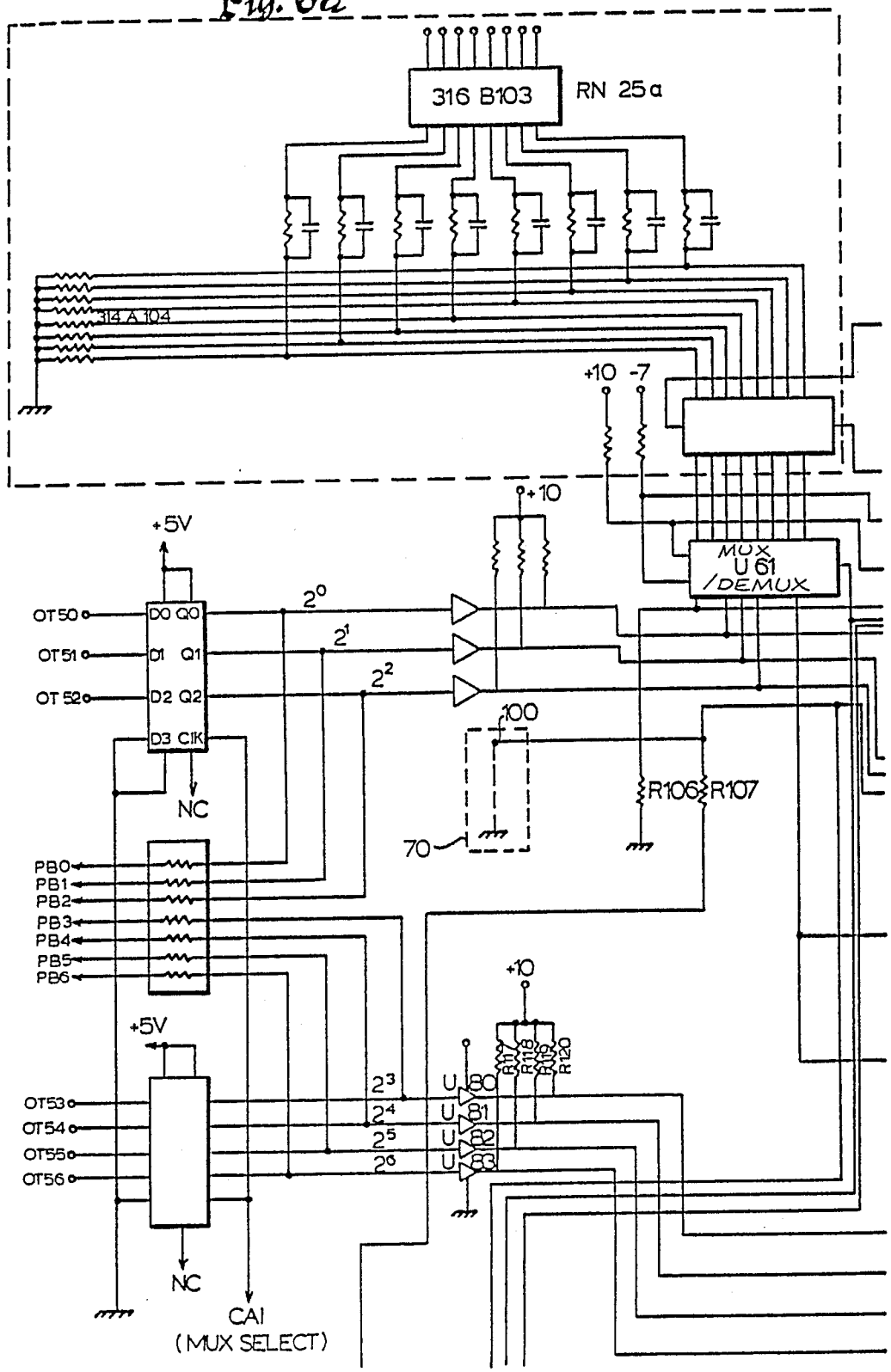
Figure 6B:
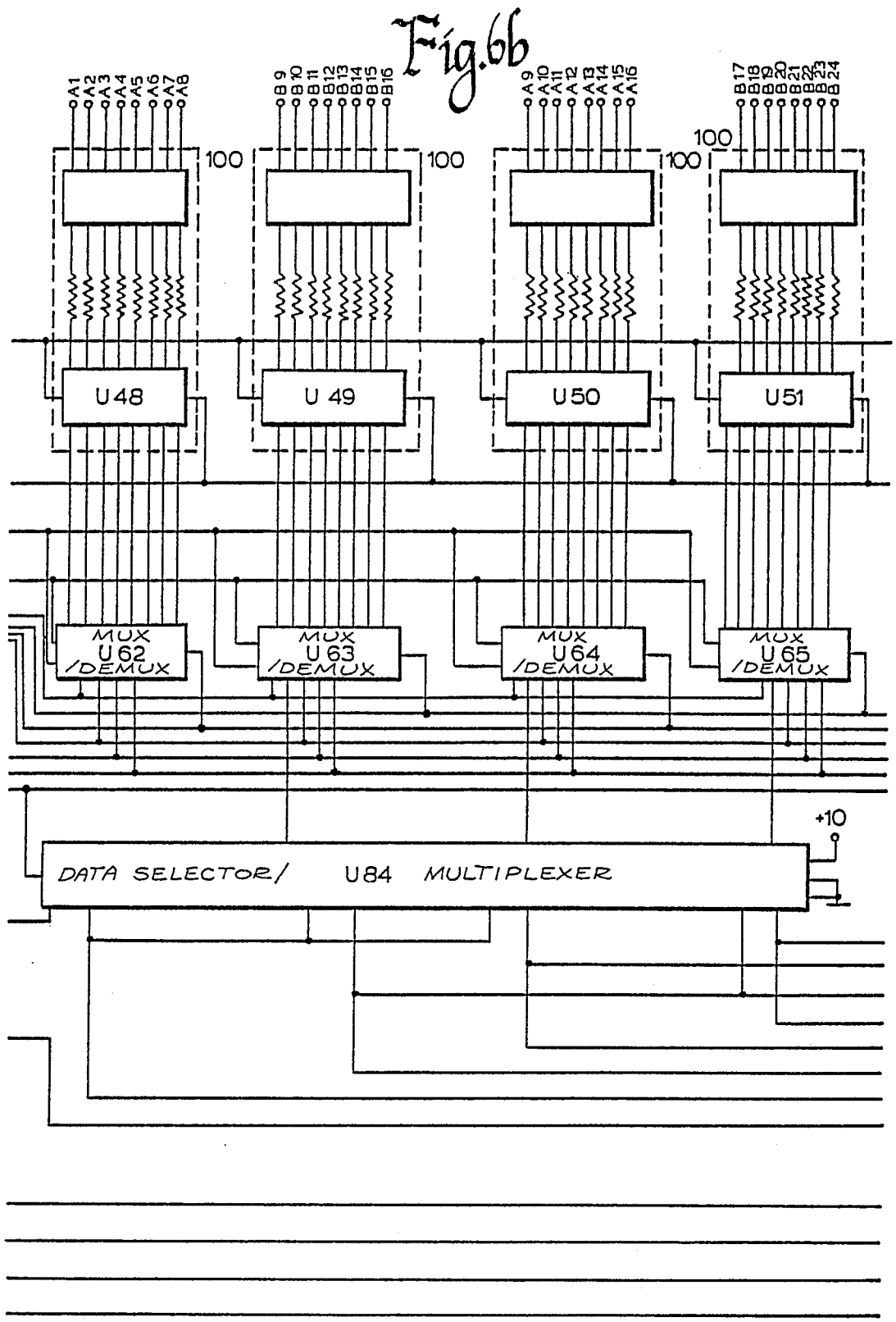
Figure 6C:
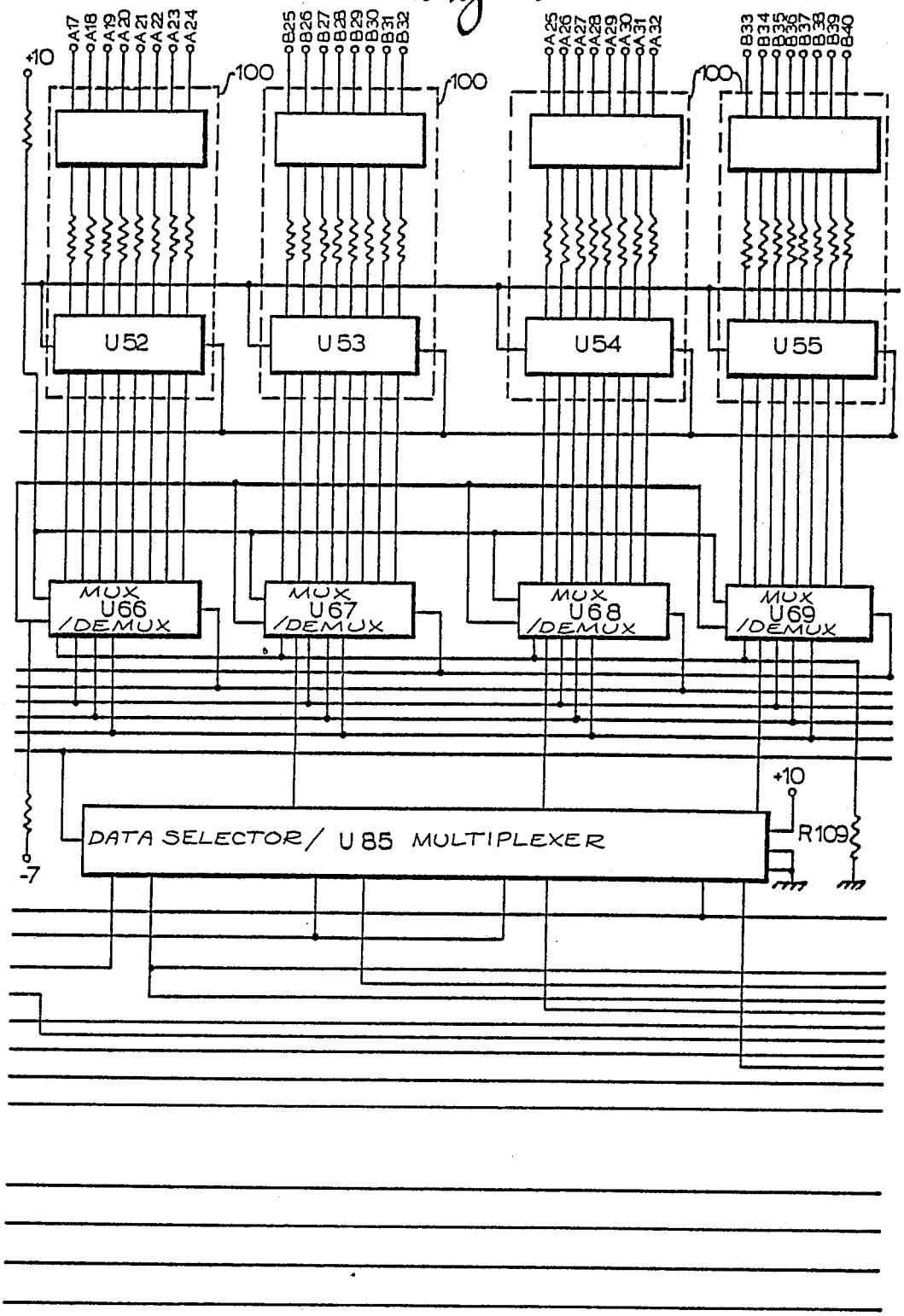
Figure 7A:
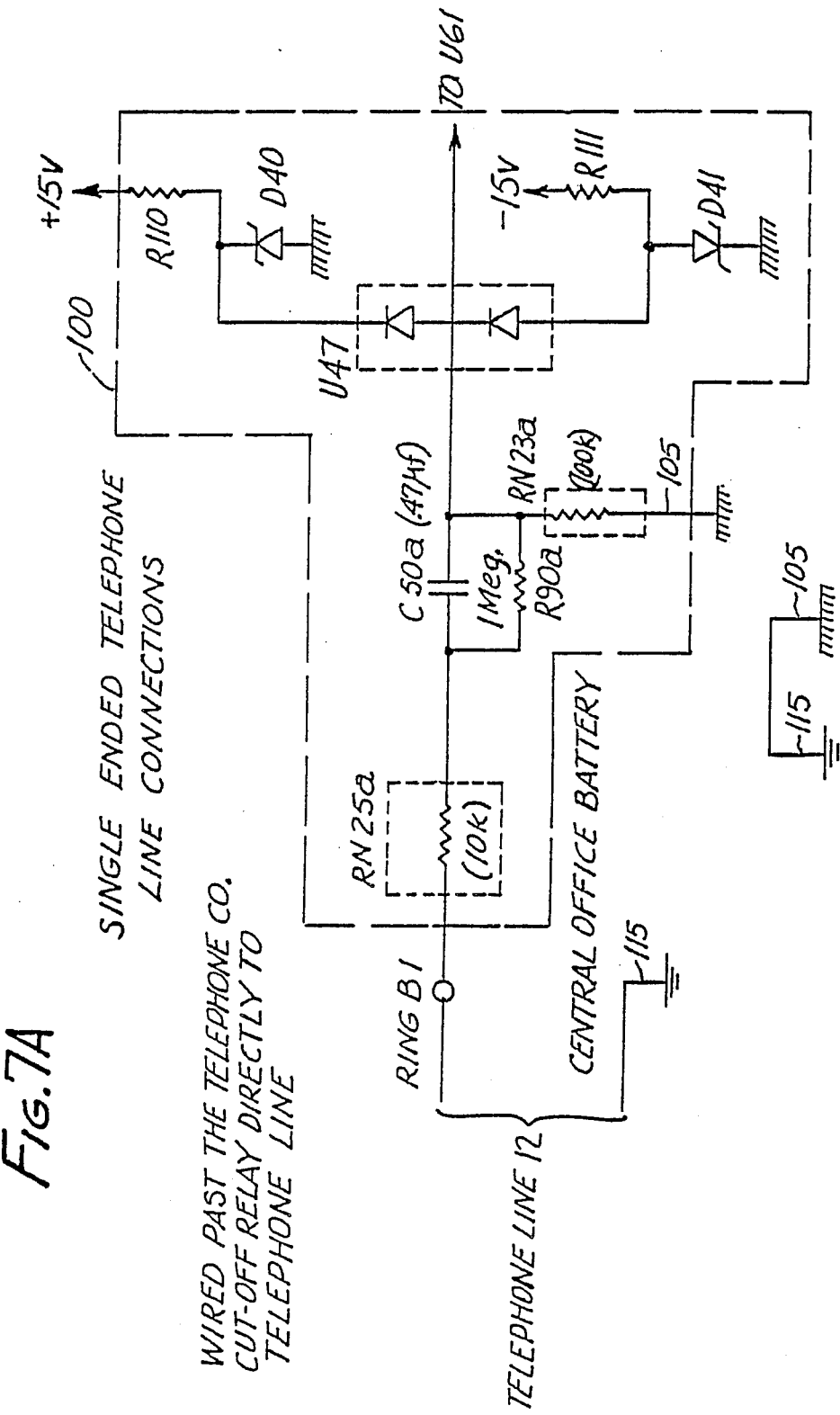
FIGS. 7a and 7b are electrical schematic diagrams of the input circuit of the multiplexer device of the present invention.
Figure 7B:
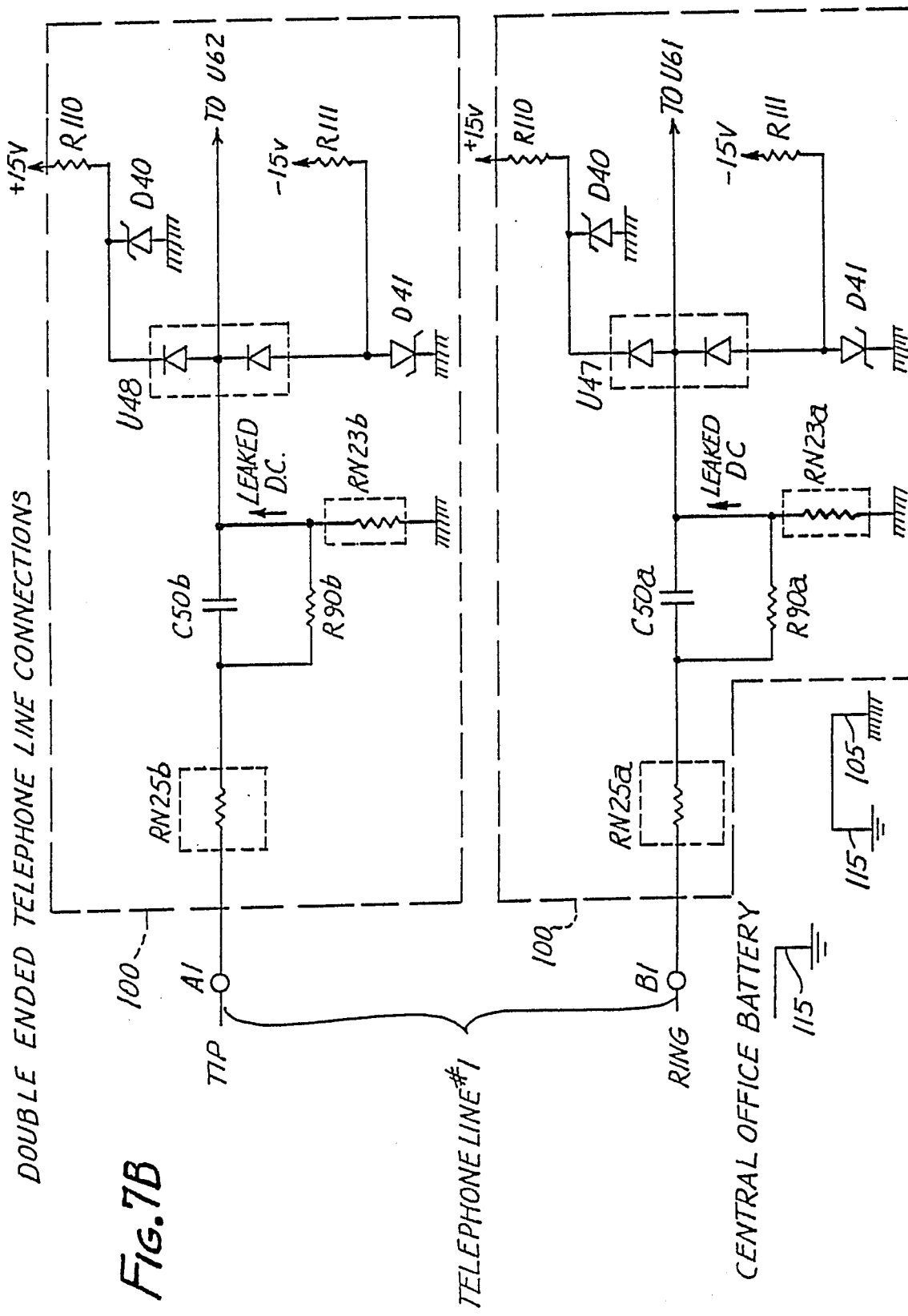

Referring to FIGS. 6a, 6b, 6c, 6d, 7a and 7b, the input circuits 100 of FIGS. 6a, 6b, 6c and 6d are shown in greater detail in FIGS. 7a and 7b. FIG. 7a shows the input/output circuit 100 connected in the single ended configuration.

The input/output circuit 100, whether it is to be connected in the single or double ended configuration, has as its objective, a continuous coupling of the MUX device 22 to the plurality of telephone lines 12, the coupling having the following characteristics: (1) appearing as a high resistance path to D.C. current across the connected telephone line, (2) appearing as a low impedance path from the telephone line into the MUX device 22 for alternating current between about 300 Hertz and 20,000 Hertz in frequency, (3) allowing a small D.C. leakage current to pass into the MUX device 22 so that an OFF-HOOK condition of the telephone line 12 can be sensed, (4) providing a low impedance path for interrogation signals from the MUX device 22 to the telephone line 12, and (5) protecting the MUX device 22 from damage caused by voltage spikes commonly found on telephone lines.

FIG. 7a shows the telephone line 12 ring line connected to the B1 input line and central office battery line connected to an analog ground 115 which is typically connected to the MUX digital ground 105 as shown. Line B1 has a resistor which is part of resistor pack RN25a in series with a capacitor C50a. The capacitor C50a is paralleled by a discrete resistor R90a. The side of capacitor C50a which is not common with the resistor in resistor pack RN25a is connected to a resistor in resistor pack RN25a, which, in turn, is connected to ground 105.

The telephone line 12 is wired to line B1 and ground 15 preferrably past anv telephone company cut-off relay 27, of FIG. 1, and directly to the telephone line 12 so that when the telephone line 12 becomes OFF-HOOK, the MUX device 22 is still connected to the telephone line 12. The D.C. component of the telephone line 12 sees a high resistance path between the central offfice battery line and the ring line (typically in excess of 1 megohm) which will not interfere with the operation of the telephone line. If, in the worst case, capacitor C50a and the entire MUX device 22 were to short to ground 105, the telephone line would still see the resistor in resistor pack RN25a which is typically of a value of 10 kilohms. The 100 kilohms value would not interfere with the telephone line's operation by appearing as an OFF-HOOK condition since resistances below 6 kilohms are required to establish an OFF-HOOK condition in most telephone lines.

A small amount of D.C. current will leak through the voltage dividing resistor R90a and the resistor from resistor pack RN23a. Since the typical value of resistor R90a is 1 megohm and the typical resistance of resistor from resistor pack RN23a is 100 kilohms, the voltage at their common point is approximately divided by a factor of 10. (The resistor in resistor pack RN25a is not significant enough to change the factor.) The normal ON-HOOK, non-ringing voltage between the tip and ring of the telephone line 12 is 48 volts; therefore the voltage appearing at the common point of resistor R90a and resistor pack RN23a would be in the range of 5 volts. This 5 volts will drop dramatically when the telephone line 12 becomes OFF-HOOK, and thus the OFF-HOOK condition can be sensed from this drop in voltage.

Alternating current signals from the telephone line 12 in the range between about 300 Hertz and 20,000 Hertz in frequency will see a 10 kilohm resistor RN25a and a low impedance drop through capacitor C50a and continue on unabated to the input of bi-directional multiplexer/demultiplexer U61 of FIG. 6a. The interrogation signal conducted from multiplexer/demultiplexer U61 will also see a low impedance path through capacitor C50a because the typical interrogation signal frequency is above 500 Hertz. However, the ringing signal on the telephone line which is typically 20 Hertz in frequency will see a high impedance through capacitor C50a which will effectively block the reception of the ringing signal by the multiplexer 22.

Any voltage spikes appearing on the telephone line 12, whether negative going or positive going, will be conducted as an alternating current signal through capacitor C50a. To prevent damage to the MUX device 22, the back-to-back diode array U47 is used to conduct the negative or positive going spikes to the Zener diodes D40 or D41 which act to dissipate the spike before it reaches the input of multiplexer/demultiplexer U61.

Each of the input lines B1-B50 and A1-A50 of FIGS. 6a-d, relative to digital ground 105, will connect a single discrete telephone line 12 to the mutiplexer/demultiplexers U61-U73 of FIG. 6a when the telephone lines are of the single ended type.

It can be seen that the novel input/output circuit 100 of the present invention has achieved a continuous link with a telephone line 12 without interfering with the operation of the telephone line 12 or damaging the MUX device 22. As well, a low impedance path for alternating current signals in either direction is continuously in existance, a high resistance path for the D.C. component is continuously in existance, and a small amount of D.C. voltage is continuously leaked to the MUX device 22 to sense an OFF-HOOK condition.

Referring to FIG. 7b, the connection of a double ended telephone line 12 is seen. The tip lead is connected to input line A1 and the ring lead is connected to B1, and, the central office battery line is connected to analog ground 115. The same action of the input/output circuit 100 previously discussed is in effect with the double ended connection. The difference between the double ended connection and the single ended connection is that, in the double ended connection, two lines of the mulitplexer/demultiplexers U61-U73 are used to connect the telephone to the MUX device 22. As will be described in more detail, the multiplexer/demultiplers U61-U73 of FIG. 6 must be told which lines to multiplex or demultiplex. In the single ended connection, the multiplexer/demultiplexers U61-U73 must be told to multiplex or demultiplex a single line, and for the double ended connection, they must be told to multiplex or demultiplex two lines for each telephone line 12 selected.

Referring again to FIGS. 6a, 6b, 6c, 6d, 6e, 6f, 6g and 6h, the MUX device 22 with the exception of the processing circuit 120 is seen. The computer 24 of FIG. 2, under the control of its software program, selects a particular MUX device 22 of the up to 256 MUX devices 22 by sending, in the 16 bit command, an 8 bit select code. The 8 bit select code is received in the MUX device 22 through output lines OT59-OT66. The 8 bit select code is received by two 4 bit comparators U115 and U116 of FIG. 6. The comparators U115 and U116 are responsive to the high or low conditions on input lines A61-A67 which are hardwired through hardwire circuit 70 in the MUX cage 80.

As can be seen, because input line A63 is hard wired high an input lines A61, A62 and A64-A67 are hard wired low, and because input line A63 corresponds to the first of the 8 bit select code, the hardwiring in hardwire circuit 70 has made this MUX device respond to the select code for 0000001 or MUX number 1. Whenever the 16 bit control code from the computer 24 has bit $2^8$ high and bits $2^9$-$2^{15}$ low, this MUX device 22 will know that it has been selected to do a particular task which is specified in the remaining of the 16 bit control code. However, it must be noted that any of the 16 bits from the control code may be used to make the MUX select and the fact that the last 8 bits of the 16 bit control code are used here for MUX select merely a matter of choice.

As previously discussed, the telephone lines 12 are connected to the 13 input circuits 100. The A.C. and D.C. signals conducted to and from the telephone lines 12 are multiplex or demultiplexed in multiplexer/demultiplexers U61-U73 of FIGS. 6a, 6b, 6c and 6d. The telephone line 12 to be conducted through a particular multiplexer/demultiplexer U61-U73 is chosen by by the computer 24 of FIG. 2 in the preferred embodiment of the invention. The selection of which line is to be interrogated and the utility usage figure read from is done by bits $2^0$-$2^6$ coming into the MUX device 22 over output lines OT50-OT56 of FIG. 6a from the slave line driver/receiver 60 of FIG. 2. The line select code in the first 7 bits of the 16 bit control code is passed to the multiplexer/demultiplexers U61-U73 and data selector/multiplexers U84-U86 and decoder/multiplexer U87 through buffers U76-U83; and, thus, a particular telephone line 12 is selected.

Figure 8:
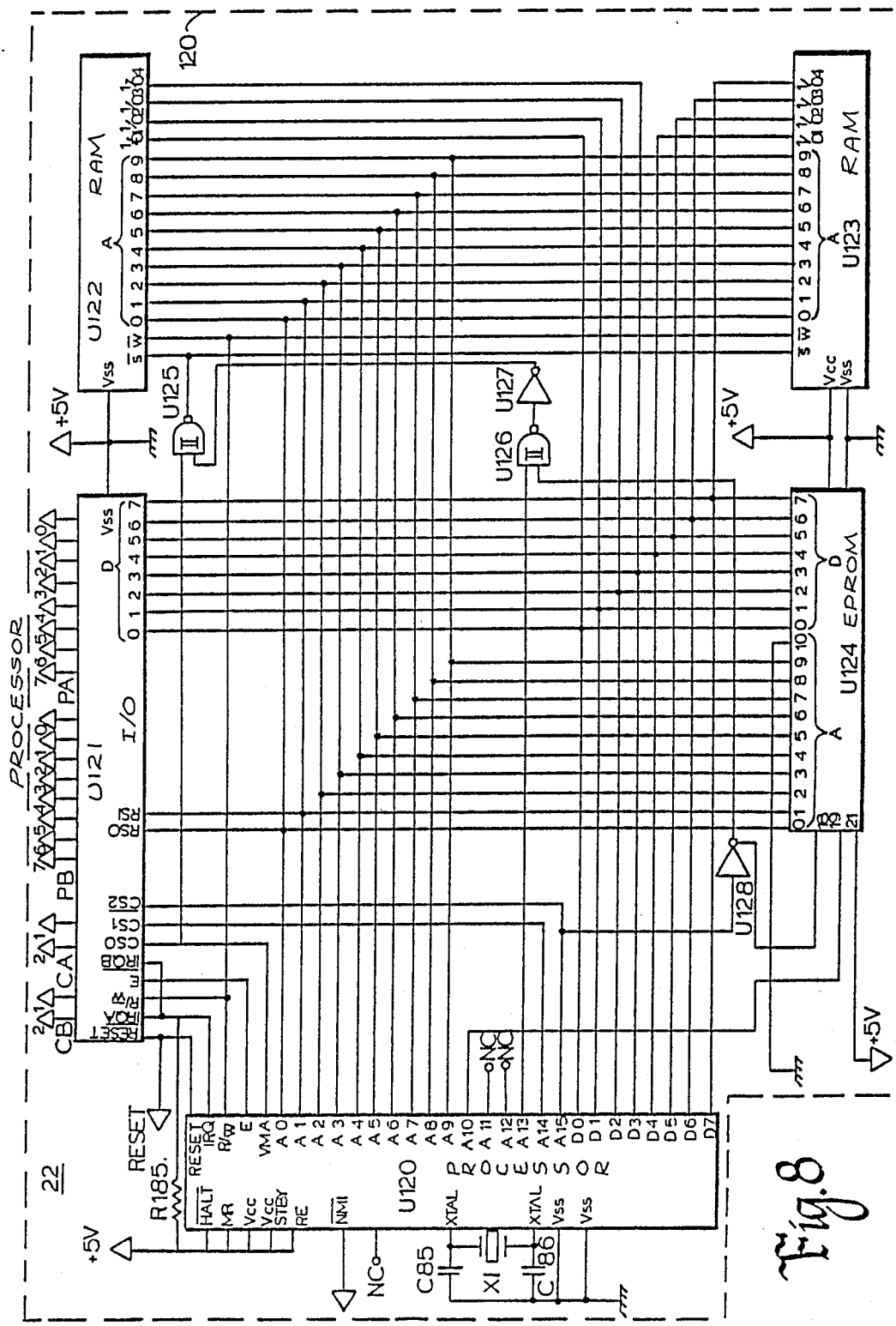
FIG. 8 is an electrical schematic diagram of the processor circuit of the multiplexer device of the present invention.

The line select code is also sent to the processor circuit 120 of FIG. 8 via input lines PB0-PB6. The extra 28 line select codes, as previously discussed, can be used to control special functions of the processor circuit 120. The computer 24 may then access any of the telephone lines 12 which are coupled to the multiplexer system 20 by asking for the correct MUX device 22 and asking for the correct telephone line number.

The computer 24 may reset the processor circuit 120 of FIG. 8 by issuing a high condition on bit $2^7$ of the 16 bit control code. The reset command is passed to the processor circuit 120 via buffer U89, Schmitt trigger U111 and U114 and inverter U119 all of FIG. 6f.

Once a particular telephone line 12 has been chosen by the computer 24, the telephone line 12 is first interrogated with an interrogation signal which is typically a single audio tone at one of three discrete frequencies of 500, 810 and 1270 Hertz. It is within the capability of the software in the EPROM U124 of the processor circuit 120 to cause the sending of 256 different discrete frequencies of virtually any frequency, however, it is contemplated that 99 frequencies between 320 and 3155 Hertz with each discrete being no less that 5 percent but not greater than 10 percent higher than the next lower frequency will be satisfactory for the preferred embodiment. We have found that frequencies as high as 20 KC may be used including a broad band of frequencies well above the audible range. As the frequency increases, the system is limited in line length but for many applications, line length is not a limiting factor. The frequencies of 500, 810 and 1270 Hertz were chosen for that reason.

The interrogation tone is generated in the processor circuit 120 of FIG. 8 by software in the EPROM U124 and sent over line CB2 to amplifier U102 of the MUX device 22. Amplifier U102 of FIG. 6f amplifies the square wave signal from the processor circuit 120 and zener diode D52 limits the swing of the resultant tone inputted to D/A converter U99. The amplitude of the outputted signal from the D/A converter U99 is controlled by the processor circuit 120 via input lines PA4-PA7. The outputted signal is then current to voltage converted in comparator U103 and made to swing between −15 and +15 volts via comparators U98 and U95 and transistors Q5 and Q6.

Depending on whether the MUX device 22 is set up in the single ended or double ended configuration, either Q5 and Q6 or Q5, Q6, Q7 and Q8 are used to send either a single line output or double line output to the input/output circuit 100, respectively.

The MUX device 22 is wired for single or double ended operation via line 110 which is typically part of the hard wire circuit 70 in MUX cage 80. When line 110 is connected to ground 105, the MUX device 22 is configured for double ended operation. If line 110 is left unconnected, the MUX device 22 is in the single ended configuration.

Depending on whether the single or double ended configuration is chosen, the interrogation tone will go out over line 130 or lines 132 and 130 respectively. In either case, the interrogation tone is conducted to the proper telephone line 12 connected to an input/output circuit 100 via the line selecting done by the computer 24. Several different interrogation tones may be sequentially sent over a single telephone line 12 by sending the appropriate control code from the computer 24. The control code must simply select the particlar MUX device and the particular telephone line. The processor circuit 120 typically knows which interrogation tones to send on any given telephone line 12. It is also possible to select the interrogation tone frequency by the control codes if this feature is desired.

Referring momentarily to FIG. 9, the process of receiving the signal transmitted from each of the typical meter interface devices 14 of the automatic meter reading system 10 is shown. Typically, each of the meter interface devices 14 of FIG. 1 send a pulse width modulated, single frequency carrier which has a typical frequency of 2000 Hertz. It is important to be able to receive the relative pulse widths of the carrier to decode the utility usage figure and meter identification number typically sent by the meter interface device 14. This is done as follows: the pulse width modulated carrier as shown is amplified and filtered in a circuit which includes U100, U101 and U107 of FIG. 6e-h. After filtering the signal, any D.C. component and any frequency substantially different than 2000 Hertz is gone. Next, the pulse width modulated carrier is passed through a Schmitt trigger U108 which clips the carrier in high and low thresholds. Then, the clipped carrier is passed through a one shot U109 which converts the pulse width to positive going D.C. pulse of approximately 5 volts in magnitude. The one shot U109 will time out typically at 1.5 times the period of the clipped carrier received, however it can be seen that the relative pulse width of the pulse width modulated carrier is intact and properly represented in the positive going D.C. pulse from the one shot U109.

The D.C. pulses are fed to the processor circuit 120 of FIG. 8 of the MUX device 22, which via software contained in the EPROM U124 counts the pulse periods and stores the values of the pulse periods in RAM memories U122 and U123. A positive going spike 117 which appears as a D.C. pulse of data can be eliminated in the processor 120 by having the processor circuit's 120 software disregard pulse periods of certain short durations. The typical short duration period is the minimum period of the one shot U109.

Figure 6E:
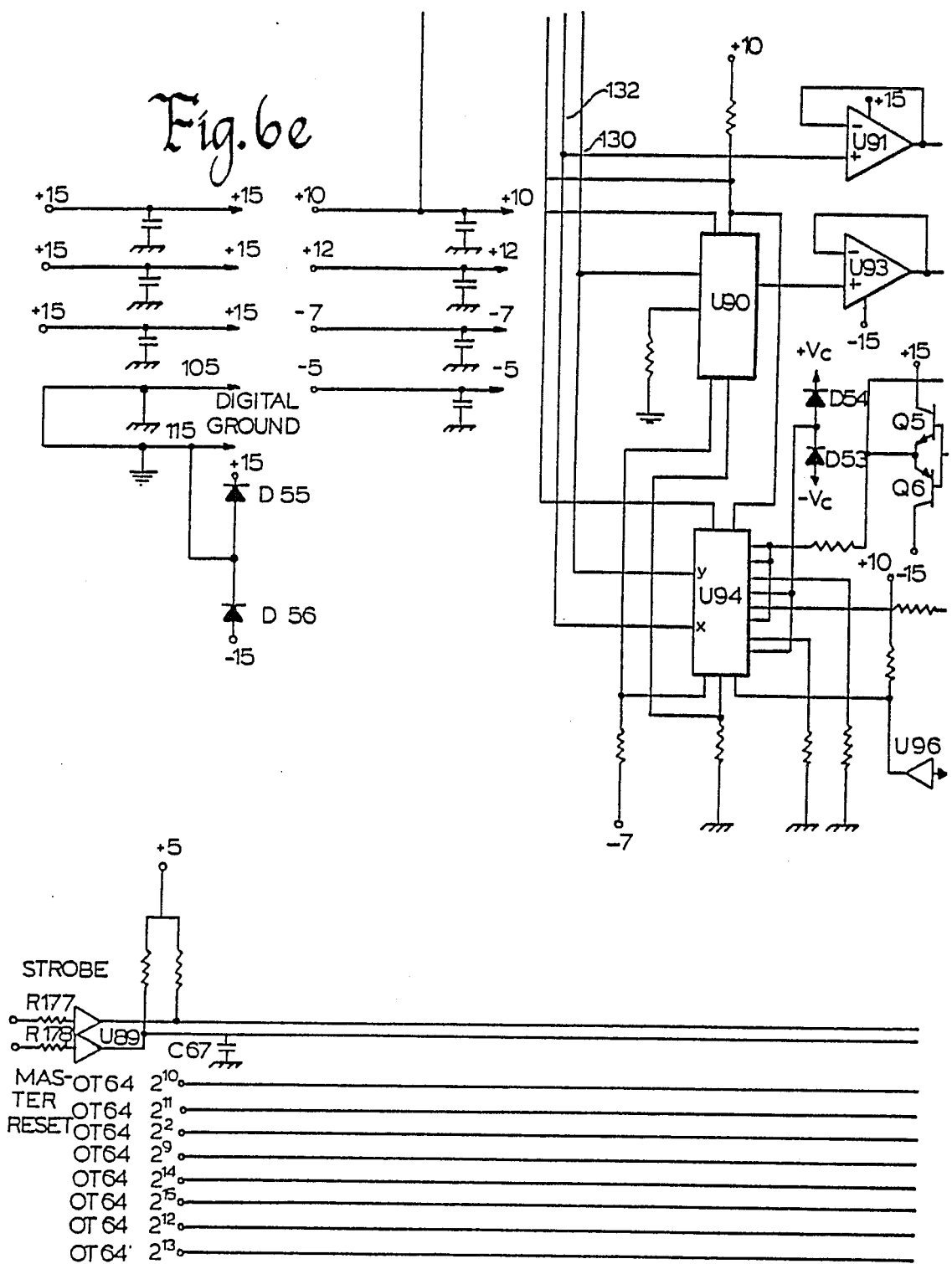
Figure 6F:
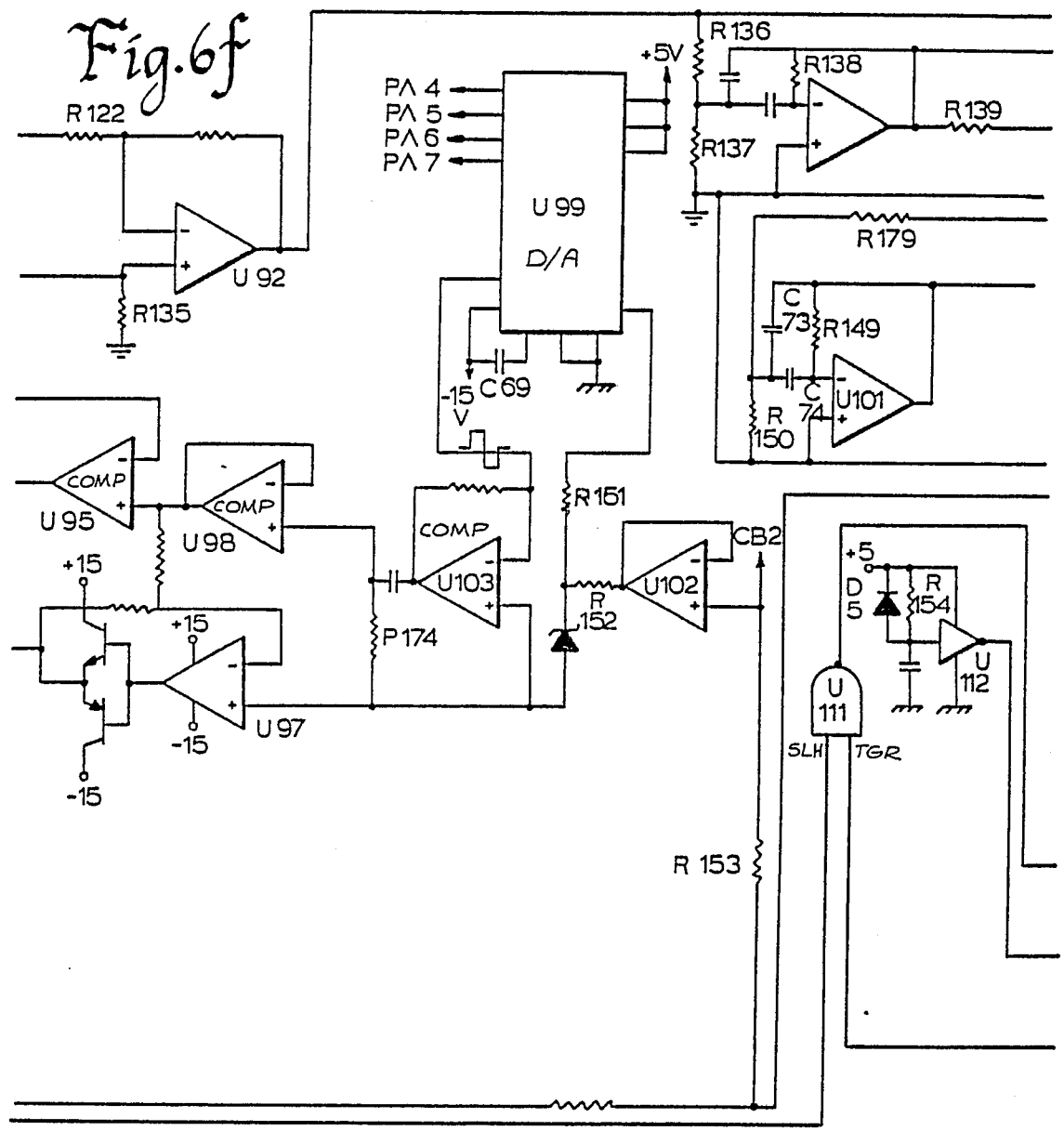
Figure 6G:
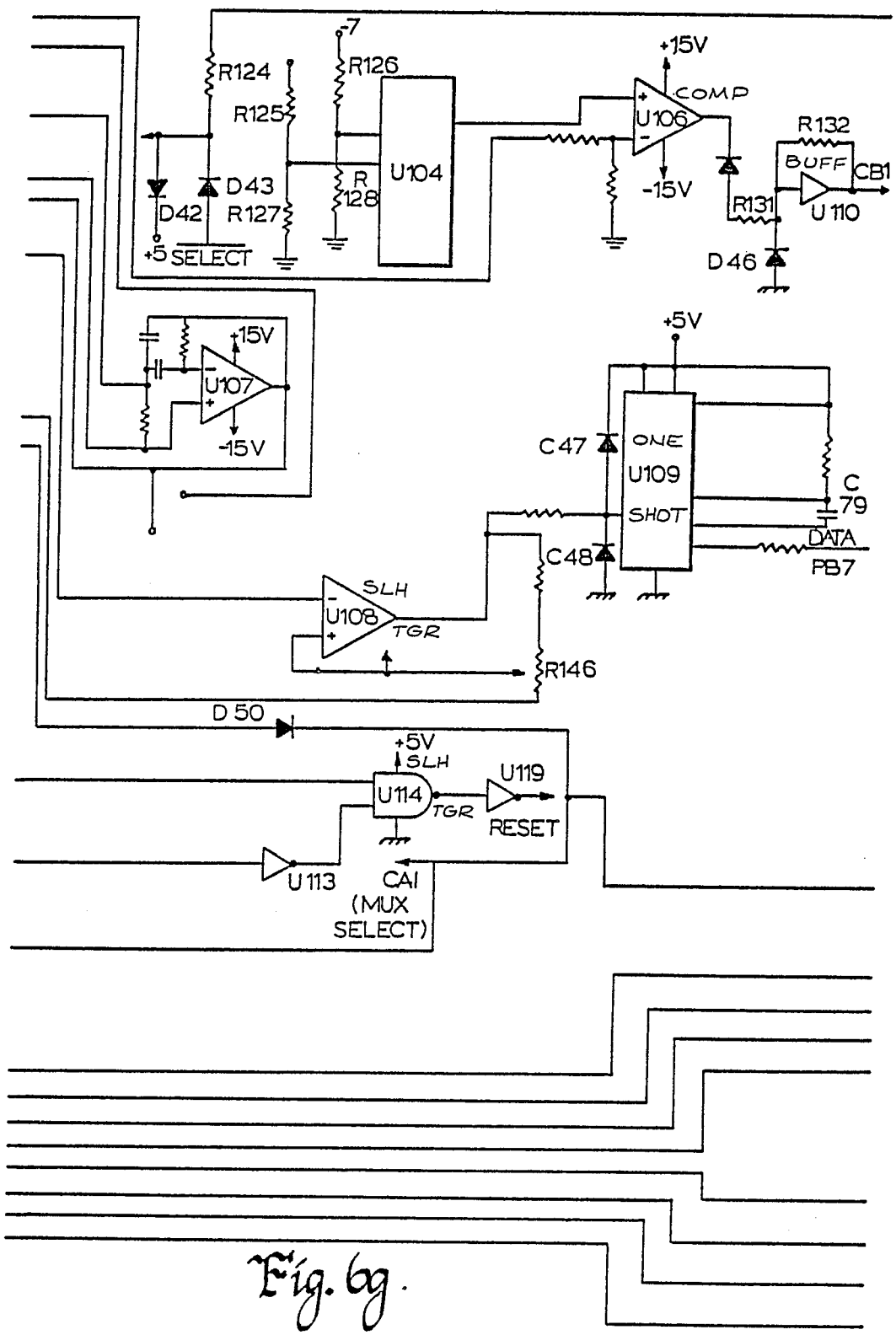

A spike 117 of FIG. 9 typically is of very short duration and so will cause the one shot U109 of FIG. 6g to time out at its earliest possible time. The software is then programmed to disregard positive going pulse durations 117 which are at the minimum period of the one shot U109. The same process can be done for negative going spikes 118 which create a loss of continuity condition of pulse durations of the pulse modulated carrier.

If the discontinuity of any pulse widths are of the minimum period of the one shot U109, they will be disregarded and the continuity of the pulse will be accomplished. Thus, both positive and negative going spikes 117 and 118 of short duration will not be entered into the processor circuit's 120 memory devices U122 and U123 of FIG. 8, and the relative pulse durations of the pulse width modulated carrier will be maintained. Therefore, asynchronous data can be reliably received and decoded by the preferred embodiment of the present invention.

Again referring to FIGS. 6a, 6b, 6d, 6e, 6f, 6g and 6h, the received signals from the input circuits 100 comes in via lines 130 and 132 in the double ended configuration. In the single ended configuration, the received signal comes in on line 130. In the double ended configuration, the two lines 130 and 132 are amplified in amplifiers U91-U93 of FIG. 6e. The D.C. component leaked from the input circuit 100 is conducted to comparator U106 and buffer U110 to become a maskable interrupt to the processor circuit 120 via line CB1. The output of buffer U110 may also be used to sense the number of times a particular telephone line 12 is in the OFF-HOOK condition during a predetermined period of time. This may be done in the processor circuit 120 by counting the incidences where each telephone line 12 has been found in the OFF-HOOK condition. The telephone companies have use for the rate of use figure indicated by the count of OFF-HOOK conditions on each of the telephone lines 12.

The filtered and amplified alternating current signal from the pulse width modulated carrier received from a telephone line 12 is passed through Schmitt trigger U108 which clips the signal as described in the discussion under FIG. 9. The clipped signal is then inputted to a one shot U109 whose output is sent to the processor circuit 120 of FIG. 8 over line PB7. The process performed on the inputted signal from the one shot U109 has been discussed in the discussion under FIG. 9; however, it must be noted that the MUX device 22 of the preferred embodiment will operate to receive the asynchronous pulse width modulated data from the meter interface devices 14, but, it can be seen that the present invention can be configured to receive data which is transmitted in any of a number of formats.

Figure 6H:
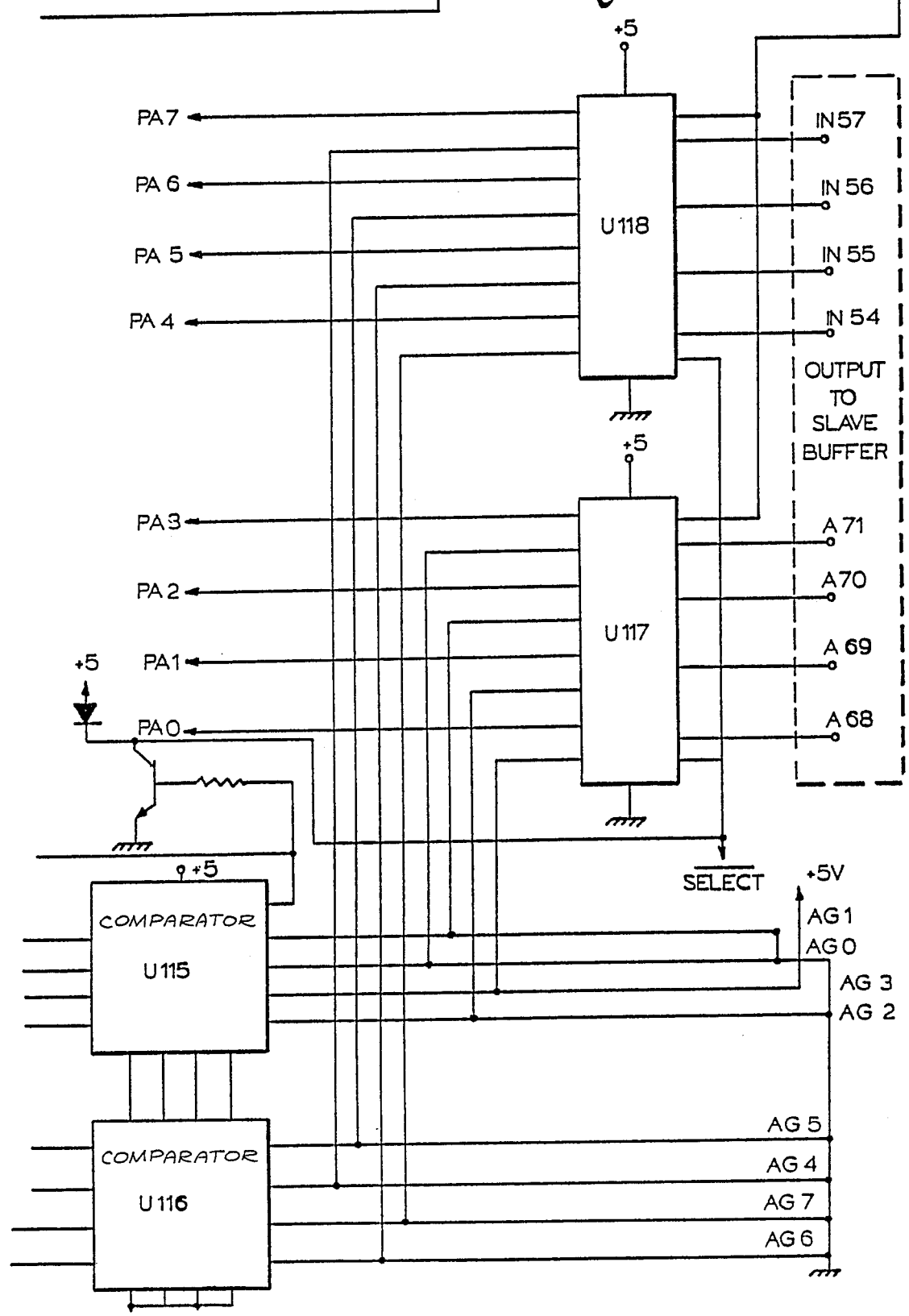

The outputted utility usage figure and meter identification figure from the processor circuit 120 come in on lines PA0-PA7 to the two data selector/multiplexers U118 and U117 of FIG. 6h. The utility usage figure and meter identification figure are sent in 8 bit parallel digital form over input lines IN50-IN57 to the slave line driver/receiver 60 of FIG. 2.

Referring to FIG. 8, the processor circuit 120 is seen. The input/output device U121 interfaces the lines CB1, CB2, CA1, CA2, PB1-PB7 and PA0-PA7 to the microprocessor device U120, the EPROM memory device U124 and RAM memory devices U122 and U123. The EPROM device contains the software which is used by the microprocessor device U120 to control the MUX device 22. The utility usage readings and meter identification figures in the form of count period values of the positive and zero pulse widths from line PB7 are stored in the RAM memory devices U122 and U123 for analysis by the microprocessor U120 under the control of software in the EPROM U124. Once the utility usage reading and meter identification figures have been decoded, their decoded values are stored in the RAM memory devices U122 and U123 until these decoded values are sent to the computer 24 over lines PA0-PA7.

The 28 unused telephone line select codes, inputted over input lines PB0-PB7, can be used to put the microprocessor U120 in special modes of operation such as a RAM self test, EPROM check sum and MUX echo.

Referring to FIGS. 10a and 10b a flow chart of the commands from the computer 24 to each individual MUX device 22 is seen. The computer 24 first asks for a particular MUX number (here 255) together with a command to reset the MUX device 22 which causes the MUX device 22 to echo back the number that the MUX device 22 thinks it has as its identification figure. Next, the computer 24 commands the MUX number and telephone line number which typically causes the MUX device 22 to echo back a 26 if the telephone line is ON-HOOK and a 30 if the telephone line is OFF-HOOK.

The next command seen from the computer 24 is a call for a MUX number 0 for which, in the preferred embodiment, there is no such MUX number. If the multiplexer system 20 is operating correctly, an echo of 0 will indicate that no MUX device 22 answered to a non-existant MUX number. Next, several desired functions may be selected. During normal operation of the multiplexer system 20, these desired functions can be allowed to go to their default conditions so long as proper readings are outputted to the computer 24. However, if a particular telephone line 12 connected to a particular MUX device 22 does not yield readings from the meter interface devices 14 coupled thereto, the computer 24 will start taking other measures to try to get the readings.

The first desired function would be to change the interrogation signal level in an attempt to prompt a non-responsive meter interface device 14. When the computer command code specifies that the computer 24 wishes to select the interrogate level, the computer 24 then specifies th MUX number and telephone line select code 116 which is echoed back to the computer 24 from the MUX device 22. Then the MUX number and control value, typically values from 0 to 15 (zero value giving the highest interrogate level and the value 15 giving the lowest interrogate level), to set the interrogation signal level are sent by the computer 24. To prevent the use of higher levels than are needed, the computer 24 will typically choose the next highest interrogation signal level to see if this level will prompt a response from the non-responding meter interface device 14.

Minimum effective interrogation signal levels for reliable system operation are achieved employing this system.

Each line has a stored interrogation level. If no response is received from a line upon interrogation, the level of the interrogation signal is increased in stepped increments (up to 15 steps) until a response is received. The new level is then stored as the calibration value for that line. It constitutes an indication of the line impedance. If after the full sequence no response is received, the line is indicated to be defective and that information stored in the computer.

This feature allows the interrogation signal level to be adjusted to each individual line characteristics whereby a minimum level for reliable signalling is all that is put on the line. Crosstalk possibilities are virtually eliminated and signalling power is significantly reduced.

Next, the computer 24 has the opportunity to choose the interrogation tone duration by giving the MUX device 22 the appropriate command which includes the MUX number and telephone line select code 119. If the value 7 is sent, the MUX will send a continuous interrogation signal. This is important for troubleshooting purposes since it is possible that the telephone line 12 itself may be the cause of the no response from the meter interface device 14. The duration will range from the default duration to a continuous tone. The computer 24 has the opportunity of selecting up to 255 different frequencies for the interrogation tone sent over the selected telephone line 12 by sending the MUX number and the telephone line select code 114. The no-response dropout time is the time period that the MUX device will wait after sending the interrogation signal for the data from the meter interface device 14 to be received.

The computer 24, after setting the characteristics of the interrogation signal or defaulting, will then send the MUX number and the telephone line select code for the telephone line 12 that it wishes to be interrogated. The MUX device 22 will send the value 13 in the lower 4 bits of its response and indicate the current interrogation signal level being used for the selected telephone line 12 in the upper 4 bits. If a proper reading was received, the MUX device 22 will typically echo a value of 15 in the lower 4 bits of the echo and an indication of the level which activated the meter interface device 14 in the upper 4 bits of the echo. The characteristics of the interrogation signal which activated the non-responsive meter interface device 14 can then be stored and used the next time this particular meter interface device 14 is interrogated upon command from the computer 24.

If there was no response to the interrogation signals, the MUX device 22 will typically echo a value of 11. If there was a response but the response was unreadable, the MUX device 22 will typically echo a value of 12.

If there was a proper reading received by the MUX device 22, the computer 24 then sends the MUX number and the strobe value which causes the MUX device 22 to send a single digit of the reading to the computer 24. After this one digit is received at the computer 24, the computer 24 sends the MUX number and strobe signal again to obtain the second digit. When all digits from the reading have been sent, the MUX device 22 will echo the value of 29 and the computer 24 will know that that is the end of the reading. If a re-read is desired, the computer 24 will re-enter to logical flow at entry point A of FIG. 10a.

ALTERNATE EMBODIMENT

Figure 11:
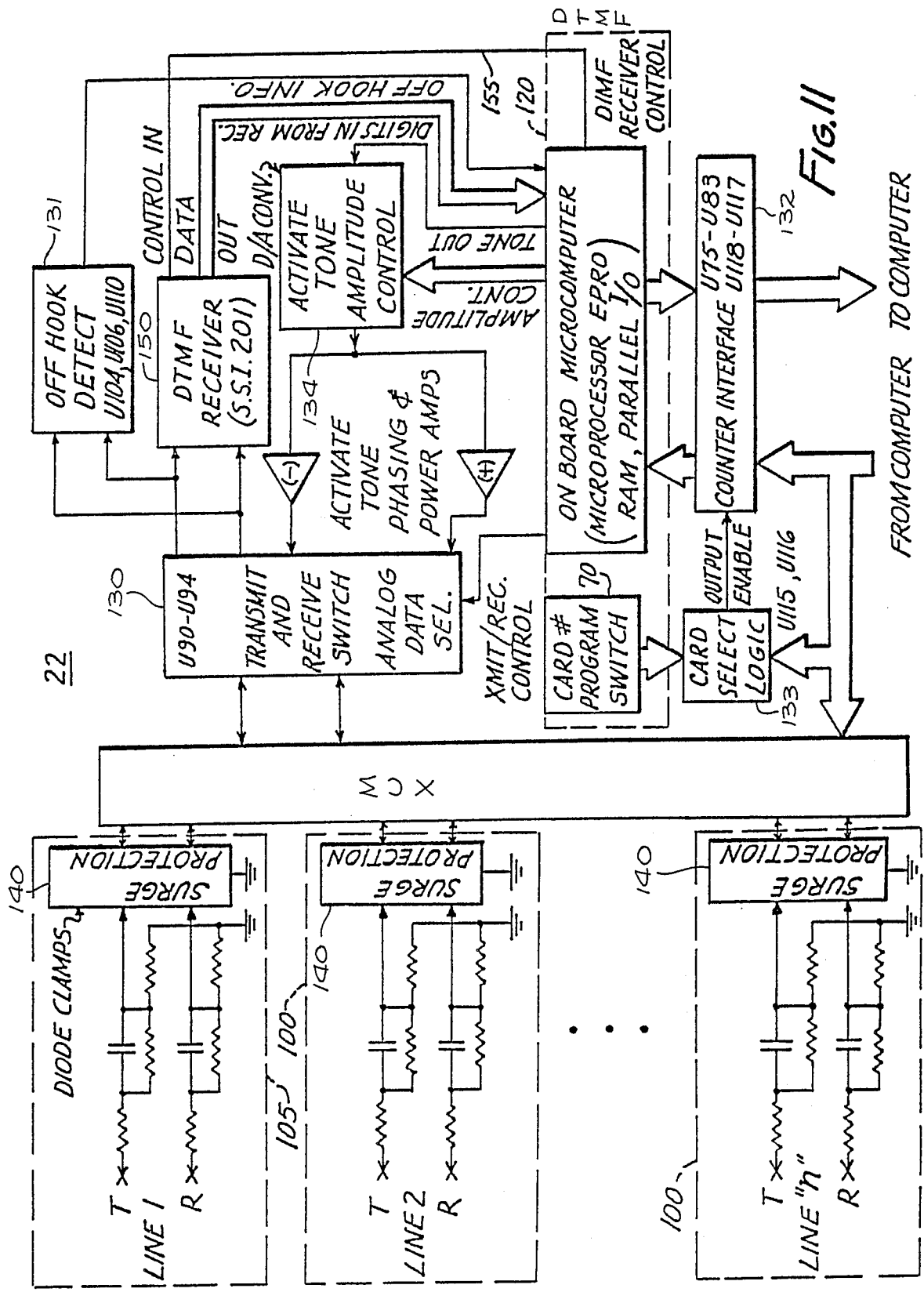
FIG. 11 is an electrical block diagram of the alternate embodiment of the present invention.

Referring to FIG. 11, it might be desirable to receive the utility usage figure and meter identification figure in the form of a dual tone system. This dual tone system if of the type commonly used by telephone companies for subscriber signalling referred to in the Bell System as the touch tone dialing system. In this dual tone system, each digit from 0 to 9 is sent over the telephone line as a distinct pair of audio tones. These distinct pairs of audio tones are easily decoded at the receiving location into the intended series of digits. The dual tone system would enable a single digit of both the utility usage figure and meter identification figure to be sent with a single dual tone signal since all digits from 0 to 9 are available in the dual tone system. The pound sign (#) and the star sign (*) could be used as framing sentinels for the reading from each meter interface device 14.

The alternate embodiment described in co-pending U.S. patent application Ser. No. 502,201, filed June 8, 1983, for METER INTERFACE UNIT FOR UTILITY METER READING SYSTEM could be used as the meter interface device 14 which will send the utility usage figure and meter identification figure to the alternate embodiment of the MUX device 22. The MUX device 22, to decode these dual tone signals, would have to be changed from the preferred embodiment only slightly. The only change necessary would be to include a DTMF receiver circuit 150, which is available commercially as an integrated circuit SSI 201, in place of the band pass filters U100, U101 and U107, Schmitt trigger U108 and one shot U109. When the individual dual tones are received and multiplexed to the DTMF receiver 150, the output from the DTMF receiver 150 is a serial digital signal indicating each digit and framing sentinels from the meter interface device 14.

Instead of decoding the relative pulse widths in the preferred embodiment, the processor 120 in the alternate embodiment must only store the values as an entire reading from the individual meter interface device 14. The software necessary for the decoding of the relative pulse width of the preferred embodiment is unnecessary and the speed of receiving the individual readings is, therefore, increased.

The processor 120 may have control over the filtering done in the DTMF receiver circuit 150 over control line 155; and, although the OFF-HOOK information can still be used in the alternate embodiment, the readings can now be done over an OFF-HOOK telephone line without interfering with it operation. The maskable interrupt from U110 of FIG. 6f can be disregarded by the processor 120 of FIG. 8. The OFF-HOOK telephone line will not be interfered with by the sending of the dual tones for the following reasons: first, the dual tones would be chosen so that they did not coincide with the dual tones used for dialing. The SSI 201 integrated circuit used for the DTMF receiver circuit 150 requires a crystal for its time base; the crystal need simply be changed in frequency to change the frequencies of the dual tones which will be received by the MUX device 22. Second, in the OFF-HOOK condition, the sending of the utility usage figure and the meter identification figure would be so short that the subscriber would not be bothered by the short bursts of tones if he happened to pick up his telephone at the instant of sending the reading.

Being able to interrogate the receive readings over OFF-HOOK telephone lines will allow time of day readings which are especially useful to the electric companies. The speed of sending the dual tone digits will add to the speed of receiving each reading and therefore to the speed of the entire multiplexer system.

Referring now to FIG. 11 in more detail, the multiplexer 22 in this alternate embodiment employs identical components or sub-systems where possible. The transmit and receiver section and analog data selector 130 is the same as illustrated in FIG. 6e as U90-U94. OFF-HOOK detector 131 is the same logic as U104, U106 and U110 of FIG. 6g. The microprocessor 120 is the same as microprocessor 120 of FIG. 8. The counter interface unit 132 corresponds to U75-U83 and U117 and U118 of FIGS. 6b and 6c. The card number select logic 133 constitutes the comparators U115 and U116 of FIG 6h. Surge protection 140 provided across each line 1—"n", as illustrated in FIG. 11, constitutes the diode network of FIG. 7b when operated in a double ended connection. If a single ended connection is used, the surge protection 140 is as illustrated in FIG. 7a and described above.

The card number program switch of FIG. 11 constitutes the wirewrap sections 70 of FIG. 2. Amplitude control 134 is embodied in the system as the D/A converter U99 of FIG. 6f.

The differences between the preferred embodiment and the embodiment of FIG. 11 are the removal of the band pass filters U100, U101 and U107, Schmitt trigger U108 and one shot U109 and their replacement with DTMF receiver circuit 150 as shown in FIG. 11. The commercially available DTMF receiver produces decoded digit signals which are conveyed to the microprocessor 120 for transmission to the central office computer via counter interface 132 in the same manner as the decoded pulse width modulated signals of the preferred embodiment.

List of Component Values For The Preferred Embodiment

The following is a listing of the component values found to be satisfactory in the preferred embodiment of the invention.

The computer 24 is a NOVA 3D manufactured by Data General Corporation.

The following is a list of the integrated circuits found to operate satisfactorily with the preferred embodiment.
U2–U5, U7, U26 and U27 are MC3487P manufactured by Motorola.
U9–U12 and U17–U25 are HCPL 2630 opto-isolators.
U6 is a 74L121 multivibrator.
U8 is a MC 14521B 24 stage frequency divider manufactured by Motorola.
U13 is a type 555 timer.
U14–U16 are contained in a single 14501.
U28–U32 are 74LS258A data selector/multiplexers.
U33 and U35 are contained in a single 75492 HEX buffer manufactured by National Semiconductor.
U34, U36, U42 and U45 are 75492 HEX buffers manufactured by National Semiconductor.
U43 and U44 are contained in a single 75492 HEX buffer manufactured by National Semiconductor.
U37–U39 are 74C902 CMOS HEX non-inverting TTL buffers manufactured by National Semiconductor.
U40 and U41 are 74LS09 quad AND gates.
U47–U59 are back-to-back diode arrays FSA 2510M.
U61–U74 are single 8 channel analog multiplexer/demultiplexers 4051.

U84–U87 are CMOS quad 2-input non-inverting data selector/multiplexers 74C157.

U76–U78, U88, U89 and U105 are contained in a single 74C906 HEX CMOS buffer.

U80–U83 and U96 are contained in a single 74C906 HEX CMOS buffer.

U75 and U79 are quad clocked D latches 4042.

U91–U93, U97–U98, U100, U103, U106–U108 are comparators.

U90, U94 and U104 are dual 4 channel multiplexer/demultiplexers 4052.

U99 is a MC1406L 6 bit D/A converter manufactured by Motorola.

U110, U112, U119, U127 and U128 are inverting buffers.

U115 and U116 are 74C85 CMOS 4 bit magnitude comparators.

U117 and U118 are 74LS258 data selector multiplexers.0

U120 is a 6802 8 bit microprocessor manufactured by Motorola.

U121 is a 6821 interface adapter manufactured by Motorola.

U124 is a INT-2716 EPROM.

U122 and U123 are 1K×4 bit 2114 RAM memories.

The following is a listing of resistors and resistor packs found to be satisfactory in the preferred embodiment. The values specified for the resistors are for ¼ watt, 5% tolerance fixed carbon resistors unless otherwise specified:

R36–RN12, RN17–RN20 and RN25a–RN25m are eight 10K ohm series resistances in a pack 316B103.

RN23a–RN23m are 100K ohm parallel resistances in each pack 314A104.

RN24 is a 314B103 pack.

Resistors and Potentiometers:

R7, R13, R15, R53–R69, R103–R105, R116, R129, R143, R144, R148 and R154 are all 10K ohms.

R100, R101, R106, R108, R109, R112–R114, R121, R152, R172, R173 and R179 are 330 ohms.

R90a–R90m, R91a–R91m, R92a–R92m, R93a–R93m, R94a–R94m, R95a–R95m, R96a–R97m, R97a–R97m, R174, R171 and R170 are all 1 megaohm.

R107, R117–R120, R115, R124, R133, R145 and R160 are all 20K ohms.

R153 and R155 are 5.1K ohms.

R20–R52 are 75 ohms.

R70, R132 and R170 are 1K ohms.

R1 is 3.6K ohms; R4 is 62K ohms; R6 is 30K ohms; R14 is 1.6K ohms; R142 is 47K ohms; R71 is 47 ohms; R110 is 6.8K ohms; R147 is 220 ohms; R111 is 9.1K ohms; R9 is 24K ohms; R131 is 3.3K ohms; R11 is 13K ohms; R158 and R157 are 100K ohms; R159 is 100 ohms; and, R185 is 7.5K ohm.

R125 is 7.50K ohms 1% tolerance; R126 and R149 are 47.5K ohms 1% tolerance; R127 is 20.0K ohms 1% tolerance; R128 is 1.00K ohms 1% tolerance; R151 is 2.49K ohms 1% tolerance; R141 and R150 are 1.74K ohms 1% tolerance; R139 and R136 are 6.04K 1% tolerance; R156 is 14.7K ohms 1% tolerance; and, R134, R135, R122 and R123 are 10.0K ohms 1% tolerance.

R8 is a 5K ohm potientiometer.

R146 is a 10K ohm potientiometer.

The following is a listing of capacitor values which operate satisfactory in the preferred embodiment. All capacitor values are in microfarads and at a working voltage of 100 volts unless otherwise specified:

C1–C4, C6, C9–C13, C21–C36, C70–C76, C78 and C121 are all 0.01 microfarads.

C50a–C50m, C51a–C51m, C52a–C52m, C53a–C53m, C54a–C54m, C55a–C55m, C56a–C56m and C57a–C57m are all 0.47 microfarad, 250 working volts.

C7, C8, C41–C45, C67 and C79 are all 0.1 microfarads 50 working volts.

C60–C66 and C77 are all 33 microfarad, 35 working volts electrolytic capacitors.

C20 and C40 are both 33 microfarad, 25 working volts electrolytic capacitors.

C14 is 33 microfarads at 6 working volts electrolytic capacitor.

C15 is 10 microfarad 15 working volts electrolytic capacitor.

C5 is a 0.001 microfarad capacitor.

C68 is a 100 picofarad capacitor.

C85 and C86 are 27 picofarad capacitors.

The following are diode values found to operate satisfactory in the preferred embodiment. D1, D3–D18, D20–D35 and D49 are LED's typically in a diode pack 550-0406.

D42–D48, D50–D56 are 1N4148 diodes.

The following are transistor types found to operate properly in the preferred embodiment of the invention:

Q1, Q6 and Q8 are 2N3906.

Q2, Q3, Q5, Q7 and Q9 are 2N3904.

The following miscellaneous components also operate properly in the preferred embodiment:

X1 is a 4 Mhz AT cut crystal.

A listing of the computer programs contained in the EPROM U124 and the NOVA 3D computer are attached at the end.

The above described embodiments of this invention are merely descriptive of its principles and are not to be considered limiting. Instead, the scope of this invention shall be determined from the scope of the following claims and their equivalents.

```
@SET,M 8
DEL IFILE.IF
DEL MUXROM.LX
RLOAD
IDON
IF=IFILE
STRB=$0000
STRD=$8000
STRP=$F800
LOAD=POWRUP
LOAD=SLFTST
LOAD=INPUT
LOAD=INTERR
LOAD=RECEVE
LOAD=PARSET
```

```
LOAD=DECODE
LOAD=SYNCH4
LOAD=COUNT
LOAD=DIGOUT
LOAD=DUMPIT
LOAD=ACMUX
LOAD=INTSVC
CURP=$7B0
LOAD=PARTBL
CURP=$7F8
LOAD=VECTOR
OBJX=MUXROM
MO=#LP
EXIT
00010 00001                           NAM     POWRUP
00020 00002                   ******* VERSION 05 - 11 - 83, S W O ***************
00030 00003                   *
00040 00004                   *    THIS MODULE IS ENTRY POINT TO ACTUAL ACMUX
00050 00005                   * PROGRAM.  IT HANDLES HARDWARE INITIALIZATION AND
00060 00006                   * WINDS UP IN A WAIT STATE LOOKING FOR ITS MUX
00070 00007                   * SELECT LINE TO BE ACTIVATED.
00080 00008                   *
00090 00009                   *
00100 00010                           OPT     LLE=80,REL
00110 00011P 0000                     PSCT
00120 00012                           XDEF    POWRUP
00130 00013                           XREF    PIA,STACK,INTERR,RECEVE,ERRFLG
00140 00014                           XREF    DECODE,SYNCH4,DIGOUT,TRYCTR
00150 00015                           XREF    LARGE,HIMARK,MIDDLE,PARTBL,XSAVE
00160 00016                           XREF    LOMARK,AUTOFG,LEVEL,RAWIN,RECTME
00170 00017                           XREF    METER,DURA,INPUT,SLFTST
00180 00018                           XREF    PARSET,COUNT,BLNKTM
00190 00019                   *
00200 00020                   *
00210 00021P 0000 0F          POWRUP  SEI
00220 00022P 0001 7F 0001 A           CLR     PIA+1        ACCESS DDRA
00230 00023P 0004 86 FF    A          LDAA    #$FF         SET PA0 - PA7 AS
00240 00024P 0006 B7 0000 A           STAA    PIA          OUTPUTS VIA DDRA
00250 00025P 0009 86 3E    A          LDAA    #$3E         ENABLE PRA AND SET CA1
00260 00026P 000B B7 0001 A           STAA    PIA+1        AS INPUT, CA2 AS OUTPUT
00270 00027P 000E 7F 0002 A           CLR     PIA+2        SET PB0 - PB7 AS INPUTS
00280 00028P 0011 86 17    A          LDAA    #$17         ENABLE PRB AND SET
00290 00029P 0013 B7 0003 A           STAA    PIA+3        CB1 AND CB2 AS INPUTS
00300 00030P 0016 86 0A    A          LDAA    #$0A
00310 00031P 0018 B7 0000 A           STAA    PIA          XMIT MUX READY CODE
00320 00032P 001B 8E 0000 A           LDS     #STACK       SET STACK POINTER
00330 00033P 001E BD 0000 A           JSR     SLFTST       PERFORM SELF-DIAGNOSTICS
00340 00034P 0021 30                  TSX
00350 00035P 0022 4F                  CLRA
00360 00036P 0023 09        ZERO      DEX
00370 00037P 0024 A7 00   A           STAA    0,X          ZERO ALL RAM
00380 00038P 0026 8C 0000 A           CPX     #$0000       DONE YET?
00390 00039P 0029 26 F8 0023          BNE     ZERO         NO
00400 00040P 002B 86 CD   A           LDAA    #$CD         INIT "LARGE" LIMIT
00410 00041P 002D B7 0000 A           STAA    LARGE
00420 00042P 0030 86 4C   A           LDAA    #$4C         INIT HIMARK LIMIT
00430 00043P 0032 B7 0000 A           STAA    HIMARK
00440 00044P 0035 86 2A   A           LDAA    #$2A         INIT LOMARK LIMIT
00450 00045P 0037 B7 0000 A           STAA    LOMARK
00460 00046P 003A 86 5F   A           LDAA    #$5F         INIT "MIDDLE" LIMIT
00470 00047P 003C B7 0000 A           STAA    MIDDLE
00480 00048P 003F 86 2D   A           LDAA    #$2D         INIT FREQUENCY PARAMETER
00490 00049P 0041 B7 0000 A           STAA    METER
00500 00050P 0044 CE 004F A           LDX     #$004F       INIT INTERR. TONE CTR
00510 00051P 0047 FF 0000 A           STX     DURA
00520 00052P 004A CE 09FF A           LDX     #$09FF       INIT RECEVE WAIT W/O DATA CT
00530 00053P 004D FF 0000 A           STX     RECTME
00531 00054P 0050 CE 2FFF A           LDX     #$2FFF
00540 00055P 0053 FF 0000 A           STX     BLNKTM
00550 00056P 0056 BD 0000 A           JSR     INPUT        GO CHECK FOR SPECIAL REQ.
00560 00057P 0059 BD 0000 A  INTER    JSR     INTERR       SELECTED! INTERROGATE LINE
00570 00058P 005C BD 0000 A           JSR     RECEVE       RECEIVE DATA
```

```
00580 00059P 005F B6 0001  A           LDAA    XSAVE+1
00590 00060P 0062 81 7F    A           CMPA    #$7F
00600 00061P 0064 22 1F 0085           BHI     AGAIN      IF SO, GO DECODE
00610 00062P 0066 B6 0000  A           LDAA    XSAVE
00620 00063P 0069 81 80    A           CMPA    #$80
00630 00064P 006B 22 18 0085           BHI     AGAIN
00640 00065P 006D 86 0B    A           LDAA    #$0B       OTHERWISE, REPORT A
00650 00066P 006F B7 0000  A           STAA    ERRFLG     NO RESPONSE ERROR (11)
00660 00067P 0072 7D 0000  A           TST     AUTOFG     IF NOT, CHECK FOR AUTO-INTER
00670 00068P 0075 27 1A 0091           BEQ     OUTPUT     NOT AUTO-INTERR, REAL ERROR
00680 00069P 0077 B6 0000  A           LDAA    LEVEL      WAS AUTO-INTERR, CHK CURR. L
00690 00070P 007A 27 15 0091           BEQ     OUTPUT     IF SO, REPORT NO RESPONSE ER
00700 00071P 007C 4A                   DECA               OTHERWISE, TRY NEXT LEVEL UP
00710 00072P 007D B7 0000  A           STAA    LEVEL
00720 00073P 0080 7F 0000  A           CLR     ERRFLG
00730 00074P 0083 20 D4 0059           BRA     INTER      GO TRY AGAIN WITH NEW LEVEL
00740 00075P 0085 BD 0000  A AGAIN     JSR     PARSET
00750 00076P 0088 BD 0000  A           JSR     DECODE
00760 00077P 008B BD 0000  A           JSR     SYNCH4     SYNCH ON DECODED DATA
00770 00078P 008E BD 0000  A           JSR     COUNT
00780 00079P 0091 BD 0000  A OUTPUT    JSR     DIGOUT
00790 00080P 0094 01         WAIT1     NOP
00800 00081P 0095 20 FD 0094           BRA     WAIT1
00810 00082                            END
TOTAL ERRORS 00000--00000
00010 00001                            NAM     SLFTST
00020 00002                   ******* VERSION 04 - 08 - 83, S W O ***************
00030 00003                   *
00040 00004                   *       THIS MODULE IS ENTERED ON A SYSTEM RESET
00050 00005                   * AND PERFORMS A SELF TEST OF THE ON-BOARD COMPUTER
00060 00006                   * SYSTEM. A RAM TEST IS DONE FIRST FOLLOWED BY A
00070 00007                   * CHECKSUM TEST OF THE PROGRAM EPROM
00080 00008                   *
00090 00009                   *
00100 00010                            OPT     LLE=80,REL
00110 00011P 0000                      PSCT
00120 00012                            XDEF    SLFTST
00130 00013           ,                XREF    BEGADR,ENDADD,PIA
00140 00014                   *
00150 00015                   *
00160 00016P 0000 CE 8000  A SLFTST    LDX     #$8000     START ADDRESS
00170 00017P 0003 4F         STORE     CLRA
00180 00018P 0004 A7 00    A           STAA    0,X        SET EVERY OTHER BYTE TO 0
00190 00019P 0006 08                   INX                POINT TO NEXT BYTE
00200 00020P 0007 8C 87FF  A           CPX     #$87FF     DONE YET?
00210 00021P 000A 27 07 0013           BEQ     LOAD
00220 00022P 000C 86 FF    A           LDAA    #$FF
00230 00023P 000E A7 00    A           STAA    0,X        SET REMAINING BYTES TO ALL 1
00240 00024P 0010 08                   INX                POINT   TO NEXT BYTE
00250 00025P 0011 20 F0 0003           BRA     STORE      KEEP GOING
00260 00026P 0013 CE 8000  A LOAD      LDX     #$8000     START ADDRESS
00270 00027P 0016 A6 00    A LOAD1     LDAA    0,X        GET BYTE
00280 00028P 0018 26 0F 0029           BNE     ERROR      BYTE SHOULD BE 0
00290 00029P 001A 08                   INX                POINT TO NEXT BYTE
00300 00030P 001B 8C 87FF  A           CPX     #$87FF     DONE YET?
00310 00031P 001E 27 10 0030           BEQ     EXIT
00320 00032P 0020 A6 00    A           LDAA    0,X        GET NEXT BYTE
00330 00033P 0022 81 FF    A           CMPA    #$FF       BYTE SHOULD BE ALL 1'S
00340 00034P 0024 26 03 0029           BNE     ERROR
00350 00035P 0026 08                   INX                POINT TO NEXT BYTE
00360 00036P 0027 20 ED 0016           BRA     LOAD1      KEEP GOING
00370 00037P 0029 86 14    A ERROR     LDAA    #$14       DECIMAL 20 = BAD RAM
00380 00038P 002B B7 0000  A REPORT    STAA    PIA        ERROR REPORTED
00390 00039P 002E 20 FB 002B           BRA     REPORT     LOCK UP MUX
00400 00040P 0030 39         EXIT      RTS
00410 00041                            END
TOTAL ERRORS 00000--00000
00010 00001                            NAM     INPUT
00020 00002                   ******* VERSION 05 - 10 - 83, S W O ***************
00030 00003                   *
00040 00004                   *       THIS MODULE HANDLES INITIAL COMMUNICATION
00050 00005                   * WITH THE NOVA COMPUTER. IT IS AN INPUT ONLY
00060 00006                   * ROUTINE WHICH IS LOOKING FOR SPECIAL FUNCTION
00070 00007                   * REQUESTS AS TABULATED BELOW IN ORDER OF INCREAS-
00080 00008                   * ING NOVA GENERATED DECIMAL COMMUNICATION CODES
```

```
00090 00009        *
00100 00010        ***** CODE ********  FUNCTION ********************
00110 00011        *     112      0 - 7, WAIT WITH NO-RESPONSE TIME
00120 00012        *     114      00 - 255, CUSTOM FREQUENCY SELECT
00130 00013        *     116      0 - 15, LEVEL SELECT CODE
00140 00014        *     119      0 - 7, INTERROGATE DURATION, 7 = ON.
00150 00015        *
00160 00016        *
00170 00017                  OPT       LLE=80,REL
00180 00018P 0000            PSCT
00190 00019                  XDEF      INPUT
00200 00020                  XREF      PIA,METER,TEMP,DURA,LNGFLG,XSAVE
00210 00021                  XREF      AUTOFG,LEVEL,RECTME,WAITME,TONTME
00220 00022                  XREF      BLNKTM
00230 00023        *
00240 00024        *
00250 00025P 0000 7C 0000 A  INPUT  INC   AUTOFG   SETUP AUTO INTERROGATE
00260 00026P 0003 86 0F   A         LDAA  #$0F     STARTING LEVEL
00270 00027P 0005 B7 0000 A         STAA  LEVEL
00280 00028P 0008 BD 00CF P         JSR   GETCDE   GO GET CURRENT CODE
00290 00029P 000B 81 74   A         CMPA  #$74     CHECK FOR LEVEL SELECT
00300 00030P 000D 26 13 0022        BNE   CONT     IF NOT CHECK FOR CONT
00310 00031P 000F BD 00AF P         JSR   CHANGE   WAIT FOR COMMAND TO CHANGE
00320 00032P 0012 B7 0000 A         STAA  LEVEL    SAVE SELECTED LEVEL
00330 00033P 0015 7F 0000 A         CLR   AUTOFG   DE-ACTIVATE AUTO INTERR
00340 00034P 0018 BD 00CF P  INPUT1 JSR   GETCDE   GET COMMAND
00350 00035P 001B 81 74   A         CMPA  #$74     LOOK FOR SELECT COMMAND
00360 00036P 001D 26 F9 0018        BNE   INPUT1
00370 00037P 001F BD 00AF P         JSR   CHANGE   NOW LOOK FOR NEXT COMMAND
00380 00038P 0022 81 77   A  CONT   CMPA  #$77     CHECK FOR CONTINUOUS COMMAND
00390 00039P 0024 26 29 004F        BNE   CUSTOM   IF NOT, CHECK FOR CUSTOM
00400 00040P 0026 BD 00AF P         JSR   CHANGE   GET DESIRED TONE DURATION
00410 00041P 0029 81 07   A         CMPA  #$07     CONTINUOUS REQUEST?
00420 00042P 002B 26 03 0030        BNE   CONT1    IF NOT
00430 00043P 002D 7C 0000 A         INC   LNGFLG   SETUP CONTINUOUS
00440 00044P 0030 48          CONT1 ASLA           MULTIPLY BY 2 TO GET OFFSET
00450 00045P 0031 CE 0000 A         LDX   #TONTME  ADDRESS OF DURATION CONSTANT
00460 00046P 0034 FF 0000 A         STX   XSAVE    PUT IN WORKING REGISTER
00470 00047P 0037 BB 0001 A         ADDA  XSAVE+1  FORM ADDRESS OF DESIRED DURA
00480 00048P 003A B7 0001 A         STAA  XSAVE+1
00490 00049P 003D FE 0000 A         LDX   XSAVE    GET ADDRESS OF DESIRED DURAT
00500 00050P 0040 EE 00     A         LDX   0,X      GET DESIRED DURATION FROM TA
00510 00051P 0042 FF 0000 A         STX   DURA     SETUP FOR INTERR
00520 00052P 0045 BD 00CF P  CONT2  JSR   GETCDE   GET NOVA TRANSMISSION
00530 00053P 0048 81 77   A         CMPA  #$77     INSIST ON ANOTHER 119
00540 00054P 004A 26 F9 0045        BNE   CONT2
00550 00055P 004C BD 00AF P         JSR   CHANGE   WAIT FOR ANOTHER NOVA TRANSM
00560 00056P 004F 81 72   A  CUSTOM CMPA  #$72     CHECK FOR CUSTOM FREQUENCY
00570 00057P 0051 26 10 0063        BNE   METR2    IF NOT, CHECK METER2 REQ.
00580 00058P 0053 BD 00AF P         JSR   CHANGE   LOOK FOR VALUE 00590 00059P 0056 B7 0000 A         STAA  METER    GOT IT
00600 00060P 0059 BD 00CF P  INPUT2 JSR   GETCDE   GET COMMAND
00610 00061P 005C 81 72   A         CMPA  #$72     WANT CUSTOM AGAIN
00620 00062P 005E 26 F9 0059        BNE   INPUT2
00630 00063P 0060 BD 00AF P         JSR   CHANGE   GOT IT, WAIT FOR NEXT
00640 00064P 0063 81 70   A  METR2  CMPA  #$70     CHECK FOR METER2 REQ.
00650 00065P 0065 26 25 008C        BNE   METR3    IF NOT, CHECK METR3
00660 00066P 0067 BD 00AF P         JSR   CHANGE   WAIT FOR DESITED WAIT TIME
00670 00067P 006A 48                ASLA           MULTIPLY USER'S ENTRY BY2
00680 00068P 006B CE 0000 A         LDX   #WAITME  ADDRESS OF WAIT TIME TABLE
00690 00069P 006E FF 0000 A         STX   XSAVE    ADDRESS TO WORKING REGISTER
00700 00070P 0071 BB 0001 A         ADDA  XSAVE+1  FORM ADDRESS OF DESIRED WAIT
00710 00071P 0074 B7 0001 A         STAA  XSAVE+1
00720 00072P 0077 FE 0000 A         LDX   XSAVE    GET ADDRESS OF DESIRED WAIT
00730 00073P 007A EE 00   A         LDX   0,X      GET DESIRED WAIT TIME
00740 00074P 007C FF 0000 A         STX   RECTME   SETUP FOR RECEVE
00741 00075P 007F FF 0000 A         STX   BLNKTM
00750 00076P 0082 BD 00CF P  INPUT3 JSR   GETCDE   GET NOVA TRANSMISSION
00760 00077P 0085 81 70   A         CMPA  #$70
00770 00078P 0087 26 F9 0082        BNE   INPUT3   MUST BRACKET VALUE WITH 112
00780 00079P 0089 BD 00AF P         JSR   CHANGE   WAIT FOR NEXT COMMAND
00790 00080P 008C 81 71   A  METR3  CMPA  #$71     CHECK FOR METER3 REQ.
00800 00081P 008E 26 08 0098        BNE   CHKLIN   IF NOT, WAIT FOR LINE #
00810 00082P 0090 86 1E   A         LDAA  #$1E     SETUP FOR METER3
00820 00083P 0092 B7 0000 A         STAA  METER
```

```
00830 00084P 0095 BD 00AF  P          JSR    CHANGE    WAIT FOR LINE#
00840 00085P 0098 BD 00CF  P  CHKLIN  JSR    GETCDE    GET CURRENT CODE
00850 00086P 009B 81 63    A          CMPA   #$63      CHECK FOR VALID LINE #
00860 00087P 009D 22 F9 0098          BHI    CHKLIN    INSIST ON IT
00870 00088P 009F 86 0A    A          LDAA   #$0A      GOT IT, REPORT TO NOVA
00880 00089P 00A1 B7 0000  A          STAA   PIA
00890 00090P 00A4 CE 7FFF  A          LDX    #$7FFF    SETUP DELAY FOR HARDWARE
00900 00091P 00A7 09          TIME    DEX              SETTLING OF OFF-HOOK DETECT
00910 00092P 00A8 26 FD 00A7          BNE    TIME      COUNT IT DOWN!
00920 00093P 00AA B6 0002  A          LDAA   PIA+2     CLEAR ANY FLAGS
00930 00094P 00AD 0E                  CLI
00940 00095P 00AE 39                  RTS
00950 00096                        *
00960 00097                        *
00970 00098P 00AF B6 0002  A  CHANGE  LDAA   PIA+2     GET COMMAND
00980 00099P 00B2 84 7F    A          ANDA   #$7F      CLEAR HIGH BIT
00990 00100P 00B4 B1 0000  A          CMPA   TEMP      SAME AS LAST COMMAND
01000 00101P 00B7 27 F6 00AF          BEQ    CHANGE    IF SO WAIT FOR CHANGE
01010 00102P 00B9 C6 0F    A          LDAB   #$0F
01020 00103P 00BB 5A          LOOP    DECB
01030 00104P 00BC 26 FD 00BB          BNE    LOOP
01040 00105P 00BE B6 0002  A          LDAA   PIA+2     GET COMMAND AGAIN
01050 00106P 00C1 84 7F    A          ANDA   #$7F
01060 00107P 00C3 B1 0000  A          CMPA   TEMP
01070 00108P 00C6 27 E7 00AF          BEQ    CHANGE
01080 00109P 00C8 B7 0000  A          STAA   TEMP      CHANGED, SAVE NEW COMMAND
01090 00110P 00CB B7 0000  A          STAA   PIA       ECHO COMMAND TO NOVA
01100 00111P 00CE 39                  RTS
01110 00112                        *
01120 00113                        *
01130 00114P 00CF B6 0002  A  GETCDE  LDAA   PIA+2     GET COMMAND
01140 00115P 00D2 84 7F    A          ANDA   #$7F      CLEAR HIGH BIT
01150 00116P 00D4 B7 0000  A          STAA   TEMP      SAVE COMMAND
01160 00117P 00D7 B7 0000  A          STAA   PIA       ECHO TO NOVA
01170 00118P 00DA 39                  RTS
01180 00119                        *
01190 00120                        *
01200 00121                          END
TOTAL ERRORS 00000--00000
00010 00001                          NAM    INTERR
00020 00002                    ******* VERSION  05 - 05 - 83, S W O **************
00030 00003                        *
00040 00004                        *    THIS MODULE HANDLES GENERATION OF THE
00050 00005                        * INTERRGATE SIGNAL USED TO ACTIVATE THE METER
00060 00006                        * ENCODER AT THE SUBSCRIBER'S SITE.
00070 00007                        *    THE TYPE OF METER IS NOW ASSERTAINED FROM THE
00080 00008                        * LINE NUMBER AND THE PROPER FREQUENCY OF TONE IS
00090 00009                        * THEN GENERATED.
00100 00010                        *
00110 00011                        *
00120 00012                          OPT    LLE=80,REL
00130 00013P 0000                    PSCT
00140 00014                          XDEF   INTERR
00150 00015                          XREF   METER,PIA,TEMP,LNGFLG
00160 00016                          XREF   RAWIN,READNG,DURA,LEVEL
00170 00017                        *
00180 00018                        *
00190 00019P 0000 CE 0000  A  INTERR LDX    #RAWIN
00200 00020P 0003 4F                 CLRA
00210 00021P 0004 A7 00    A  LOOP   STAA   0,X       ZERO SERIAL DATA
00220 00022P 0006 08                 INX              BUFFER AREA
00230 00023P 0007 8C 87FF  A         CPX    #$87FF
00240 00024P 000A 26 F8 0004         BNE    LOOP      WHEN DONE.
00241 00025P 000C 0F                 SEI              PREVENT FURTHER INTERRUPTS
00242 00026P 000D B6 0000  A         LDAA   LEVEL     GET CURRENT LEVEL
00243 00027P 0010 48                 ASLA
00244 00028P 0011 48                 ASLA             MOVE TO UPPER 4 BITS
00245 00029P 0012 48                 ASLA
00246 00030P 0013 48                 ASLA
00247 00031P 0014 8A 0D    A         ORAA   #$0D      ADD A BCD 13 FOR NOVA
00248 00032P 0016 B7 0000  A         STAA   PIA       CONTROL LEVEL & XMIT STATUS
00250 00033P 0019 86 36    A         LDAA   #$36      SWITCH MUX TO
00260 00034P 001B B7 0001  A         STAA   PIA+1     TRANSMIT MODE.
00270 00035P 001E F6 0000  A         LDAB   METER     GET#FREQ.TCONSTANT
00280 00036P 0021 F7 0000  A  XMIT   STAB   TEMP      SAVE FREQ CODE
```

```
00290 00037P 0024 FE 0000  A XMIT2  LDX   DURA       DURATION COUNTER
00300 00039P 0027 F6 0000  A XMIT1  LDAB  TEMP
00310 0003CP 002A 86 3E    A LOW    LDAA  #$3E
00320 0003DP 002C B7 0003  A        STAA  PIA+3      INTEROGATE LOW
00330 0003EP 002F 5A                DECB             SETUP LOW 1/2 PERIOD
00340 0003FP 0030 26 F8 002A         BNE  LOW        DONE?
00350 00040P 0032 F6 0000  A        LDAB  TEMP       GET FREQ. CONSTANT AGAIN
00360 00041P 0035 86 3E    A HIGH   LDAA  #$3E
00370 00042P 0037 B7 0003  A        STAA  PIA+3      INTEROGATE HIGH
00380 00043P 003A 5A                DECB             SETUP HIGH 1/2 PERIOD
00390 00044P 003B 26 F8 0035         BNE  HIGH       TOTALLY DONE?
00400 00045P 003D 09                DEX              ONE PERIOD DONE
00410 00046P 003E 26 E7 0027         BNE  XMIT1      ALL DONE YET?
00420 00047P 0040 7D 0000  A        TST   LNGFLG     CHECK FOR LONG REQUEST
00430 00048P 0043 26 DF 0024         BNE  XMIT2
00440 00049P 0045 86 16    A        LDAA  #$16       SET MUX TO INPUT MODE
00450 0004AP 0047 B7 0003  A        STAA  PIA+3      ONCE AGAIN.
00460 0004BP 004A B6 0002  A        LDAA  PIA+2      CLEAR REMAINING FLAGS
00470 0004CP 004D 39                RTS              YES, EXIT
00480 0004D                         END
TOTAL ERRORS 00000--00000

00010 00001                         NAM   RECEIVE
00020 00002                ****** VERSION 05 - 10 - 83, S W O **************
00030 00003                *
00040 00004                *    THIS MODULE HANDLES INPUTTING OF RAW SERIAL
00050 00005                * DATA STREAM. FAST GLITCHES ARE REJECTED AND
00060 00006                * COUNTS PROPORTIONAL TO THE WIDTH OF EACH HIGH
00070 00007                * AND LOW STATE RECEIVED ARE STORED IN MEMORY.
00080 00008                * EVEN ADDRESS STARTING AT HEX 8000 CONTAIN THE
00090 00009                * HIGH STATE COUNTS WHILE THE LOW STATE COUNTS ARE
00100 00010                * STORED IN THE ODD LOCATIONS.
00110 00011                *
00120 00012                *
00130 00013                         OPT   LLE=80,REL
00140 00014P 0000                   PSCT
00150 00015                         XDEF  RECEIVE
00160 00016                         XREF  GLITCH,RAWIN,PIA,TEMP,LEVEL1
00170 00017                         XREF  RECCTR,XSAVE,ERRFLG,RECTME,BLNKTM
00180 00018                *
00190 00019                *
00200 00020P 0000 86 3E    A RECEIVE LDAA #$3E       SWITCH MUX TO
00210 00021P 0002 B7 0001  A        STAA  PIA+1      INPUT MODE
00220 00022P 0005 CE 0000  A        LDX   #RAWIN     INIT ADDRESS POINTER
00230 00023P 0008 86 06    A        LDAA  #$06       INIT GLITCH REJECTION
00240 00024P 000A B7 0000  A        STAA  GLITCH     CONSTANT
00250 00025P 000D 4F                CLRA             CLEAR ACTIVE REGISTER
00260 00026P 000E 5F                CLRB             CLEAR AUXILIARY REG.
00270 00027P 000F BD 0080  P NOCHG  JSR   DELAY      WASTE SOME TIME
00280 00028P 0012 7D 0002  A        TST   PIA+2      READ PORT
00290 00029P 0015 2A F8 000F        BPL   NOCHG      GONE HIGH YET?
00300 0002CP 0017 4C                INCA             YES, FOR 1 CYCLE
00310 0002DP 0018 BD 0080  P CHG1   JSR   DELAY      WASTE SOME TIME
00320 0002EP 001B 7D 0002  A        TST   PIA+2      READ PORT
00330 0002FP 001E 2B 03 0023        BMI   CHG2       STILL HIGH?
00340 00034P 0020 4F                CLRA             NO, WAS GLITCH
00350 00035P 0021 20 EC 000F        BRA   NOCHG      KEEP TRYING FOR HIGH
00360 00036P 0023 4C        CHG2    INCA             HIGH FOR ANOTHER CYCLE
00370 00037P 0024 B1 0000  A        CMPA  GLITCH     LARGER THAN A GLITCH?
00380 00038P 0027 26 EF 0018        BNE   CHG1       NOT YET
00390 00039P 0029 BD 0080  P HIGH1  JSR   DELAY      WASTE SOME TIME
00400 0003AP 002C 7D 0002  A        TST   PIA+2      READ PORT
00410 0003BP 002F 2A 03 0034        BPL   CHGLOW     STILL HIGH?
00420 0003CP 0031 4C        HIGH2   INCA             YES, STILL HIGH.
00430 0003DP 0032 20 F5 0029        BRA   HIGH1      KEEP READING
00440 0003EP 0034 5C        CHGLOW  INCB             A LOW DETECTED
00450 0003FP 0035 BD 0080  P CHGLW1 JSR   DELAY      WASTE SOME TIME
00460 00040P 0038 7D 0002  A        TST   PIA+2      READ PORT
00470 00041P 003B 2A 05 0042        BPL   CHGLW2     STILL LOW?
00480 00042P 003D 1B                ABA              NO, WAS GLITCH
00490 00043P 003E 16                TAB              FOR TIMING ONLY
00500 00044P 003F 5F                CLRB             FILL IN MISSING COUNTS
00510 00045P 0040 20 EF 0031        BRA   HIGH2      KEEP READING 1'S
00520 00046P 0042 5C        CHGLW2  INCB             STILL IS LOW.
00530 00047P 0043 F1 0000  A        CMPB  GLITCH     BIGGER THAN A GLITCH?
```

```
00540 00054P 0046 26 ED 0035           BNE    CHGLW1    NOT YET
00550 00055P 0048 A7 00     A          STAA   0,X       YES, ON TO 0'S STATE
00560 00056P 004A 08                   INX              PT. TO NEXT BYTE
00570 00057P 004B 4F                   CLRA             A REG. NOW AUXILIARY REG.
00580 00058P 004C 8C 0000   A          CPX    #LEVEL1   ALL DONE YET?

00590 00059P 004F 27 2E 007F           BEQ    EXIT      IF SO.
00600 00060P 0051 5C                   INCB             CATCH UP!
00610 00061P 0052 01                   NOP              FOR TIMING
00620 00062P 0053 01                   NOP              "    "
00630 00063P 0054 BD 0080   P  LOW1    JSR    DELAY     WASTE SOME TIME
00640 00064P 0057 7D 0002   A          TST    PIA+2     READ PORT
00650 00065P 005A 2B 03 005F           BMI    CHGHI     STILL LOW?
00660 00066P 005C 5C           LOW2    INCB             YES
00670 00067P 005D 20 F5 0054           BRA    LOW1      KEEP READING
00680 00068P 005F 4C           CHGHI   INCA             A HIGH DETECTED!
00690 00069P 0060 BD 0080   P  CHGHI1  JSR    DELAY     WASTE SOME TIME
00700 00070P 0063 7D 0002   A          TST    PIA+2     READ PORT
00710 00071P 0066 2B 05 006D           BMI    CHGHI2    STILL HIGH?
00720 00072P 0068 1B                   ABA              NO, WAS GLITCH
00730 00073P 0069 16                   TAB              FILL IN MISSING COUNTS
00740 00074P 006A 4F                   CLRA             CLR AUXILIARY REG.
00750 00075P 006B 20 EF 005C           BRA    LOW2      KEEP READING 0'S
00760 00076P 006D 4C           CHGHI2  INCA             STILL IS HIGH.
00770 00077P 006E B1 0000   A          CMPA   GLITCH    BIGGER THAN A GLITCH?
00780 00078P 0071 26 ED 0060           BNE    CHGHI1    NOT YET.
00790 00079P 0073 E7 00     A          STAB   0,X       YES, MOVE TO NEXT STATE
00800 00080P 0075 08                   INX              PT. TO NEXT BYTE
00810 00081P 0076 5F                   CLRB             B REG. NOW AUX. REG.
00820 00082P 0077 8C 0000   A          CPX    #LEVEL1   ALL DONE YET?
00830 00083P 007A 27 03 007F           BEQ    EXIT      IF SO.
00840 00084P 007C 4C                   INCA             CATCH UP!
00850 00085P 007D 20 AA 0029           BRA    HIGH1     NOW GO LOOK FOR 1'S
00860 00086P 007F 39           EXIT    RTS
00870 00087                            *
00880 00088                            ******* SUBROUTINE TO DELAY FOR FREQ. KEYING
00890 00089                            *
00900 00090P 0080 FF 0000   A  DELAY   STX    XSAVE     SAVE X REGISTER
00901 00091P 0083 B7 0000   A          STAA   TEMP
00910 00092P 0086 B6 0001   A          LDAA   XSAVE+1
00911 00093P 0089 81 3F     A          CMPA   #$3F
00920 00094P 008B 23 08 0095           BLS    DELAY1
00930 00095P 008D FE 0000   A          LDX    BLNKTM
00940 00096P 0090 FF 0000   A          STX    RECTME
00950 00097P 0093 20 06 009B           BRA    DELAY2
00960 00098P 0095 FE 0000   A  DELAY1  LDX    XSAVE     FOR TIMING ONLY. THESE
00970 00099P 0098 FF 0000   A          STX    XSAVE     TWO INSTRUCTIONS = 11 MICRO-
00980 00100P 009B B6 0000   A  DELAY2  LDAA   TEMP      RETRIEVE A REGISTER
00990 00101P 009E 81 FE     A          CMPA   #$FE      CHECK FOR A-REG. OVERFLOW
01000 00102P 00A0 22 4A 00EC           BHI    AOVER     IF OVERFLOW
01010 00103P 00A2 C1 FE     A          CMPB   #$FE      CHECK FOR B-REG. OVERFLOW
01020 00104P 00A4 22 4C 00F2           BHI    BOVER     IF OVERFLOW
01030 00105P 00A6 B6 0000   A          LDAA   RECCTR
01040 00106P 00A9 26 07 00B2           BNE    DELAY3
01050 00107P 00AB B6 0001   A          LDAA   RECCTR+1
01051 00108P 00AE 81 7F     A          CMPA   #$7F
01052 00109P 00B0 23 28 00DA           BLS    NOBLNK
01060 00110P 00B2 FE 0000   A  DELAY3  LDX    XSAVE
01070 00111P 00B5 08                   INX              IF SO, IDENTIFY WITH TWO
01071 00112P 00B6 8C 0000   A          CPX    #LEVEL1
01072 00113P 00B9 27 C4 007F           BEQ    EXIT
01090 00114P 00BB B6 0000   A          LDAA   RECCTR
01100 00115P 00BE A7 00     A          STAA   0,X       SAVE THIS COUNT WHICH
01110 00116P 00C0 08                   INX              REPRESENTS THE LENGTH OF
01111 00117P 00C1 8C 0000   A          CPX    #LEVEL1
01112 00118P 00C4 27 B9 007F           BEQ    EXIT
01120 00119P 00C6 B6 0001   A          LDAA   RECCTR+1  THE BLANK SPACE
01130 00120P 00C9 A7 00     A          STAA   0,X
01131 00121P 00CB 08                   INX
01132 00122P 00CC 8C 0000   A          CPX    #LEVEL1
01133 00123P 00CF 27 AE 007F           BEQ    EXIT
01140 00124P 00D1 08                   INX
01141 00125P 00D2 8C 0000   A          CPX    #LEVEL1
01142 00126P 00D5 27 A8 007F           BEQ    EXIT
01150 00127P 00D7 FF 0000   A          STX    XSAVE
```

```
01160 00128P 000A 7F 0000  A  NOBLNK CLR    RECCTR      CLEAR TOO LONG COUNTER
01170 00129P 000D 7F 0001  A         CLR    RECCTR+1    IT'S 2 BYTES WIDE
01180 00130P 00E0 86 03    A         LDAA   #$03        GET DELAY CONSTANT
01190 00131P 00E2 4A          LOOP   DECA               COUNT IT DOWN
01200 00132P 00E3 26 FD 00E2         BNE    LOOP        DONE YET?
01210 00133P 00E5 B6 0000  A         LDAA   TEMP        RESTORE A REGISTER
01220 00134P 00E8 FE 0000  A         LDX    XSAVE       RESTORE X REGISTER
01230 00135P 00EB 39                 RTS                GO RECEIVE SOME MORE
01240 00136P 00EC 4A          AOVER  DECA               PREVENT OVERFLOW
01250 00137P 00ED B7 0000  A         STAA   TEMP        SAVE IT
01260 00138P 00F0 20 01 00F3         BRA    CHKDNE      CHECK IF TOO LONG SINCE CHG
01270 00139P 00F2 5A          BOVER  DECB               PREVENT OVERFLOW
01280 00140P 00F3 FE 0000  A  CHKDNE LDX    RECCTR      GET TOO LONG COUNTER
01290 00141P 00F6 08                 INX                ANOTHER CYCLE WITH OVERFLOW
01300 00142P 00F7 FF 0000  A         STX    RECCTR      UPDATE TOO LONG COUNTER
01310 00143P 00FA BC 0000  A         CPX    RECTME      TOO LONG WITHOUT CHANGE?
01320 00144P 00FD 27 04 0103         BEQ    ALTXIT      IF SO, EXIT AND REPORT ERR
01330 00145P 00FF 86 07    A         LDAA   #$07        USE DIFFERENT DELAY CONSTANT
01340 00146P 0101 20 DF 00E2         BRA    LOOP        GO BACK TO RECEIVE
01350 00147P 0103 31          ALTXIT INS                UNDO JSR TO DELAY
01360 00148P 0104 31                 INS
01370 00149P 0105 7E 007F  P         JMP    EXIT
01380 00150                          END
TOTAL ERRORS 00000--00000
00010 00001                          NAM    PARSET
00020 00002                   ******* VERSION 05 - 05 - 83, S W O **************
00030 00003                   *
00040 00004                   *   THIS MODULE ANALYZES THE RAW METER READING
00050 00005                   *  COUNTS TO DETERMINE THE TRANSMITTED BAUD RATE.
00060 00006                   *  THIS IS ACCOMPLISHED BY FIRST IDENTIFYING
00070 00007                   *  THE KNOWN STRING OF BCD 14'S WHICH ACCOMPANY THE
00080 00008                   *  READING AND DETERMINING THE RELATIVE COUNT
00090 00009                   *  WIDTHS WHICH SHOULD ALSO ENABLE DECODING OF THE
00100 00010                   *  UNKNOWN READING ITSELF.
00110 00011                   *
00120 00012                   *
00130 00013                          OPT    LLE=80,REL
00140 00014P 0000                    PSCT
00150 00015                          XDEF   PARSET
00160 00016                          XREF   LOMARK,HIMARK,MIDDLE,LARGE,RAWIN
00170 00017                          XREF   LEVEL1,TEMP,XSAVE,ERRFLG
00180 00018                          XREF   LOWCTR,HICTR,XSAVE1,ADRPTR
00190 00019                   *
00200 00020                   *
00210 00021P 0000 0F          PARSET SEI
00220 00022P 0001 CE 0000  A         LDX    #RAWIN      GET RAW DATA COUNTS POINTER
00230 00023P 0004 E6 00    A         LDAB   0,X         GET A LOW LEVEL RAW COUNT
00240 00024P 0006 08          PLUS2  INX
00250 00025P 0007 8C 0000  A         CPX    #LEVEL1
00260 00026P 000A 26 03 000F         BNE    PLUS3
00270 00027P 000C 7E 00C6  P         JMP    ERROR
00280 00028P 000F 08          PLUS3  INX
00290 00029P 0010 8C 0000  A         CPX    #LEVEL1
00300 00030P 0013 26 03 0018         BNE    OVER
00310 00031P 0015 7E 00C6  P         JMP    ERROR       IF NO SEQUENCE DETECTED
00320 00032P 0018 A6 00    A  OVER   LDAA   0,X         GET A RAW LOW LEVEL COUNT
00330 00033P 001A B7 0000  A         STAA   TEMP
00340 00034P 001D 10                 SBA                COMPARE LAST TWO COUNTS
00350 00035P 001E 2B 02 0022         BMI    ABSVL1
00360 00036P 0020 20 01 0023         BRA    COMPR1
00370 00037P 0022 40          ABSVL1 NEGA               GET ABSOLUTE VALUE OF DIFFER
00380 00038P 0023 81 0A    A  COMPR1 CMPA   #$0A
00390 00039P 0025 2F 08 002F         BLE    INCLOW
00400 00040P 0027 7F 0000  A         CLR    LOWCTR
00410 00041P 002A F6 0000  A         LDAB   TEMP        HAVEN'T FOUND SEQUENCE YET
00420 00042P 002D 20 07 0036         BRA    PLUS2       KEEP TRYING
00430 00043P 002F 7C 0000  A  INCLOW INC    LOWCTR      LAST TWO MATCHED
00440 00044P 0032 F6 0000  A         LDAB   TEMP
00450 00045P 0035 86 0E    A         LDAA   #$0E
00460 00046P 0037 B1 0000  A         CMPA   LOWCTR      ENOUGH SEQUENTIAL MATCHES YE
00470 00047P 003A 2F 02 003E         BLE    SETLOW      IF SO
00480 00048P 003C 20 C8 0006         BRA    PLUS2       IF NOT, KEEP TRYING
00490 00049P 003E 54          SETLOW LSRB               HAVE IT!!, DIVIDE BY 2
00500 00050P 003F F7 0000  A         STAB   LOMARK      TO FORM LOMARK PARAMETER
00510 00051P 0042 09          MINUS1 DEX                BACK UP 1 RAW COUNT TO HI LV
```

```
00520 00052P 0043 8C 0000  A         CPX    #RAWIN
00530 00053P 0046 27 7E 00C6         BEQ    ERROR
00540 00054P 0048 E6 00    A         LDAB   0,X         GET RAW HIGH LEVEL COUNT
00550 00055P 004A B6 0000  A         LDAA   TEMP        GET LOW DATA COUNT
00560 00056P 004D 8B 0F    A         ADDA   #$0F
00570 00057P 004F 11                 CBA                14 - 14 TRANSITION COUNT SHO
00580 00058P 0050 2A F0 0042         BPL    MINUS1      BE LARGER THAN LOW DATA COUN
00590 00059P 0052 FF 0000  A         STX    XSAVE
00600 00060P 0055 09          MINUS6 DEX
00610 00061P 0056 09                 DEX
00620 00062P 0057 09                 DEX                MOVE POINTER BACK 6 COUNTS
00630 00063P 0058 09                 DEX
00640 00064P 0059 09                 DEX
00650 00065P 005A 09                 DEX
00660 00066P 005B FF 0000  A         STX    ADRPTR
00670 00067P 005E CE 0000  A         LDX    #RAWIN
00680 00068P 0061 FF 0000  A         STX    XSAVE1
00681 00069P 0064 FE 0000  A         LDX    ADRPTR
00690 00070P 0067 B6 0000  A         LDAA   ADRPTR
00700 00071P 006A B1 0000  A         CMPA   XSAVE1
00710 00072P 006D 22 0A 0079         BHI    AHEAD
00720 00073P 006F B6 0001  A         LDAA   ADRPTR+1
00730 00074P 0072 B1 0001  A         CMPA   XSAVE1+1
00740 00075P 0075 22 02 0079         BHI    AHEAD
00741 00076P 0077 20 4D 00C6         BRA    ERROR
00750 00077P 0079 A6 00    A  AHEAD  LDAA   0,X         GET NEXT HIGH LEVEL COUNT
00760 00078P 007B B7 0001  A         STAA   TEMP+1
00770 00079P 007E 10                 SBA                CHECK FOR SEQUENCE
00780 00080P 007F 2B 02 0083         BMI    ABSVL2
00790 00081P 0081 20 01 0084         BRA    COMPR2
00800 00082P 0083 40          ABSVL2 NEGA
00810 00083P 0084 81 0A    A  COMPR2 CMPA   #$0A
00820 00084P 0086 2F 08 0090         BLE    INCHI
00830 00085P 0088 7F 0000  A         CLR    HICTR
00840 00086P 008B FE 0000  A         LDX    XSAVE
00850 00087P 008E 20 B2 0042         BRA    MINUS1      IF NO SEQUENCE YET
00860 00088P 0090 7C 0000  A  INCHI  INC    HICTR
00870 00089P 0093 F6 0001  A         LDAB   TEMP+1
00880 00090P 0096 86 03    A         LDAA   #$03
00890 00091P 0098 B1 0000  A         CMPA   HICTR       ENOUGH MATCHES IN A SEQUENCE
00900 00092P 009B 2F 02 009F         BLE    SETHI
00910 00093P 009D 20 B6 0055         BRA    MINUS6
00920 00094P 009F 17          SETHI  TBA
00930 00095P 00A0 54                 LSRB
00940 00096P 00A1 F7 0000  A         STAB   TEMP        SAVE 1/2 THE 14 - 14 COUNT
00950 00097P 00A4 54                 LSRB
00960 00098P 00A5 F7 0001  A         STAB   TEMP+1      SAVE 1/4 THE 14 - 14 COUNT
00970 00099P 00A8 FB 0000  A         ADDB   TEMP
00980 00100P 00AB F7 0000  A         STAB   MIDDLE      MIDDLE PARAMETER GENERATED!!
00990 00101P 00AE F6 0001  A         LDAB   TEMP+1      GET 1/4 COUNT BACK
01000 00102P 00B1 54                 LSRB
01010 00103P 00B2 F7 0000  A         STAB   TEMP        SAVE 1/8 THE 14 - 14 COUNT
01020 00104P 00B5 FB 0001  A         ADDB   TEMP+1
01030 00105P 00B8 F7 0000  A         STAB   HIMARK
01040 00106P 00BB BB 0000  A         ADDA   TEMP
01050 00107P 00BE 24 02 00C2         BCC    SETLRG
01060 00108P 00C0 86 FD    A         LDAA   #$FD        SET LARGE TO DEC. 253
01070 00109P 00C2 B7 0000  A  SETLRG STAA   LARGE       LARGE PARAMETER GENERATED
01080 00110P 00C5 39          EXIT   RTS
01090 00111P 00C6 86 0D    A  ERROR  LDAA   #$0D        COULDN'T SYNCH UP
01100 00112P 00C8 B7 0000  A         STAA   ERRFLG
01110 00113P 00CB 20 F8 00C5         BRA    EXIT
01120 00114                          END
TOTAL ERRORS 00000--00000
00010 00001                          NAM    DECODE
00020 00002                   ****** VERSION 05 - 04 - 83, S W O **************
00030 00003                   *
00040 00004                   *      THIS MODULE CONVERTS THE RAW SERIAL DATA
00050 00005                   * CONTAINED IN "RAWIN" TO A SEQUENTIAL BLOCK OF
00060 00006                   * 1'S AND 0'S. THIS IS THE FREQUENCY KEYING VERSION
00070 00007                   * AND IS PREPARED TO RETREIVE THE METER READING
00080 00008                   * EVEN IF BOTH THE NARROWEST MARK BITS ARE MISSING.
00090 00009                   * BYTES ARE 1ST CHECKED FOR A TOO LARGE CONDITION
00100 00010                   * WITH A SUBSEQUENT BREAKING UP INTO 2 SEPARATE
00110 00011                   * "0" BITS. NEXT THE REMAINING BIT MARK DATA
```

```
00120 00012                          * IS STRIPPED OUT LEAVING ONLY DATA BITS. IF THREE
00130 00013                          * DATA BITS ARE FOUND IN A ROW, THE MIDDLE ONE
00140 00014                          * IS THROWN OUT.
00150 00015                          *
00160 00016                          *
00170 00017                                  OPT     LLE=80,REL
00180 00018P 0000                            PSCT
00190 00019                                  XDEF    DECODE
00200 00020                                  XREF    ADRPTR,BYTPTR,RAWIN,LEVEL1,TEMP
00210 00021                                  XREF    LARGE,HIMARK,LOMARK,MIDDLE,XSAVE
00220 00022                          *
00230 00023                          *
00240 00024P 0000 0F         DECODE  SEI                     DISABLE OFF-HOOK INT.
00250 00025P 0001 7F 0000 A          CLR     TEMP            CLR TEMP STORAGE LOCATION
00260 00026P 0004 CE 0000 A          LDX     #LEVEL1         INIT DECODED DATA
00270 00027P 0007 FF 0000 A          STX     BYTPTR          STORAGE AREA POINTER
00280 00028P 000A CE 0000 A          LDX     #RAWIN          INIT RAW INPUT DATA
00290 00029P 000D FF 0000 A  DECOD1  STX     ADRPTR          STORAGE AREA POINTER
00300 00030P 0010 BD 00B9 P          JSR     BLANK
00310 00031P 0013 A6 00    A         LDAA    0,X             GET RAW DATA BYTE
00320 00032P 0015 B1 0000 A          CMPA    LARGE           CHECK FOR TOO LARGE
00330 00033P 0018 22 6F 0089         BHI     LRGBYT          IF SO, BREAK INTO 2 0'S
00340 00034P 001A F6 0001 A          LDAB    ADRPTR+1        GET LOWER BYTE OF DATA ADDR.
00350 00035P 001D C4 01    A         ANDB    #$01            TEST FOR ODD OR EVEN
00360 00036P 001F 27 07 0028         BEQ     LOWTST          EVEN = LOW VOLTAGE (1 BIT)
00370 00037P 0021 B1 0000 A          CMPA    HIMARK          WAS ODD, USE HIGH VOLT. CONS
00380 00038P 0024 22 0C 0032         BHI     DATA            DATA OR MARK BIT?
00390 00039P 0026 20 05 002D         BRA     MARK            IS A MARK BIT
00400 00040P 0028 B1 0000 A  LOWTST  CMPA    LOMARK          WAS EVEN, USE LOW VOLT. CONS
00410 00041P 002B 22 05 0032         BHI     DATA            IF THIS IS A DATA BIT
00420 00042P 002D 7F 0000 A  MARK    CLR     TEMP            OTHERWISE, A MARK BIT
00430 00043P 0030 20 64 0096         BRA     NEXBIT          IGNORE AND GET NEXT BYTE
00440 00044P 0032 7C 0000 A  DATA    INC     TEMP            FLAG ANOTHER DATA BYTE
00450 00045P 0035 C6 03    A         LDAB    #$03            CHECK FOR
00460 00046P 0037 F1 0000 A          CMPB    TEMP            THREE IN A ROW
00470 00047P 003A 26 3C 0078         BNE     STRBIT          IF NOT
00480 00048P 003C 08                 INX                     PT. TO NEXT RAW DATA BYTE
00490 00049P 003D E6 00    A         LDAB    0,X             GET NEXT BYTE
00500 00050P 003F FF 0000 A          STX     XSAVE           SAVE THIS ADDRESS
00510 00051P 0042 09                 DEX                     RESTORE ADDRESS POINTER
00520 00052P 0043 B6 0001 A          LDAA    XSAVE+1         GET LOWER BYTE OF ADDRESS
00530 00053P 0046 84 01    A         ANDA    #$01            TEST FOR ODD OR EVEN
00540 00054P 0048 27 07 0051         BEQ     LOTST           IF EVEN, USE LOW VOLT. CONST
00550 00055P 004A F1 0000 A          CMPB    HIMARK          OTHERWISE, USE HIGH VOLT. CO
00560 00056P 004D 23 0F 005E         BLS     DATA1           CHECK FOR DATA OR MARK
00570 00057P 004F 20 05 0056         BRA     FOUR            4 IN A ROW. MAKE DECODE THIN
00580 00058P 0051 F1 0000 A  LOTST   CMPB    LOMARK          USE LOW VOLT. CONSTANT 00590 00059P 0054 23 08 005E         BLS     DATA1           CHECK FOR DATA OR MARK
00600 00060P 0056 7A 0000 A  FOUR    DEC     TEMP            3 IN A ROW NEXT ROUND.
00610 00061P 0059 FE 0000 A          LDX     BYTPTR          RETRIEVE DEST. ADDRESS.
00620 00062P 005C 20 34 0092         BRA     INCBYT          NEXT BYTE WILL FORCE ADJUST
00630 00063P 005E 09         DATA1   DEX                     POINT TO MIDDLE BYTE OF THRE
00640 00064P 005F FF 0000 A          STX     XSAVE           SAVE X REGISTER
00650 00065P 0062 E6 00    A         LDAB    0,X             GET MIDDLE BYTE
00660 00066P 0064 08                 INX                     RESTORE CURRENT POINTER
00670 00067P 0065 B6 0001 A          LDAA    XSAVE+1         GET LOWER BYTE OF X
00680 00068P 0068 84 01    A         ANDA    #$01            CHECK FOR ODD OR EVEN ADDRES
00690 00069P 006A 27 0C 0078         BEQ     STRBIT          IF MIDDLE BYTE EVEN, SKIP AD
00700 00070P 006C F1 0000 A          CMPB    MIDDLE          MIDDLE BYTE DATA OR MARK
00710 00071P 006F 22 07 0078         BHI     STRBIT          IF DATA BYTE
00720 00072P 0071 FE 0000 A          LDX     BYTPTR          OTHERWISE, FORCE 3RD
00730 00073P 0074 09                 DEX                     BIT TO 2ND POSITION
00740 00074P 0075 FF 0000 A          STX     BYTPTR
00750 00075P 0078 5F         STRBIT  CLRB                    PRELOAD A "0" BIT
00760 00076P 0079 B6 0001 A          LDAA    ADRPTR+1        TEST FOR ODD
00770 00077P 007C 84 01    A         ANDA    #$01            OR EVEN ADDRESS
00780 00078P 007E 26 02 0082         BNE     LOWBIT          ODD ADDRESS, BIT = "0"
00790 00079P 0080 C6 01    A         LDAB    #$01            EVEN ADDRESS, BIT = "1"
00800 00080P 0082 FE 0000 A  LOWBIT  LDX     BYTPTR          GET DESTINATION ADDRESS
00810 00081P 0085 E7 00    A         STAB    0,X             STORE THIS DATA BIT
00820 00082P 0087 20 09 0092         BRA     INCBYT          GO COMPLETE NEXT DEST. ADDR.
00830 00083P 0089 4F         LRGBYT  CLRA                    PRELOAD "0" BIT
00840 00084P 008A FE 0000 A          LDX     BYTPTR          GET DESTINATION ADDRESS
00850 00085P 008D A7 00    A         STAA    0,X             STORE A "0" BIT
00860 00086P 008F 08                 INX                     GET NEXT DESTINATION ADDRESS
```

```
00870 00087P 0090 A7 00      A          STAA    0,X          STORE A 2ND "0" BIT
00880 00088P 0092 08             INCBYT INX                  POINT TO NEXT AVAILABLE
00890 00089P 0093 FF 0000    A          STX     BYTPTR       DESTINATION ADDRESS
00900 00090P 0096 CE 0000    A   NEXBIT LDX     #LEVEL1
00910 00091P 0099 FF 0000    A          STX     XSAVE
00920 00092P 009C FE 0000    A          LDX     ADRPTR
00930 00093P 009F 08                    INX
00940 00094P 00A0 FF 0000    A          STX     ADRPTR
00950 00095P 00A3 B6 0000    A          LDAA    ADRPTR
00960 00096P 00A6 B1 0000    A          CMPA    XSAVE
00970 00097P 00A9 22 0D 00B8            BHI     EXIT
00980 00098P 00AB 26 08 00B5            BNE     NEXBT1
00990 00099P 00AD B6 0001    A          LDAA    ADRPTR+1
01000 00100P 00B0 B1 0001    A          CMPA    XSAVE+1
01010 00101P 00B3 22 03 00B8            BHI     EXIT
01020 00102P 00B5 7E 000D    P   NEXBT1 JMP     DECOD1
01030 00103P 00B8 39              EXIT  RTS
01040 00104                       *
01050 00105                       * THIS ROUTINE CHECKS FOR THE INTER-METER BLANK
01060 00106                       * PATTERN. IF FOUND, THE LEVEL1 PATTERN IS
01070 00107                       * INTERRUPTED BY TWO "FF'S" BRACKETING A
01080 00108                       * COUNT OF 0 TO 256 REPRESENTING THE WIDTH OF
01090 00109                       * THE BLANK SPACE ENCOUNTERED.
01100 00110                       *
01110 00111P 00B9 A6 00      A   BLANK  LDAA    0,X          GET RAW DATA BYTE
01120 00112P 00BB 26 29 00E6            BNE     RETURN
01121 00113P 00BD A6 01      A          LDAA    1,X
01122 00114P 00BF 27 25 00E6            BEQ     RETURN
01130 00115P 00C1 A6 03      A          LDAA    3,X
01140 00116P 00C3 26 21 00E6            BNE     RETURN
01141 00117P 00C5 A6 04      A          LDAA    4,X
01142 00118P 00C7 27 1D 00E6            BEQ     RETURN
01150 00119P 00C9 E6 01      A          LDAB    1,X          GET BLANKTIME COUNT
01160 00120P 00CB FE 0000    A          LDX     BYTPTR       STORE TO ADDRESS
01170 00121P 00CE 86 FF      A          LDAA    #$FF
01180 00122P 00D0 A7 00      A          STAA    0,X
01190 00123P 00D2 08                    INX
01200 00124P 00D3 E7 00      A          STAB    0,X
01210 00125P 00D5 08                    INX
01220 00126P 00D6 A7 00      A          STAA    0,X
01230 00127P 00D8 08                    INX
01240 00128P 00D9 FF 0000    A          STX     BYTPTR
01250 00129P 00DC FE 0000    A          LDX     ADRPTR
01260 00130P 00DF 08                    INX                  MOVE RAW DATA POINTER
01270 00131P 00E0 08                    INX                  PAST THE INTER-METER
01280 00132P 00E1 08                    INX                  IDENTIFYING PATTERN
01290 00133P 00E2 08                    INX
01300 00134P 00E3 FF 0000    A          STX     ADRPTR
01310 00135P 00E6 39             RETURN RTS
01320 00136                             END
TOTAL ERRORS 00000--00000

00010 00001                              NAM    SYNCH4
00020 00002                       ****** VERSION 05 - 11 - 83, S W O ***************
00030 00003                       *
00040 00004                       *      THIS MODULE CONVERTS THE DECODED PATTERN OF
00050 00005                       * 1'S AND 0'S OUTPUTTED FROM THE DECODE MODULE
00060 00006                       * INTO THE RECOGNIZABLE BCD DIGITS TRANSMITTED
00070 00007                       * FROM THE REMOTE M.I.U. DEVICE. SYNCH-UP
00080 00008                       * REQUIRES 3 CONSECUTIVE BCD 14'S WHILE LOSS OF
00090 00009                       * SYNCH OCCURS WHEN MORE THAN 4 NON-14'S ARE
00100 00010                       * DETECTED.
00110 00011                       *
00120 00012                       *
00130 00013                              OPT    LLE=80,REL
00140 00014P 0000                        PSCT
00150 00015                              XDEF   SYNCH4
00160 00016                              XREF   READNG,ENDADD,BEGADR,BYTPTR,ADRPTR
00170 00017                              XREF   LEVEL1,SYNCFG,NONFG,CTR14,BYTSAV,ERRF
00180 00018                              XREF   LOWCTR,TEMP,METRCT,XSAVE,XSAVE1
00181 00019                              XREF   DIGITS
00190 00020                       *
00200 00021                       *
00210 00022P 0000 7F 0000    A   SYNCH4 CLR     SYNCFG       INIT ALL MODULE PARAMETERS
00220 00023P 0003 7F 0000    A          CLR     NONFG        NON 14 COUNTER
```

```
00230 00024P 0006 7F 0000  A            CLR   CTR14     # OF CONSECUTIVE 14'S CTR
00231 00025P 0009 CE 0000  A            LDX   #LEVEL1
00232 00026P 000C FF 0000  A            STX   XSAVE1
00240 00027P 000F CE FFFF  A            LDX   #DIGITS-1
00250 00028P 0012 FF 0000  A            STX   ENDADD    FOR DIGOUT
00260 00029P 0015 FF 0000  A            STX   BYTPTR    DIGIT STORE-TO ADDRESS
00270 00030P 0018 CE FFFF  A            LDX   #READNG-1 BOTTOM OF 1'S AND 0'S STORA
00280 00031P 001B FF 0000  A            STX   ADRPTR    1'S AND 0'S POINTER
00290 00032P 001E BD 0093  P  GETDIG    JSR   FBYTE     MAKE DIGIT OUT OF 4 1'S AND
00300 00033P 0021 7D 0000  A            TST   SYNCFG    ARE WE IN SYNCH?
00310 00034P 0024 27 2D 0053           BEQ   SYNCH     IF NOT, GO GET IN SYNCH.
00320 00035P 0026 B6 0000  A            LDAA  BYTSAV    IN SYNCH, GET THIS DIGIT
00330 00036P 0029 81 0E    A            CMPA  #$0E      IS IT A 14?
00340 00037P 002B 26 05 0032           BNE   NON14     IF NOT, GO HANDLE IT
00350 00038P 002D 7F 0000  A            CLR   NONFG     IS A 14, RESET NON14 CTR.
00360 00039P 0030 20 53 0085           BRA   STORIT    AND GO STORE THE 14
00370 00040P 0032 7C 0000  A  NON14     INC   NONFG     NON 14, COUNT HOW MANY
00380 00041P 0035 F6 0000  A            LDAB  NONFG     MAX # ALLOWED
00390 00042P 0038 C1 06    A            CMPB  #6        REACHED THE MAXIMUM?
00400 00043P 003A 23 49 0085           BLS   STORIT    IF NOT STORE VALID DATA
00410 00044P 003C 7F 0000  A            CLR   NONFG     TOO MANY, PREPARE TO RE-SYNC
00420 00045P 003F 7F 0000  A            CLR   SYNCFG    FORCES A RE-SYNCH
00430 00046P 0042 C6 1C    A            LDAB  #28       BACKUP ADRPTR TO BEGINNING
00440 00047P 0044 BD 007A  P            JSR   DECPTR    OF CURRENT NON-14 GROUP
00450 00048P 0047 FE 0000  A            LDX   BYTPTR
00460 00049P 004A 08                    INX
00470 00050P 004B 08                    INX
00480 00051P 004C 08                    INX
00490 00052P 004D 08                    INX
00500 00053P 004E FF 0000  A            STX   BYTPTR
00510 00054P 0051 20 CB 001E           BRA   GETDIG    GO SYNCH UP!
00520 00055                       *
00530 00056                       * THIS SECTION GETS THE MODULE BACK IN SYNCH BY
00540 00057                       * DECREMENTING THE ADRPTR 1 POSITION AT A TIME
00550 00058                       * AND LOOKING FOR 3 14'S IN A ROW
00560 00059                       *
00570 00060P 0053 B6 0000  A  SYNCH     LDAA  BYTSAV    GET CURRENT DIGIT
00580 00061P 0056 81 0E    A            CMPA  #$0E      IS IT A BCD 14?
00590 00062P 0058 27 0A 0064           BEQ   MAYBE     IF SO WE MAY HAVE SYNCH
00600 00063P 005A 7F 0000  A            CLR   CTR14     IF NOT KEEP LOOKING
00610 00064P 005D C6 03    A            LDAB  #3
00620 00065P 005F BD 007A  P            JSR   DECPTR    ADDRESS POINTER BACK 3
00630 00066P 0062 20 BA 001E           BRA   GETDIG    GET NEXT DIGIT
00640 00067P 0064 F6 0000  A  MAYBE     LDAB  CTR14     HAD 3 14'S IN A ROW YET?
00650 00068P 0067 C1 02    A            CMPB  #2
00660 00069P 0069 22 05 0070           BHI   INSYNC    IF SO WE'RE BACK IN SYNCH!
00670 00070P 006B 7C 0000  A            INC   CTR14     IF NOT CHALK UP THIS ONE
00680 00071P 006E 20 AE 001E           BRA   GETDIG    AND KEEP TRYING!
00690 00072P 0070 7C 0000  A  INSYNC    INC   SYNCFG    IN SYNCH, FLAG IT
00700 00073P 0073 C6 0C    A            LDAB  #12
00710 00074P 0075 BD 007A  P            JSR   DECPTR    BACKUP ADDRESS PTR 3 DIGITS
00720 00075P 0078 20 A4 001E           BRA   GETDIG    GO BACK OVER BUT WITH SYNCH
00730 00076                       *
00740 00077                       * THIS SECTION SIMPLY BACKS UP THE 1'S AND 0'S
00750 00078                       * POINTER (ADRPTR) BY THE NUMBER CONTAINED IN
00760 00079                       * THE "B" REGISTER UPON ENTRY.
00770 00080                       *
00780 00081P 007A FE 0000  A  DECPTR    LDX   ADRPTR    GET ADRPTR
00790 00082P 007D 08          LOOP      INX             BACKUP 1
00800 00083P 007E 5A                    DECB            COUNT IT DOWN
00810 00084P 007F 26 FC 007D           BNE   LOOP      DONE YET?
00820 00085P 0081 FF 0000  A            STX   ADRPTR    IF SO GO BACK
00830 00086P 0084 39                    RTS             DO IT
00840 00087                       *
00850 00088                       *
00860 00089P 0085 FE 0000  A  STORIT    LDX   BYTPTR    GET CURRENT STORE POINTER
00870 00090P 0088 B6 0000  A            LDAA  BYTSAV    GET CURRENT DIGIT
00880 00091P 008B A7 00    A            STAA  0,X       SAVE IN DIGIT STORAGE AREA
00890 00092P 008D 09                    DEX
00900 00093P 008E FF 0000  A            STX   BYTPTR    POINT TO NEXT AVAILABLE LOC.
00910 00094P 0091 20 8B 001E           BRA   GETDIG    CONTINUE
00920 00095                       **
00930 00096                       * THIS SECTION USES ADRPTR TO POINT TO BEGINNING OF
00940 00097                       * 4 CONSECUTIVE BITS WHICH SHOULD BE CONVERTED TO
```

```
00950 00098                       * A SINGLE BCD DIGIT
00960 00099                       * OUTPUT DIGIT GOES TO BYTSAV, ADRPTR IS -4 ON EXIT
00970 00100                       *
00980 00101P 0093 7F 0000   A FBYTE  CLR   BYTSAV    CLEAR DIGIT STORAGE LOCATION
00990 00102P 0096 FE 0000   A       LDX   ADRPTR    GET ADRPTR
01000 00103P 0099 C6 04     A       LDAB  #$04      TO COUNT # OF BITS
01010 00104P 009B A6 00     A GETBIT LDAA  0,X       GET A BIT
01020 00105P 009D 81 FF     A       CMPA  #$FF
01021 00106P 009F 27 3F 00E0         BEQ   BLNKCK
01030 00107P 00A1 BA 0000   A       ORAA  BYTSAV    STORE IN BYTSAV TEMP.
01040 00108P 00A4 B7 0000   A       STAA  BYTSAV
01050 00109P 00A7 09          GETBT1 DEX
01060 00110P 00A8 FF 0000   A       STX   ADRPTR
01100 00111P 00AB B6 0000   A       LDAA  ADRPTR
01110 00112P 00AE B1 0000   A       CMPA  XSAVE1
01120 00113P 00B1 22 0C 00BF        BHI   AHEAD
01130 00114P 00B3 B6 0001   A       LDAA  ADRPTR+1
01140 00115P 00B6 B1 0001   A       CMPA  XSAVE1+1
01150 00116P 00B9 22 04 00BF        BHI   AHEAD    IF NOT, KEEP GOING 01160 00117P 00BB 31                INS             USE ALTERNATE EXIT
01170 00118P 00BC 31                INS
01180 00119P 00BD 20 09 00C8        BRA   EXIT
01190 00120P 00BF 5A         AHEAD  DECB            FINISHED ANOTHER BIT
01200 00121P 00C0 27 05 00C7        BEQ   DONE     DONE ALL 4 YET?
01210 00122P 00C2 78 0000   A       ASL   BYTSAV   SHIFT LAST BIT TO LEFT 1
01220 00123P 00C5 20 D4 009B        BRA   GETBIT   GET NEXT BIT
01230 00124P 00C7 39         DONE   RTS
01240 00125                       *
01250 00126P 00C8 CE 0000   A EXIT   LDX   #READNG  GET START OF DIGIT AREA
01260 00127P 00CB A6 00     A ZERTST LDAA  0,X       GET THIS DIGIT
01270 00128P 00CD 26 0D 000C        BNE   SETBEG   IF NON-ZERO, DONE
01280 00129P 00CF 08                INX             GET NEXT DIGIT
01290 00130P 00D0 8C FFFF   A       CPX   #DIGITS-1
01300 00131P 00D3 27 02 00D7        BEQ   ERROR
01310 00132P 00D5 20 F4 00CB        BRA   ZERTST   KEEP GOING
01320 00133P 00D7 86 0C     A ERROR  LDAA  #$0C     ERROR REPORT
01330 00134P 00D9 B7 0000   A       STAA  ERRFLG
01340 00135P 00DC FF 0000   A SETBEG STX   BEGADR   FOR DIGOUT
01350 00136P 00DF 39                RTS             ALL DONE!
01360 00137                       *
01370 00138                       *
01380 00139P 00E0 7F 0000   A BLNKCK CLR   NONFG
01390 00140P 00E3 7F 0000   A       CLR   LOWCTR
01400 00141P 00E6 7F 0000   A       CLR   CTR14
01410 00142P 00E9 7F 0000   A       CLR   SYNCFG
01420 00143P 00EC 7F 0000   A       CLR   TEMP
01430 00144P 00EF 09         BLANK  DEX
01440 00145P 00F0 A6 00     A       LDAA  0,X
01450 00146P 00F2 BB 0000   A       ADDA  LOWCTR
01460 00147P 00F5 B7 0000   A       STAA  LOWCTR
01470 00148P 00F8 09                DEX
01480 00149P 00F9 09         DECNEX DEX
01490 00150P 00FA A6 00     A       LDAA  0,X
01500 00151P 00FC 81 FF     A       CMPA  #$FF
01501 00152P 00FE 26 05 0105        BNE   NONNEG
01510 00153P 0100 7F 0000   A       CLR   TEMP
01520 00154P 0103 20 EA 00EF        BRA   BLANK
01530 00155P 0105 7D 0000   A NONNEG TST   TEMP
01540 00156P 0108 26 03 010D        BNE   INCFLG
01550 00157P 010A FF 0000   A       STX   XSAVE
01560 00158P 010D B6 0000   A INCFLG LDAA  TEMP
01570 00159P 0110 4C                INCA
01580 00160P 0111 B7 0000   A       STAA  TEMP
01590 00161P 0114 81 14     A       CMPA  #$14
01600 00162P 0116 22 02 011A        BHI   CMPUTE
01610 00163P 0118 20 DF 00F9        BRA   DECNEX
01620 00164P 011A FE 0000   A CMPUTE LDX   BYTPTR
01630 00165P 011D 86 1A     A       LDAA  #$1A
01640 00166P 011F A7 00     A       STAA  0,X
01650 00167P 0121 09                DEX
01660 00168P 0122 F6 0000   A       LDAB  LOWCTR
01670 00169P 0125 E7 00     A       STAB  0,X
01680 00170P 0127 09                DEX
```

```
01690 00171P 0128 A7 00    A         STAA    0,X
01700 00172P 012A 09                 DEX
01710 00173P 012B FF 0000  A         STX     BYTPTR
01720 00174P 012E 7F 0000  A         CLR     LOWCTR 01730 00175P 0131 7F 0000  A         CLR     TEMP
01740 00176P 0134 C6 01    A         LDAB    #$01
01750 00177P 0136 FE 0000  A         LDX     XSAVE
01760 00178P 0139 09                 DEX
01770 00179P 013A 09                 DEX
01780 00180P 013B 09                 DEX
01790 00181P 013C 09                 DEX
01800 00182P 013D 7E 00A7  P         JMP     GETBT1
01810 00183                          END
TOTAL ERRORS 00000--00000

00010 00001                          NAM     COUNT
00020 00002              ****** VERSION 05 - 11 - 83, S W O ***************
00030 00003              *
00040 00004              *     THIS MODULE ANALYZES THE DECODED & SYNCHED
00050 00005              *  DATA AND PREPARES IT FOR OUTPUT TO THE NOVA OR
00060 00006              *  TEST SET DISPLAY.
00070 00007              *
00080 00008              *
00090 00009                          OPT     LLE=80,REL
00100 00010P 0000                    PSCT
00110 00011                          XDEF    COUNT
00120 00012                          XREF    BEGADR,ENDADD,ADRPTR,BYTPTR,TEMP
00130 00013                          XREF    XSAVE,XSAVE1,CTR14,CTR15,CTRALL
00140 00014                          XREF    DIGITS,METRCT
00150 00015              *
00160 00016              *
00170 00017P 0000 CE 0000  A COUNT   LDX     #DIGITS
00180 00018P 0003 FF 0000  A         STX     BYTPTR
00190 00019P 0006 FE 0000  A         LDX     BEGADR
00200 00020P 0009 5F                 CLRB
00210 00021P 000A 7F 0000  A         CLR     CTR14
00220 00022P 000D 7F 0000  A         CLR     CTR15
00230 00023P 0010 7F 0000  A         CLR     TEMP
00240 00024P 0013 7F 0000  A         CLR     CTRALL
00250 00025P 0016 7F 0000  A         CLR     METRCT
00260 00026P 0019 A6 00    A GTSTRT  LDAA    0,X
00270 00027P 001B 81 1A    A         CMPA    #$1A        CK FOR INITIAL BLANK
00280 00028P 001D 27 0E 002D         BEQ     STRTDL
00290 00029P 001F 5C                 INCB
00300 00030P 0020 C1 03    A         CMPB    #$03
00310 00031P 0022 27 17 003B         BEQ     SETBEG
00320 00032P 0024 08                 INX
00330 00033P 0025 8C 0000  A         CPX     #DIGITS
00340 00034P 0028 26 EF 0019         BNE     GTSTRT
00350 00035P 002A 7E 013B  P         JMP     EXIT
00360 00036P 002D A6 02    A STRTDL  LDAA    2,X
00370 00037P 002F 81 1A    A         CMPA    #$1A
00380 00038P 0031 26 E6 0019         BNE     GTSTRT
00390 00039P 0033 86 FF    A         LDAA    #$FF
00400 00040P 0035 B7 0000  A         STAA    METRCT
00410 00041P 0038 BD 010B  P         JSR     CMPARE
00420 00042P 003B BD 00FD  P SETBEG  JSR     CNTSTR
00430 00043              *
00440 00044P 003E 08                 FETCH   INX
00450 00045P 003F 8C 0000  A         CPX     #DIGITS
00460 00046P 0042 27 25 0069         BEQ     FETCH4
00480 00047P 0044 A6 00    A FET1    LDAA    0,X
00490 00048P 0046 7C 0000  A         INC     TEMP
00500 00049P 0049 81 0E    A         CMPA    #$0E        14?
00510 00050P 004B 26 03 0050         BNE     FETCH1
00520 00051P 004D 7C 0000  A         INC     CTR14
00530 00052P 0050 81 0F    A FETCH1  CMPA    #$0F
00540 00053P 0052 26 11 0065         BNE     FETCH3      15?
00550 00054P 0054 7D 0000  A         TST     CTR15
00560 00055P 0057 26 09 0062         BNE     FETCH2
00570 00056P 0059 FF 0000  A         STX     XSAVE
00580 00057P 005C F6 0000  A         LDAB    TEMP        SAVE LOC. OF 15
00590 00058P 005F F7 0000  A         STAB    CTRALL
```

```
00600 00059P 0062 7C 0000  A  FETCH2 INC   CTR15
00610 00060P 0065 81 1A    A  FETCH3 CMPA  #$1A       26?
00620 00061P 0067 26 D5 003E         BNE   FETCH
00630 00062P 0069 FF 0000  A  FETCH4 STX   ADRPTR
00640 00063P 006C B6 0000  A         LDAA  TEMP
00650 00064P 006F 81 0F    A         CMPA  #$0F
00660 00065P 0071 23 50 00C3         BLS   ERROR      ENOUGH DIGITS?
00670 00066P 0073 B6 0000  A         LDAA  CTR14
00680 00067P 0076 81 03    A         CMPA  #$03       ENOUGH 14'S?
00690 00068P 0078 23 49 00C3         BLS   ERROR
00700 00069P 007A B6 0000  A         LDAA  CTR15
00710 00070P 007D 81 02    A         CMPA  #$02       TOO MANY 15'S?
00720 00071P 007F 22 42 00C3         BHI   ERROR
00730 00072P 0081 FE 0000  A         LDX   XSAVE      GET LOC. OF 15
00740 00073P 0084 A6 01    A         LDAA  1,X        METER ID
00750 00074P 0086 BD 00E5  P         JSR   LASTOR
00760 00075P 0089 86 16    A         LDAA  #$16       "22" DELIMITER
00770 00076P 008B BD 00E5  P         JSR   LASTOR
00780 00077P 008E B6 0000  A         LDAA  CTRALL
00790 00078P 0091 81 0C    A         CMPA  #$0C
00800 00079P 0093 22 08 009D         BHI   BACKUP
00810 00080P 0095 86 05    A         LDAA  #$05
00820 00081P 0097 08        FORWRD  INX
00830 00082P 0098 4A                 DECA             GO FORWARD TO DATA
00840 00083P 0099 26 FC 0097         BNE   FORWRD
00850 00084P 009B 20 06 00A3         BRA   STRDAT
00860 00085P 009D 86 0B    A  BACKUP LDAA  #$0B
00870 00086P 009F 09        BACK1   DEX              GO BACKWARDS TO DATA
00880 00087P 00A0 4A                 DECA
00890 00088P 00A1 26 FC 009F         BNE   BACK1
00900 00089P 00A3 A6 00    A  STRDAT LDAA  0,X
00910 00090P 00A5 BD 00E5  P         JSR   LASTOR
00920 00091P 00A8 A6 01    A         LDAA  1,X
00930 00092P 00AA BD 00E5  P         JSR   LASTOR
00940 00093P 00AD A6 02    A         LDAA  2,X
00950 00094P 00AF BD 00E5  P         JSR   LASTOR
00960 00095P 00B2 A6 03    A         LDAA  3,X
00970 00096P 00B4 BD 00E5  P         JSR   LASTOR
00980 00097P 00B7 A6 04    A         LDAA  4,X
00990 00098P 00B9 BD 00E5  P         JSR   LASTOR
01000 00099P 00BC A6 05    A         LDAA  5,X
01010 00100P 00BE BD 00E5  P         JSR   LASTOR
01020 00101P 00C1 20 05 00C8         BRA   REINIT
01030 00102P 00C3 86 0C    A  ERROR  LDAA  #$0C
01040 00103P 00C5 BD 00E5  P         JSR   LASTOR
01050 00104P 00C8 7F 0000  A  REINIT CLR   CTR14
01060 00105P 00CB 7F 0000  A         CLR   CTR15
01070 00106P 00CE 7F 0000  A         CLR   CTRALL
01080 00107P 00D1 7F 0000  A         CLR   TEMP
01081 00108P 00D4 FE 0000  A         LDX   ADRPTR
01082 00109P 00D7 8C 0000  A         CPX   #DIGITS
01083 00110P 00DA 27 5F 013B         BEQ   EXIT
01090 00111P 00DC BD 010B  P         JSR   CMPARE
01100 00112P 00DF BD 00FD  P         JSR   CNTSTR
01120 00113P 00E2 7E 003E  P         JMP   FETCH
01130 00114                       *
01140 00115P 00E5 FF 0000  A  LASTOR STX   XSAVE1
01150 00116P 00E8 FE 0000  A         LDX   BYTPTR
01160 00117P 00EB FF 0000  A         STX   ENDADD
01170 00118P 00EE 8C 37FF  A         CPX   #$37FF
01180 00119P 00F1 27 09 00FC        BEQ   LSTOR1
01190 00120P 00F3 A7 00    A         STAA  0,X
01200 00121P 00F5 08                 INX
01210 00122P 00F6 FF 0000  A         STX   BYTPTR
01220 00123P 00F9 FE 0000  A         LDX   XSAVE1
01230 00124P 00FC 39        LSTOR1  RTS
01240 00125                       *
01250 00126P 00FD 86 1A    A  CNTSTR LDAA  #$1A
01260 00127P 00FF 8D E4 00E5         BSR   LASTOR
01270 00128P 0101 B6 0000  A         LDAA  METRCT
01280 00129P 0104 8D DF 00E5         BSR   LASTOR
01290 00130P 0106 86 1A    A         LDAA  #$1A
01300 00131P 0108 8D DB 00E5         BSR   LASTOR
01310 00132P 010A 39                 RTS
```

```
01320 00133                      *
01330 00134P 010B 7C 0000   A CMPARE INC    METRCT
01340 00135P 010E 08                  INX
01350 00136P 010F 8C 0000   A        CPX    #DIGITS
01360 00137P 0112 27 25 0139         BEQ    EXIT1
01370 00138P 0114 A6 00     A        LDAA   0,X
01380 00139P 0116 81 0F     A        CMPA   #15
01390 00140P 0118 23 03 011D         BLS    INC2
01400 00141P 011A 7C 0000   A        INC    METRCT
01410 00142P 011D 81 3E     A INC2   CMPA   #62
01420 00143P 011F 23 03 0124         BLS    INC3
01430 00144P 0121 7C 0000   A        INC    METRCT
01440 00145P 0124 81 78     A INC3   CMPA   #120
01450 00146P 0126 23 03 012B         BLS    INC4
01460 00147P 0128 7C 0000   A        INC    METRCT
01470 00148P 012B 81 AA     A INC4   CMPA   #170
01480 00149P 012D 23 03 0132         BLS    CMPAR1
01490 00150P 012F 7C 0000   A        INC    METRCT
01500 00151P 0132 08          CMPAR1 INX
01510 00152P 0133 8C 0000   A        CPX    #DIGITS
01520 00153P 0136 27 01 0139         BEQ    EXIT1
01550 00154P 0138 39                 RTS
01560 00155                      *
01570 00156P 0139 31          EXIT1  INS
01580 00157P 013A 31                 INS
01590 00158P 013B CE 0000   A EXIT   LDX    #DIGITS
01600 00159P 013E FF 0000   A        STX    BEGADR
01610 00160P 0141 39                 RTS
01620 00161                          END
TOTAL ERRORS 00000--00000
00010 00001                          NAM    DIGOUT
00020 00002                   ****** VERSION 5 - 28 - 81, S W O ***************
00030 00003                      *
00040 00004                      *   THIS MODULE IS THE LAST MODULE IN THE METER
00050 00005                      *   READING CYCLE. IT COMMUNICATES THE RESULTS OF
00060 00006                      *   THE ATTEMPT TO READ BACK TO THE CENTRAL OFFICE
00070 00007                      *   D-G NOVA 3 COMPUTER. THE COMMUNICATED DATA WILL
00080 00008                      *   BE EITHER THE METER READING ITSELF IF A SUCCESS-
00090 00009                      *   FUL READ WAS ACCOMPLISHED ( THE READING WILL BE
00100 00010                      *   SUCCEEDED BY A BCD "15" TO SIGNAL THE NOVA THAT
00110 00011                      *   THE READING IS NOW AVAILABLE ), OR AN ERROR CODE
00120 00012                      *   INDICATING THE READ ATTEMPT WAS UNSUCCESSFUL.
00130 00013                      *   ERROR CODE IS A BCD 12 WHICH FLAGS
00140 00014                      *   RECEVE AND SYNCH ERRORS. ALL ERROR
00150 00015                      *   CONDITIONS ARE RELIEVED BY RESETTING THE MUX.
00160 00016                      *
00170 00017                      *
00180 00018                          OPT    LLE=80,REL
00190 00019P 0000                    PSCT
00200 00020                          XDEF   DIGOUT
00210 00021                          XREF   ERRFLG,ENDADD,BEGADR,PIA
00220 00022                      *
00230 00023                      *
00240 00024P 0000 0F          DIGOUT SEI            NO INTERRUPTIONS PLEASE!
00270 00025P 0001 B6 0000   A        LDAA   ERRFLG  CHECK FOR READ ERRORS
00280 00026P 0004 27 05 000B         BEQ    READOT  IF NONE, SUCCESSFUL READ
00290 00027P 0006 B7 0000   A ERROR  STAA   PIA     BAD READ, REPORT AND LOCK-UP
00300 00028P 0009 20 FB 0006         BRA    ERROR   LOCK UP MUX
00310 00029P 000B FE 0000   A READOT LDX    BEGADR  GET START OF DATA TO MOVE
00320 00030P 000E 86 0F     A        LDAA   #$0F    GET "DIGIT READY" CODE
00321 00031P 0010 BA 0000   A        ORAA   PIA
00330 00032P 0013 B7 0000   A        STAA   PIA     TRANSMIT IT
00340 00033P 0016 B6 0003   A STROBE LDAA   PIA+3   READ STATUS REGISTER
00350 00034P 0019 84 40     A        ANDA   #$40    LOOK FOR CB2 INT. FLAG
00360 00035P 001B 27 F9 0016         BEQ    STROBE  IF NOT SET, KEEP LOOKING
00361 00036P 001D B6 0002   A        LDAA   PIA+2   CLEAR STROBE FLAG
00370 00037P 0020 A6 00     A        LDAA   0,X     STROBE ACKNOWLEDE RECEIVED
00380 00038P 0022 B7 0000   A        STAA   PIA     TRANSMIT DIGIT
00390 00039P 0025 08                 INX            POINT TO NEXT DIGIT
00400 00040P 0026 BC 0000   A        CPX    ENDADD  MOVED IT ALL YET?
00410 00041P 0029 27 02 002D         BEQ    EXIT    IF SO, ALL DONE
00420 00042P 002B 20 E9 0016         BRA    STROBE  NO, WAIT FOR NEXT ACK.
00450 00043P 002D B6 0002   A EXIT   LDAA   PIA+2   CLEAR ANY EXTRANEOUS FLAGS
00451 00044P 0030 86 1D     A        LDAA   #$1D    MUX BUSY CODE
00452 00045P 0032 B7 0000   A        STAA   PIA     XMIT IT
00460 00046P 0035 39                 RTS            LEAVE!
```

```
00470 00047                            END
TOTAL ERRORS 00000--00000

00010 00001                            NAM     DUMPIT
00020 00002                    ******* VERSION 04 - 08 - 83, S W O ***************
00030 00003                    *
00040 00004                    *       THIS MODULE IS FOR DIAGNOSTIC USE ONLY.
00050 00005                    * ENTRY IS MADE FROM ANYWHERE IN THE NORMAL PROGRAM
00060 00006                    * FLOW AND IS INITIATED BY THE NON-MASKABLE INTERR.
00070 00007                    * LINE AS ENABLED BY A NOVA GENERATED ADDRESS 96.
00080 00008                    *
00090 00009                    *
00100 00010                            OPT     LLE=80,REL
00110 00011P 0000                      PSCT
00120 00012                            XDEF    DUMPIT
00130 00013                            XREF    PIA,DIGOUT,ENDADD,POWRUP,BEGADR
00140 00014                            XREF    ERRFLG
00150 00015                    *
00160 00016                    *
00170 00017P 0000 0F            DUMPIT SEI
00180 00018P 0001 86 1F    A           LDAA    #$1F        NOVA REQUEST
00190 00019P 0003 B7 0003 A           STAA    PIA+3       ACKNOWLEDGE CODE
00200 00020P 0006 CE 8000 A           LDX     #$8000      BEG. ADDRESS OF DATA TO DUMP
00210 00021P 0009 FF 0000 A           STX     BEGADR      SAVE FOR DIGOUT
00220 00022P 000C CE 87FF A           LDX     #$87FF      END ADDRESS OF BLOCK TO DUMP
00230 00023P 000F FF 0000 A           STX     ENDADD      SAVED FOR DIGOUT MODULE
00240 00024P 0012 7F 0000 A           CLR     ERRFLG      CLEAR ANY ERRORS
00250 00025P 0015 BD 0000 A           JSR     DIGOUT      GO DUMP IT!
00251 00026P 0018 01                   NOP
00252 00027P 0019 01                   NOP
00260 00028P 001A 3B                   RTI                 ALL FINISHED!
00270 00029                            END
TOTAL ERRORS 00000--00000

00010 00001                            NAM     ACMUX
00020 00002                    ******* VERSION 05 - 11 - 83, S W O ***************
00030 00003                    *
00040 00004                    *
00050 00005                            OPT     LLE=80,REL
00060 00006B 0000                      BSCT
00070 00007                            XDEF    PIA,STACK,INTCTR,LEVEL,AUTOFG,RECCTR
00080 00008                            XDEF    METER,SOURCE,DEST,OKCTR,LNGFLG,RECTME
00090 00009                            XDEF    ADRPTR,ENDADD,XSAVE,TRYCTR,DURA
00100 00010                            XDEF    GLITCH,TEMP,LARGE,LOMARK,HIMARK,MIDDL
00110 00011                            XDEF    BYTPTR,ZERCTR,ONECTR,BEGADR,ERRFLG
00120 00012                            XDEF    SYNCFG,NONFG,CTR14,BYTSAV,LOWCTR,HICT
00130 00013                            XDEF    XSAVE1,METRCT,BLNKTM,CTRALL,CTR15
00140 00014                    *
00150 00015                    *
00160 00016        4000    A  PIA     EQU     $4000       PARALLEL I/O ADDRESS
00170 00017        007F    A  STACK   EQU     $007F       STACK POINTER INIT
00180 00018                    *
00190 00019B 0000  0001    A  ERRFLG  RMB     1           ERROR CODES STORED HERE
00200 00020B 0001  0001    A  GLITCH  RMB     1           GLITCH COUNT ALLOWED
00210 00021B 0002  0002    A  SOURCE  RMB     2           SOURCE ADDRESS STORAGE
00220 00022B 0004  0002    A  DEST    RMB     2           DEST. ADDRESS STORAGE
00230 00023B 0006  0002    A  TEMP    RMB     2           TEMPORARY STORAGE
00240 00024B 0008  0002    A  BEGADR  RMB     2           STRT ADDR OF DATA TO MOVE
00250 00025B 000A  0002    A  ENDADD  RMB     2           END ADDR OF DATA TO MOVE
00260 00026B 000C  0001    A  OKCTR   RMB     1           # OF OK COUNT SAMPLES
00270 00027B 000D  0002    A  ADRPTR  RMB     2           DYNAMIC ADDRESS POINTER
00280 00028B 000F  0002    A  BYTPTR  RMB     2           STORAGE AREA DNAMIC POINTER
00290 00029B 0011  0001    A  ZERCTR  RMB     1           COUNTER FOR "0" BITS
00300 00030B 0012  0001    A  ONECTR  RMB     1           COUNTER FOR "1" BITS
00310 00031B 0013  0001    A  LARGE   RMB     1           BYTE TOO LARGE LIMIT
00320 00032B 0014  0001    A  LOMARK  RMB     1           LOW MARK BIT LIMIT
00330 00033B 0015  0001    A  HIMARK  RMB     1           HIGH MARKSBITLLIMIT
00340 00034B 0016  0001    A  MIDDLE  RMB     1           BYTE IN MIDDLE TOO SMALL
00350 00035B 0017  0002    A  XSAVE   RMB     2           X REGISTER OPER. REGISTER
00360 00036B 0019  0002    A  XSAVE1  RMB     2              "       "        "
00370 00037B 001B  0001    A  TRYCTR  RMB     1           DECODE ATTEMPT COUNTER
00380 00038B 001C  0002    A  DURA    RMB     2           DURATION COUNTER STORAGE
00390 00039B 001E  0001    A  METER   RMB     1           FREQ. CONSTANT STORAGE
00400 00040B 001F  0001    A  LNGFLG  RMB     1           LONG INTERROGATE FLAG
00410 00041B 0020  0001    A  INTCTR  RMB     1           LOCATION FOR INTSVC ONLY
00420 00042B 0021  0001    A  LEVEL   RMB     1           STORAGE FOR INTERROGATE LEVE
00430 00043B 0022  0001    A  AUTOFG  RMB     1           FLAG IF SET = AUTO INTERR
```

```
00440 00044B 0023    0002    A RECCTR  RMB     2               COUNTS OF TIME WITHOUT CHG.
00450 00045B 0025    0001    A SYNCFG  RMB     1
00460 00046B 0026    0001    A HONFG   RMB     1
00470 00047B 0027    0001    A CTR14   RMB     1
00480 00048B 0028    0001    A CTR15   RMB     1
00490 00049B 0029    0001    A CTRALL  RMB     1
00500 00050B 002A    0001    A BYTSAV  RMB     1
00510 00051B 002B    0002    A RECTME  RMB     2               RECEIVE WAIT W/O DATA TIME
00520 00052B 002D    0002    A BLNKTM  RMB     2
00530 00053B 002F    0001    A LOWCTR  RMB     1
00540 00054B 0030    0001    A HICTR   RMB     1
00550 00055B 0031    0001    A METRCT  RMB     1
00560 00056                          *
00570 00057D 0000                    DSCT
00580 00058                          XDEF    RAWIN,LEVEL1,READNG,DIGITS
00590 00059                          *
00600 00060D 0000    03F0    A RAWIN   RMB     $3F0            RAW SERIAL DATA STORAGE
00610 00061D 03F0    02F0    A LEVEL1  RMB     $2F0            1ST LEVEL DECODED DATA
00620 00062D 06E0    00E0    A READNG  RMB     $E0
00621 00063D 07C0    003F    A DIGITS  RMB     $3F             FINAL BCD DIGIT STORAGE
00630 00064                          *
00640 00065                          END
TOTAL ERRORS 00000--00000

00010 00001                          NAM     INTSVC
00020 00002                  ******* VERSION 05 - 05 - 81, S W O ***************
00030 00003                          *
00040 00004                          *       THIS MODULE IS THE INTERRUPT SERVICE ROUTINE
00050 00005                          * FOR THE AC MULTIPLEXOR CARDS. IT IS ENTERED ON
00060 00006                          * THE OCCURENCE OF A LINE SELECTED BY THE NOVA CPU
00070 00007                          * BEING IN THE OFF-HOOK STATE. ONCE ENTERED, THIS
00080 00008                          * MODULE SIMPLY TRANSMITS THE OFF-HOOK CODE (30 DEC
00090 00009                          * TO THE NOVA AND LOCKS UP THE MUX SO THAT NO LINE
00100 00010                          * ACTIVITY MAY OCCUR UNTIL THE MUX HAS BEEN RESET.
00110 00011                          *
00120 00012                          *
00130 00013                          OPT     LLE=80,REL
00140 00014P 0000                    PSCT
00150 00015                          XDEF    INTSVC
00160 00016                          XREF    PIA,INTCTR
00170 00017                          *
00180 00018                          *
00190 00019P 0000 0F         INTSVC  SEI                     NO FURTHER INTERRUPTS
00200 00020P 0001 7F 0000  A         CLR     INTCTR          INIT INTERRUPT LOOP CTR
00210 00021P 0004 B6 0002  A LOOP1   LDAA    PIA+2           CLEAR EXISTING FLAG
00220 00022P 0007 86 FF    A         LDAA    #$FF            DELAY COUNTER
00230 00023P 0009 4A         LOOP2   DECA                    DELAY A MS. OR SO
00240 00024P 000A 26 FD 0009         BNE     LOOP2           TILL DONE
00250 00025P 000C B6 0003  A         LDAA    PIA+3           GET FLAG AGAIN
00260 00026P 000F 84 80    A         ANDA    #$80            CHECK IF FLAG GOT SET AGAIN
00270 00027P 0011 27 11 0024         BEQ     EXIT            IF NOT, NOT REAL OFF HOOK
00280 00028P 0013 7C 0000  A         INC     INTCTR          CHALK UP A TRY AT REAL O.H.
00290 00029P 0016 86 05    A         LDAA    #$05            # OF TRIES ALLOWED
00300 00030P 0018 B1 0000  A         CMPA    INTCTR          TRIED ENOUGH YET?
00310 00031P 001B 26 E7 0004         BNE     LOOP1           IF NOT TRY AGAIN
00320 00032P 001D 86 1E    A OFFHK   LDAA    #$1E            OFF HOOK CODE (30 DECIMAL)
00330 00033P 001F B7 0000  A         STAA    PIA             TRANSMIT CODE TO NOVA
00340 00034P 0022 20 F9 0010         BRA     OFFHK           LOCK UP MUX.
00341 00035P 0024 0E         EXIT    CLI                     RE-ENABLE INTERRUPTS
00350 00036P 0025 39                 RTS                     WASN'T A REAL R.O.H.
00360 00037                          END
TOTAL ERRORS 00000--00000

00010 00001                          NAM     PARTBL
00020 00002                  ******* VERSION 05 - 11 - 83, S W O ***************
00030 00003                          *
00040 00004                          *       THIS MODULE CONTAINS THE TABLE OF CONSTANTS
00050 00005                          * USED BY THE DECODE MODULE TO SORT OUT THE 1'S
00060 00006                          * AND 0'S FROM THE RAW DATA COUNTS PRODUCED BY THE
00070 00007                          * RECEIVE MODULE. THE TABLE CONTAINS ENOUGH CONSTANT
00080 00008                          * FOR 8 ATTEMPTS AT DECODING THE DATA. EACH LINE
00090 00009                          * CONTAINS
00100 00010                          * THE CONSTANTS FOR 1 ATTEMPT. CONSTANTS ARE
00110 00011                          * "LARGE","SMALL",AND "MIDDLE" IN LEFT TO RIGHT
00120 00012                          * ORDER
00130 00013                          *
00140 00014                          *
```

```
00150 00015                        OPT     LLE=80,REL
00160 00016P 0000                  PSCT
00170 00017                        XDEF    PARTBL,TONTME,WAITME
00180 00018                   *
00190 00019                   *
00200 00020P 0000 01      PARTBL    NOP
00210 00021P 0001   002F A TONTME   FDB     $002F,$006F
00220 00022P 0005   01FF A          FDB     $01FF,$03FF
00230 00023P 0009   04FF A          FDB     $04FF,$05FF
00240 00024P 000D   07FF A          FDB     $07FF,$FFFF
00250 00025P 0011   02FF A WAITME   FDB     $02FF,$0FFF
00260 00026P 0015   1FFF A          FDB     $1FFF,$2FFF
00270 00027P 0019   3FFF A          FDB     $3FFF,$4FFF
00280 00028P 001D   6FFF A          FDB     $6FFF,$8FFF
00290 00029                         END
TOTAL ERRORS 00000--00000

00010 00001                        NAM     VECTOR
00020 00002                  ****** VERSION 05 - 04 - 81, S W O **************
00030 00003                  *
00040 00004                  *    THIS MODULE CONTAINS THE RESTART VECTORS
00050 00005                  *    WHICH DIRECT THE PROCESSOR TO BEGIN PROGRAM
00060 00006                  *    EXECUTION AT THE CORRECT ADDRESS FOLLOWING EITHER
00070 00007                  *    A POWER FAILURE, NOVA GENERATED RESET, OR
00080 00008                  *    A RAM DUMP REQUEST BY THE NOVA (HMI).
00090 00009                  *
00100 00010                  *
00110 00011                        OPT     LLE=80,REL
00120 00012P 0000                  PSCT
00130 00013                        XDEF    VECTOR
00140 00014                        XREF    POWRUP,DUMPIT,INTSVC
00150 00015                  *
00160 00016                  *
00170 00017P 0000 0000 A VECTOR    FDB     INTSVC   HARDWARE INTERRUPT VECTOR
00180 00018P 0002 0000 A           FDB     POWRUP   SOFTWARE INTERRUPT VECTOR
00190 00019P 0004 0000 A           FDB     DUMPIT   RAM DUMP (HMI) VECTOR
00200 00020P 0006 0000 A           FDB     POWRUP   RESTART VECTOR
00210 00021                        END
TOTAL ERRORS 00000--00000
```

We claim:

1. A multiplexer system for receiving data from a plurality of interrogatable data transmitters coupled to a plurality of telephone lines connected to a telephone central office including line cutoff relays comprising:
   a multiplexer means for coupling said multiplexer to the plurality of telephone lines beyond the line cutoff relays;
   means for sending at least one distinct interrogation signal over each of the coupled telephone lines via said multiplexer;
   means for receiving an alternating current representation of the data sent over the coupled telephone line from each of the plurality of interrogatable data transmitters via said multiplexer; and
   means coupled to said multiplexer for converting each of the alternating current representations of the data into digital representations;
   including means for demultiplexing the received alternating current representations from the plurality of coupled telephone lines to a single input circuit;
   in which the alternating current representation from each of the interrogatable data transmitters is a series of pulses of a single audio tone, the pulses having at least two different pulse periods, and, the means for converting the alternating current representation into the digital representation comprises:
   means for substantially filtering out all but the series of pulses of the single audio tone received at the single input line;
   means for deriving a series of positive voltage pulses which are proportional in pulse period duration to the pulse period duration of the series of pulses of the single audio tone; and,
   means for deriving a series of zero voltage transitions which are proportional in duration to the duration of the transition periods between the pulse periods of the series of pulses of the single audio tone.

2. The multiplexer system in accordance with claim 1 further including a means for disregarding positive voltage pulses received from the telephone lines during any of the transition periods when the positive voltage pulses have a duration corresponding to a predetermined positive noise pulse period so that positive noise pulses on the telephone lines do not destroy the ability of the converted digital representations to reflect the proportional pulse periods of the series of pulses of the single audio tone.

3. The multiplexer system in accordance with claim 2 further including a means for disregarding losses in continuity of the positive voltage pulses derived from the series of pulses of the single audio tone during any of the positive voltage pulse periods when the losses in continuity of positive voltage pulses have a duration corresponding to a predetermined negative noise pulse period so that negative going noise pulses on the telephone lines do not destroy the ability of the converted digital representations to reflect the proportional pulse periods of the series of pulses of the single audio tone.

4. A multiplexer system for receiving data from a plurality of interrogatable data transmitters coupled to a plurality of telephone lines comprising:

means for coupling the multiplexer system to the plurality of telephone lines;

means for sending at least one distinct interrogation signal over each of the coupled telephone lines;

means for receiving an alternating current representation of the data sent over the coupled telephone lines from each of the plurality of interrogatable data transmitters;

means for converting each of the alternating current representations of the data into digital representations;

in which the means for coupling the multiplexer system to the plurality of telephone lines comprises;

means for continuously coupling each of the telephone lines to the multiplexer system by at least one coupling device, the coupling device comprising:

means for providing a low impedance path for alternating current signal from between 300 and 20,000 Hertz in frequency from at least one of the telephone lines to the multiplexer system;

means for providing a low impedance path for alternating current signals from between 300 and 20,000 Hertz in frequency from the multiplexer system to at least one of the telephone lines;

means for leaking a direct current voltage from at least one of the telephone lines to the multiplexer system;

means for substantially preventing damage to the multiplexer system caused by high voltage conditions on at least one of the telephone lines.

5. The multiplexer system in accordance with claim 1 in which the data from each of the interrogatable data transmitters is a utility usage figure, meter identification figure, and at least one sentinel figure, and the converting of the alternating current representation to digital representations further includes:

means for determining the relative pulse periods of the series of pulses of the single audio tone;

means for determining the series of pulse periods which represent a sentinel character from the relative pulse codes of the series of pulses of the single audio tone;

means for comparing the relative pulse periods found in least one of the distinguishable sentinel characters to the other relative pulse periods of the series of pulse periods of the single audio tone, and, thus defining the plurality of character periods for the series of pulses of the single audio tone;

means for producing digital value signals for each of the character values in the utility usage figure and meter identification figure by comparing the relative pulse periods of the series of pulses of the single audio tone during each of the character periods with a plurality of predetermined patterns of relative pulse periods corresponding to the possible digit values found in a single character period; and, means for storing at least a portion of the digital value signals in a digital value signal storage system.

6. A multiplexer system for receiving data from a plurality of interrogatable data transmitters coupled to a plurality of telephone lines connected to a telephone central office including line cutoff relays comprising:

a multiplexer means for coupling said multiplexer system to the plurality of telephone lines beyond the line cutoff relays;

means for sending at least one distinct interrogation signal over each of the coupled telephone lines via said multiplexer;

means for receiving an alternating current representation of the data sent over the coupled telephone lines from each of the plurality of interrogatable data transmitters via said multiplexer;

means coupled to said multiplexer for converting each of the alternating current representations of the data into digital representations; means responsive to trouble-shooting commands from an external digital interfacing device for selecting a particular, non-default voltage level of any of the multiplexer system;

means for providing a low impedance path for alternating current signals from between 300 and 20,000 Hertz in frequency from the multiplexer system to at least one of the telephone lines;

means for leaking a direct current voltage from at least one of the telephone lines to the multiplexer system;

means for substantially preventing damage to the multiplexer system caused by high voltage conditions on at least one of the telephone lines.

7. The multiplexer system in accordance with claim 6 further including a means responsive to trouble-shooting commands from the external digital interfacing device for selecting a particular, non-default interrogation signal duration of any of the interrogation signals.

8. A multiplexer system for receiving data from a plurality of interrogatable data transmitters coupled to a plurality of telephone lines comprising:

means for coupling the multiplexer system to the plurality of telephone lines;

means for sending at least one distinct interrogation signal over each of the coupled telephone lines;

means for receiving an alternating current representation of the data sent over the coupled telephone lines from each of the plurality of interrogatable data transmitters;

means for converting each of the alternating current representations of the data into digital representations;

further including a means responsive to trouble-shooting commands from an external digital interfacing device for selecting a particular, non-default voltage level of any of the interrogation signals;

further including a means responsive to trouble-shooting commands from the external digital interfacing device for selecting a particular, non-default frequency of the interrogation signal sent over any of the telephone lines coupled to the multiplexer system.

9. A multiplexer system for receiving data from a plurality of interrogatable data transmitters coupled to a plurality of telephone lines comprising:

means for coupling the multiplexer system to the plurality of telephone lines;

means for sending at least one distinct interrogation signal over each of the coupled telephone lines;

means for receiving an alternating current representation of the data sent over the coupled telephone lines from each of the plurality of interrogatable data transmitters;

means for converting each of the alternating current representations of the data into digital representations;

further including a means responsive to trouble-shooting commands from an external digital interfacing device for selecting a particular, non-default voltage level of any of the interrogation signals;

further including a means responsive to troubleshooting commands from the external digital interfacing device for selecting a particular, non-default no-response drop-out time period for any of the telephone lines coupled to the multiplexer system, the no-response drop out time period beinghe period that the multiplexer system will wait for data from a non-responsive interrogatable data transmitter after sending an interrogation signal.

10. The multiplexer system in accordance with claim 6 further including means responsive to receiving the trouble-shooting command to select the interrogation signal voltage level for communicating the voltage level which activated a non-responsive interrogatable data transmitter selected by the voltage level trouble-shooting command from the external digital interface device.

11. A multiplexer system for receiving data from a plurality of interrogatable data transmitters coupled to a plurality of telephone lines comprising:
   means for coupling the multiplexer system to the plurality of telephone lines;
   means for sending at least one distinct interrogation signal over each of the coupled telephone lines;
   means for receiving an alternating current representation of the data sent over the coupled telephone lines from each of the plurality of interrogatable data transmitters;
   means for converting each of the alternating current representations of the data into digital representations;
   further including a means responsive to trouble-shooting commands from an external digital interfacing device for selecting a particular, non-default voltage level of any of the interrogation signals;
   further including means responsive to receiving the trouble-shooting command to select the interrogation signal voltage level for communicating the voltage level which activated a non-responsive interrogatable data transmitter selected by the voltage level trouble-shooting command from the external digital interface device;
   in which at least one of the following conditions is communicated to the external digital interfacing device responsive to receiving at least one trouble-shooting command, a current voltage level being used to activate the particular interrogatable data transmitter selected by the trouble-shooting command from the external digital interface device, a voltage level which activated the selected non-responsive interrogatable data transmitter, a non-decodable response has been received from the selected interrogatable data transmitter, no response has been received from the selected interrogatable data transmitter and an OFF-HOOK condition as been found on the telephone line coupled to the selected interrogatable data transmitter.

12. A multiplexer system for receiving data from a plurality of interrogatable data transmitters coupled to a plurality of telephone lines connected to a telephone central office including line cutoff relays comprising;
   a multiplexer means for coupling said multiplexer system to the plurality of telephone lines beyond the line cutoff relays;
   means for sending at least one distinct interrogation signal over each of the coupled telephone lines via said multiplexer;
   means for receiving an alternating current representation of the data sent over the coupled telephone lines from each of the plurality of interrogatable data transmitters via said multiplexer;
   means coupled to said multiplexer for converting each of the alternating current representations of the data into digital representations; and
   means for counting the number of occasions when a particular telephone line coupled to the multiplexer system has been in the OFF HOOK condition during a predetermined period.

13. A multiplexer system for receiving data from a plurality of interrogatable data transmitters coupled to a plurality of telephone lines comprising:
   means for coupling the multiplexer system to the plurality of telephone lines;
   means for sending at least one distinct interrogation signal over each of the coupled telephone lines;
   means for receiving an alternating current representation of the data sent over the coupled telephone lines from each of the plurality of interrogatable data transmitters;
   means for converting each of the alternating current representations of the data into digital representations;
   in which the means for coupling the multiplexer system to the plurality of telephone lines comprises;
   means for continuously coupling each of the telephone lines to the multiplexer system by at least one coupling device, the coupling device comprising:
   means for providing a low impedance path for alternating current signal from between 300 and 20,000 Hertz in frequency from at least one of the telephone lines to the multiplexer system;
   means for providing a low impedance path for alternating current signals from between 300 and 20,000 Hertz in frequency from the multiplexer system to at least one of the telephone lines;
   means for leaking a direct current voltage from at least one of the telephone lines to the multiplexer system;
   means for substantially preventing damage to the multiplexer system caused by high voltage conditions on at least one of the telephone lines;
   in which the means for continuously coupling each of the plurality of telephone lines to the multiplexer system when the plurality of telephone lines are single-ended telephone lines including a RING conductor comprises:
   a first resistor for each telephone line having its first lead connected to the RING conductor of the telephone lines, and, the central office BATTERY conductor of the telephone line connected to an internal ground for the multiplexer system;
   a second resistor for each telephone line having its first lead connected to the second lead of the first resistor;
   a capacitor for each telephone line having its first lead connected to the second lead of the first resistor and its second lead connected to second lead of the second resistor;
   a third resistor for each telephone line having its first lead connected to the internal ground of the multiplexer system and having its second lead connected to the second lead of the second resistor;
   a first diode for each telephone line having its anode lead connected to the second lead of the second resistor;
   a first zener diode having its cathode lead connected to the cathode leads of the first diodes and having its anode lead connected to the internal ground, the first zener diode having its cathode lead connected to a positive voltage source relative to the internal ground;
a second diode for each telephone line having its cathode lead connected to the second lead of the second resistor; and,
a second zener diode having its anode lead connected to the anode leads of the second diodes and having its cathode lead connected to the internal ground, the second zener diode having its anode lead connected to a negative voltage source relative to the internal ground;
the path from the multiplexer system to each of the telephone lines being a combination of the second leads of the second resistors and the internal ground;
the path from each of the telephone lines to the multiplexer system being a combination of first leads of the first resistors and the internal ground which is connected to the central office GROUND conductor of each telephone line.

14. The multiplexer system in accordance with claim 13 in which each of the first resistors has a value of approximately 10 thousand ohms, each of the second resistors has a value of approximately one megaohm, each of the third resistors has a value of approximately 100 thousand ohms, and each of the capacitors has a value of approximately 0.47 microfarads.

15. A multiplexer system for receiving data from a plurality of interrogatable data transmitters coupled to a plurality of telephone lines comprising:
means for coupling the multiplexer system to the plurality of telephone lines;
means for sending at least one distinct interrogation signal over each of the coupled telephone lines;
means for receiving an alternating current representation of the data sent over the coupled telephone lines from each of the plurality of interrogatable data transmitters;
means for converting each of the alternating current representations of the data into digital representations;
in which the means for coupling the multiplexer system to the plurality of telephone lines comprises;
means for continuously coupling each of the telephone lines to the multiplexer system by at least one coupling device, the coupling device comprising:
means for providing a low impedance path for alternating current signal from between 300 and 20,000 Hertz in frequency from at least one of the telephone lines to the multiplexer system;
means for providing a low impedance path for alternating current signals from between 300 and 20,000 Hertz in frequency from the multiplexer system to at least one of the telephone lines;
means for leaking a direct current voltage from at least one of the telephone lines to the multiplexer system;
means for substantially preventing damage to the multiplexer system caused by high voltage conditions on at least one of the telephone lines;
in which the means for continuously coupling each of the plurality of telephone lines to the multiplexer system when the plurality of telephone lines are double-ended telephone lines including TIP and RING conductors comprises:

a first resistor for each telephone line having its first lead connected to the RING conductor of the telephone line;
a second resistor for each telephone line having its first lead connected to the second lead of the first resistor;
a first capacitor for each telephone line having its first lead connected to the second lead to the first resistor and its second lead connected to second lead of the second resistor;
a third resistor for each telephone line having its first lead connected to an internal ground of the multiplexer system and having its second lead connected to the second lead of the second resistor;
a first diode for each telephone line having its anode lead connected to the second lead of the second resistor;
a first zener diode having its cathode lead connected to the cathode lead of each of the first diodes and having its anode lead connected to the internal ground, the first zener diode having its cathode lead connected to a positive voltage source relative to the internal ground;
a second diode for each of the telephone lines having its cathode lead connected to the second lead of the second resistor;
a second zener diode having its anode lead connected to the anode leads of each of the second diodes and having its cathode lead connected to the internal ground, the second zener diode having its anode lead connected to a negative voltage source relative to the internal ground;
a fourth resistor for each telephone line having its first lead connected to the TIP conductor of one telephone line;
a fifth resistor for each telephone line having its first lead connected to the second lead of the fourth resistor;
a second capacitor for each telephone line having its first lead connected to the second lead of the fourth resistor ad its second lead connected to the second lead of the fifth resistor;
a sixth resistor having its first lead connected to the internal ground and having its second lead connected to the second lead of the fifth resistor;
a third diode for each telephone line having its anode lead connected to the second lead of the fifth resistor;
a first zener diode having its cathode lead connected to the cathode leads of the third diodes and having its anode lead connected to the internal ground, the first zener diode having its cathode lead connected to a positive voltage source relative to the internal ground;
a fourth diode for each telephone line having its cathode lead connected to the second lead of the fifth resistor; and,
a second zener diode having its anode lead connected to the anode leads of the fourth diodes and having its cathode lead connected to the internal ground, the second zener diode having its anode lead connected to a negative voltage source relative to the internal ground;
the path from the multiplexer system to each of the telephone lines is the combination of the second leads of the fifth resistors and the second leads of the second resistors;

the path from each of the telephone lines to the multiplexer system being the combination of the first leads of the first resistors and the first leads of the fourth resistors.

16. The multiplexer system in accordance with claim 15 in which each of the first and sixth resistors have values of approximately 10 thousand ohms, each of the second and fifth resistors have values of approximately one megaohm and each of the third, sixth resistors have values of approximately 100 thousand ohms and each of the first and second capacitors have values of approximately 0.47 microfarads.

17. A multiplexer system for receiving data from a plurality of interrogatable data transmitters coupled to a plurality of telephone lines comprising:
   a multiplexer;
   means for coupling said multiplexer to the plurality of telephone lines;
   means for sending at least one distinct interrogation signal over each of the coupled telephone lines to respective interrogatable data transmitters via said multiplexer;
   means including said multiplexer for receiving an alternating current representation of the data sent over the coupled telephone lines from each of the plurality of interrogatable data transmitters,
   said interrogatable data transmitters responsive to an interrogation signal on its respective telephone line for generating and transmitting the alternating current representation as a series of dual-tone signals, and
   means for converting each of the alternating current representations of the data into digital representations.

18. The multiplexer system in accordance with claim 17 further including means for storing at least one of the digital representations in a digital representation storage system.

19. The multiplexer system in accordance with claim 17 wherein said multiplexer is operative for conducting each of the distinct interrogation signals from a single output circuit to a particular one of the plurality of telephone lines.

20. The multiplexer system in accordance with claim 17 further including means for demultiplexing the received alternating current representations from the plurality of coupled telephone lines to a single input circuit.

21. The multiplexer system in accordance with claim 17 in which the series of dual-tone alternating current representations from the interrogatable data transmitters represent a utility usage figure and a meter identification figure from a utility usage monitor coupled to each the meter interface devices, there being at least twelve distinct dual-tone alternating current representations, the dual-tone alternating current representations representing the following: a digit value between and including 0 to 9, a first framing sentinel and a second framing sentinel.

22. A multiplexer system for receiving data from a plurality of interrogatable data transmitters coupled to a plurality of telephone lines comprising:
   a multiplexer;
   means for coupling the multiplexer to the plurality of telephone lines;
   means for sending at least one distinct interrogation signal over each of the coupled telephone lines via said multiplexer;
   means including said multiplexer for receiving an alternating current representation of the data sent over the coupled telephone lines from each of the plurality of interrogatable data transmitters, the alternating current representation being a series of dual-tone signals, and
   means for converting each of the alternating current representation of the data into digital representation;
   in which the means for coupling the multiplexer system to the plurality of telephone lines comprises;
   means for continuously coupling each of the telephone lines to the multiplexer system by at least one coupling device, the coupling device comprising:
   means for providing a low impedance path for alternating current signal from between 300 and 20,000 Hertz in frequency from at least one of the telephone lines to the multiplexer system;
   means for providing a low impedance path for alternating current signals from between 300 and 20,000 Hertz in frequency from the multiplexer system to at least one of the telephone lines;
   means for leaking a direct current voltage from at least one of the telephone lines to the multiplexer system; and
   means for substantially preventing damage to the multiplexer system caused by high voltage conditions on at least one of the telephone lines.

23. The multiplexer system in accordance with claim 17 further including a means responsive to trouble-shooting commands from an external digital interfacing device for selecting a particular, non-default voltage level of any of the interrogation signals.

24. The multiplexer system in accordance with claim 23 further including a means responsive to trouble-shooting commands from the external digital interfacing device for selecting a particular, non-default interrogation signal duration of any of the interrogation signals.

25. The multiplexer system in accordance with claim 24 further including a means responsive to trouble-shooting commands from the external digital interfacing device for selecting a particular, non-default frequency of the interrogation signal sent over any of the telephone lines coupled to the multiplexer system.

26. The multiplexer system in accordance with claim 25 further including a means responsive to trouble-shooting commands from the external digital interfacing device for selecting a particular, non-default no-response drop-out time period for any of the telephone lines coupled to the multiplexer system, the no-response drop-out time period being the period that the multiplexer system will wait for data from a non-responsive interrogatable data transmitter after sending an interrogation signal.

27. The multiplexer system in accordance with claim 26 further including means responsive to receiving the trouble-shooting command to select the interrogation signal voltage level for communicating the voltage level which activated a non-responsive interrogatable data transmitter selected by the voltage level trouble-shooting command from the external digital interface device.

28. The multiplexer system in accordance with claim 27 in which at least one of the following conditions is communicated to the external digital interfacing device responsive to receiving at least one trouble-shooting command, a current voltage level being used to activate the particular interrogatable data transmitter selected by the trouble-shooting command from the external digital interface device, a voltage level which activated the selected non-responsive interrogatable data transmitter, a non-decodable response has been received from the selected interrogatable data transmitter, no response has been received from the selected interrogatable data transmitter and an OFF-HOOK condition has been found on the telephone line coupled to the selected interrogatable data transmitter.

29. The multiplexer system in accordance with claim 22 further including means for sensing when any of the plurality of telephone lines is in an OFF-HOOK condition responsive to a drop in the direct current voltage leaked to the tranceiver device relative to the direct current leaked to the multiplexer system when the telephone lines are in an ON-HOOK condition.

30. The multiplexer system in accordance with claim 29 further including means for counting the number of occasions when a particular telephone line coupled to the multiplexer system has been in the OFF-HOOK condition during a predetermined period.

31. The multiplexer system in accordance with claim 22 in which the means for continuously coupling each of the plurality of telephones lines to the multiplexer system when the plurality of telephone lines are single-ended telephone lines comprises:
   a first resistor for each telephone line having its first lead connected to the ring wire of the telephone line, and, the central office battery wire of the telephone line connected to an internal ground of the multiplexer system;
   a second resistor for each telephone line having its first lead connected to the second lead of the first resistor;
   a capacitor for each telephone line having its first lead connected to the second lead of the first resistor and its second lead connected to second lead of the second resistor;
   a third resistor for each telephone line having its first lead connected to the internal ground of the the multiplexer system and having its second lead connected to the second lead of the second resistor;
   a first diode for each telephone line having its anode lead connected to the second lead of the second resistor;
   a first zener diode having its cathode lead connected to the cathode leads of the first diodes and having its anode lead connected to the internal ground, the first zener diode having its cathode lead connected to a positive voltage source relative to the internal ground;
   a second diode for each telephone line having its cathode lead connected to the second lead of the second resistor; and,
   a second zener diode having its anode lead connected to the anode leads of the second diodes and having its cathode lead connected to the internal ground, the second zener diode having its anode lead connected to a negative voltage source relative to the internal ground;
   the path from the multiplexer system to each of the telephone lines being a combination of the second leads of the second resistors and the internal ground;
   the path from each of the telephone lines to the multiplexer system being a combination of first leads of the first resistors and the internal ground which is connected to the central office ground of each of the telephone lines.

32. The multiplexer system in accordance with claim 31 in which each of the first resistors has a value of approximately 10 thousand ohms, each of the second resistors has a value of approximately one megaohm, each of the third resistors has a value of approximately 100 thousand ohms, and each of the capacitors has a value of approximately 0.47 microfarads.

33. The multiplexer system in accordance with claim 22 in which the means for continuously coupling each of the plurality of telephones lines to the multiplexer system when the plurality of telephone lines are double-ended telephone lines comprises:
   a first resistor for each telephone line having its first lead connected to the ring wire of the telephone line;
   a second resistor for each telephone line having its first lead connected to the second lead of the first resistor;
   a first capacitor for each telephone line having its first lead connected to the second lead of the first resistor and its second lead connected to second lead of the second resistor;
   a third resistor for each telephone line hawing its first lead connected to an internal ground of the the multiplexer system and having its second lead connected to the second lead of the second resistor;
   a first diode for each telephone line having its anode lead connected to the second lead of the second resistor;
   a first zener diode having its cathode lead connected to the cathode leads of the first diodes and having its anode lead connected to the internal ground, the first zener diode having its cathode lead connected to a positive voltage source relative to the internal ground;
   a second diode for each telephone line having its cathode lead connected to the second lead of the second resistor;
   a second zener diode having its anode lead connected to the anode leads of the second diodes and having its cathode lead connected to the internal ground, the second zener diode having its anode lead connected to a negatlve voltage source relative to the internal ground;
   a fourth resistor for each telephone line having its first lead connected to the tip wire of one telephone line;
   a fifth resistor for each telephone line having its first lead connected to the second lead of the fourth resistor;
   a second capacitor for each telephone line having its first lead connected to the second lead of the fourth resistor and its second lead connected to the second lead of the fifth resistor;
   a sixth resistor for each telephone line having its first lead connected to the internal ground and having its second lead connected to the second lead of the fifth resistor;

a third diode for each telephone line having its anode lead connected to the second lead of the fifth resistor;

the first zener diode having its cathode lead connected to the cathode leads of the third diodes and having its anode lead connected to the internal ground, the first zener diode having its cathode lead connected to a positive voltage source relative to the internal ground;

a fourth diode for each telephone line having its cathode lead connected to the second lead of the fifth resistor; and, the second zener diode having its anode lead connected to the anode leads of the fourth diodes and having its cathode lead connected to the internal ground, the second zener diode having its anode lead connected to a negative voltage source relative to the internal ground;

the path from the multiplexer system to the telephone lines is the combination of the second leads of the fifth resistors and the second leads of the second resistors;

the path from the telephone line to the multiplexer system being the combination of the first leads of the first resistors and the first leads of the fourth resistors.

34. The multiplexer system in accordance with claim 33 in which each of the first and sixth resistors have values of approximately 10 thousand ohms, each of the second and fifth resistors have values of approximately one megaohm and each of the third, sixth resistors have values of approximately 100 thousand ohms and each of the first and second capacitors have values of approximately 0.47 microfarads.

35. The multiplexer system in accordance with claim 21 further including means for communicating the digit values received to an external digital interfacing device responsive to a command therefrom.

36. A method for receiving data from a plurality of interrogatable data transmitters coupled to a plurality of telephone lines comprising;

sending at least one distinct interrogation signal over each of the coupled telephone lines;

receiving an alternating current representation of the data sent over the coupled telephone lines from each of the plurality of interrogatable data transmitters;

converting each of the alternating current representations of the data into digital representations;

in which the alternating current representation from each of the interrogatable data transmitters is a series of pulses of a single audio tone, the pulses having at least two different pulse periods, and, the step of converting the alternating current representation into the digital representation comprises;

filtering the series of pulses of the single audio tone received at the single input line;

deriving a series of positive voltage pulses which are proportional in pulse period duration to the pulse period duration of the series of pulses of the single audio tone; and, deriving a series of zero voltage transitions which are preportional in duration to the duration of the transition periods between the pulse periods of the series of pulses of the single audio tone.

37. A multiplexer system for receiving data from a plurality of interrogatable data transmitters coupled to a plurality of telephone lines comprising:

means for coupling the multiplexer system to plurality of telephone lines;

means for sending at least one distinct interrogation signal over each of the coupled telephone lines;

means for receiving an alternating current representation of the data sent over the coupled telephone lines from each of the plurality of interrogatable data transmitters;

means for converting each of the alternating current representations of the data into digital representations, including means responsive to an unacceptable signal from an interrogated data transmitter for increasing the level of the interrogation signal for that data transmitter at the next interrogation thereof; and means for registering the data transmitter as inoperative upon the failure to receive data therefrom in response to such subsequent interrogation.

38. A multiplexer system for receiving data from a plurality of interrogatable data transmitters coupled to a plurality of telephone lines connected to a telephone central office including line cutoff relays comprising;

a multiplexer means for coupling said multiplexer system to the plurality of telephone lines beyond the line cutoff relays;

means for sending at least one distinct interrogation signal over each of the coupled telephone lines via said multiplexer;

means for receiving an alternating current representation of the data sent over the coupled telephone lines from each of the plurality of interrogatable data transmitters via said multiplexer;

means coupled to said multiplexer for converting each of the alternating current representations of the data into digital representations;

means for demultiplexing the received alternating current representations from the plurality of coupled telephone lines to a single input circuit;

wherein said increasing means increases the level of interrogation signal sequentially to higher levels.

39. A multiplexer system for receiving data from a plurality of interrogatable data transmitters coupled to a plurality of telephone lines connected to a telephone central office including line cutoff relays comprising;

a multiplexer means for coupling said multiplexer system to the plurality of telephone lines beyond the line cutoff relay;

means for sending at least one distinct interrogation signal over each of the coupled telephone lines via said multiplexer;

means for receiving an alternating current representation of the data sent over the coupled telephone lines from each of the plurality of interrogatable data transmitters via said multiplexer;

means coupled to said multiplexer for converting each of the alternating current representations of the data into digital representations;

means for demultiplexing the received alternating current representations from the plurality of coupled telephone lines to a single input circuit;

means for setting the normal level for interrogation at the lowest level for which a usable response has been received from a data transmitter.

40. A multiplexer system for receiving data from a plurality of interrogatable data transmitters coupled to a plurality of telephone lines connected to a telephone central office including line cutoff relays comprising;
- a multiplexer means for coupling said multiplexer system to the plurality of telephone lines beyond the line cutoff relays;
- means for sending at least one distinct interrogation signal over each of the coupled telephone lines via said multiplexer;
- means for receiving an alternating current representation of the data sent over the coupled telephone lines from each of the plurality of interrogatable data transmitters via said multiplexer;
- means coupled to said multiplexer for converting each of the alternating current representations of the data into digital representations;
- means for demultiplexing the received alternating current representations from the plurality of coupled telephone lines to a single input circuit;
- wherein said increasing means increases the level of interrogation signal in stepped increments.

41. A multiplexer system for receiving data from a plurality of interrogatable data transmitters coupled to a plurality of telephone lines connected to a telephone central office including line cutoff relays comprising:
- a multiplexer means for coupling said multiplexer system to the plurality of telephone lines beyond the line cutoff relays;
- means for sending at least one distinct interrogation signal over each of the coupled telephone lines from each of the plurality of interrogatable data transmitters via said multiplexer;
- means coupled to said multiplexer for converting each of the alternating current representations of the data into digital representations;
- means for demultiplexing the received alternating current representations from the plurality of coupled telephone lines to a single input circuit;
- means for storing line condition information as a function of the lowest step level at which usable data is received from each data transmitter.

42. The combination in accordance with claim 22 including means for recording a faulty line if no usable data is detected after interrogation at the highest incremental step level of said interrogation signal.

43. A multiplexer system for receiving data from a plurality of interrogatable data transmitters coupled to a plurality of telephone lines comprising:
- means for coupling the multiplexer system to the plurality of telephone lines;
- means for sending at least one distinct interrogation signal over each of the coupled telephone lines;
- means for receiving an alternating current representation of the data sent over the coupled telephone lines from each of the plurality of interrogatable data transmitters;
- means for converting each of the alternating current representations of the data into digital representations;
- further including means for demultiplexing the received alternating current representations from the plurality of coupled telephone lines to a single input circuit;
- including means responsive to an unacceptable signal from an interrogated data transmitter for increasing the level of the interrogation signal for that data transmitter at the next interrogation thereof; and
- means for registering the data transmitter as inoperative upon the failure to receive data therefrom in response to such subsequent interrogation.

44. A multiplexer system for receiving data from a plurality of interrogatable data transmitters coupled to a plurality of telephone lines comprising:
- means for coupling the multiplexer system to the plurality of telephone lines;
- means for sending at least one distinct interrogation signal over each of the coupled telephone lines;
- means for receiving an alternating current representation of the data sent over the coupled telephone lines from each of the plurality of interrogatable data transmitters;
- means for converting each of the alternating current representation of the data sent over the coupled telephone lines from each of the plurality of interrogatable data transmitters;
- means for converting each of the alternating current representations of the data into digital representations;
- further including means for demultiplexing the received alternating current representations from the plurality of coupled telephone lines to a single input circuit, including means responsive to an unacceptable signal from an interrogated data transmitter for increasing the level of the interrogation signal for that data transmitter at the next interrogation thereof; and
- means for registering the data transmitter as inoperative upon the failure to receive data therefrom in response to such subsequent interrogation.

* * * * *